United States Patent [19]

Tateno et al.

[11] Patent Number: 4,817,776

[45] Date of Patent: Apr. 4, 1989

[54] STARTING CONTROL APPARATUS FOR AUTOMATIC TRANSMISSION SYSTEM

[76] Inventors: Toshiaki Tateno, 930-132, Ohbacho, Midori-Ku, Yokohama-shi, Kanagawa-Ken, 227; Shigeki Fukushima, 412, Futoocho, Kohoku-Ku, Yokohama-shi, Kanagawa-Ken, 222; Tomoyuki Iwamoto, 8-1, Miyamaedaira, 3-chome, Miyamae-Ku, Kawasaki-shi, Kanagawa-Ken, 213, all of Japan

[21] Appl. No.: 939,341

[22] PCT Filed: Mar. 28, 1986

[86] PCT No.: PCT/JP86/00151

§ 371 Date: Nov. 25, 1986

§ 102(e) Date: Nov. 25, 1986

[87] PCT Pub. No.: WO86/05747

PCT Pub. Date: Oct. 9, 1986

[30] Foreign Application Priority Data

Mar. 29, 1985 [JP] Japan ............................ 60-44892[U]
Apr. 10, 1985 [JP] Japan ................................ 60-74502
Apr. 12, 1985 [JP] Japan ................................ 60-76638
Jul. 16, 1985 [JP] Japan ........................... 60-108258[U]
Sep. 30, 1985 [JP] Japan ........................... 60-150070[U]
Sep. 30, 1985 [JP] Japan ........................... 60-150071[U]

[51] Int. Cl.⁴ ...................... B60K 41/28; B60K 41/02
[52] U.S. Cl. .............................. 192/0.092; 192/0.033; 192/0.076; 192/0.084
[58] Field of Search .............. 192/0.033, 0.076, 0.084, 192/0.092, 0.096

[56] References Cited

U.S. PATENT DOCUMENTS

| | | | |
|---|---|---|---|
| 4,493,228 | 1/1985 | Vukovich et al. | 74/858 |
| 4,505,368 | 3/1985 | Ackermann et al. | 192/0.092 |
| 4,509,628 | 4/1985 | Junginger et al. | 192/0.082 |
| 4,618,043 | 10/1986 | Hattori et al. | 192/0.092 |
| 4,662,494 | 5/1987 | Wakiya et al. | 192/0.092 |

FOREIGN PATENT DOCUMENTS 3243485 7/1983 Fed. Rep. of Germany ... 192/0.092

*Primary Examiner*—Rodney H. Bonck
*Assistant Examiner*—David A. Testardi
*Attorney, Agent, or Firm*—Abelman Frayne Rezac & Schwab

[57] ABSTRACT

Disclosed is a starting control apparatus for an automatic transmission system, in which an accelerator pseudo signal voltage determined on the basis of a target engine rotation speed and the present engine rotation speed detected by an operating condition detecting device is applied to an engine control device to increase the present engine rotation speed to the target engine rotation speed, and, when the engine rotation speed has attained its peak, whether or not the engine rotation speed is synchronous with the rotation speed of a clutch is judged by a synchronous rotation judging device. A clutch engagement judging device decides that the clutch is to be completely engaged when the synchronous rotation judging device judges that the engine and the clutch are under synchronous rotation, but decides that the clutch is to be operated in a semi-engaged state when the synchronous rotation judging device judges that the engine and the clutch are under asynchronous rotation. When a clutch position detecting device detects that the clutch is completely engaged as a result of judgment by the clutch engagement judging device, an accelerator pseudo signal voltage stepwise releasing device applies a signal to the engine control device to stepwise release the accelerator pseudo signal voltage.

17 Claims, 51 Drawing Sheets

F I G. 7(a)
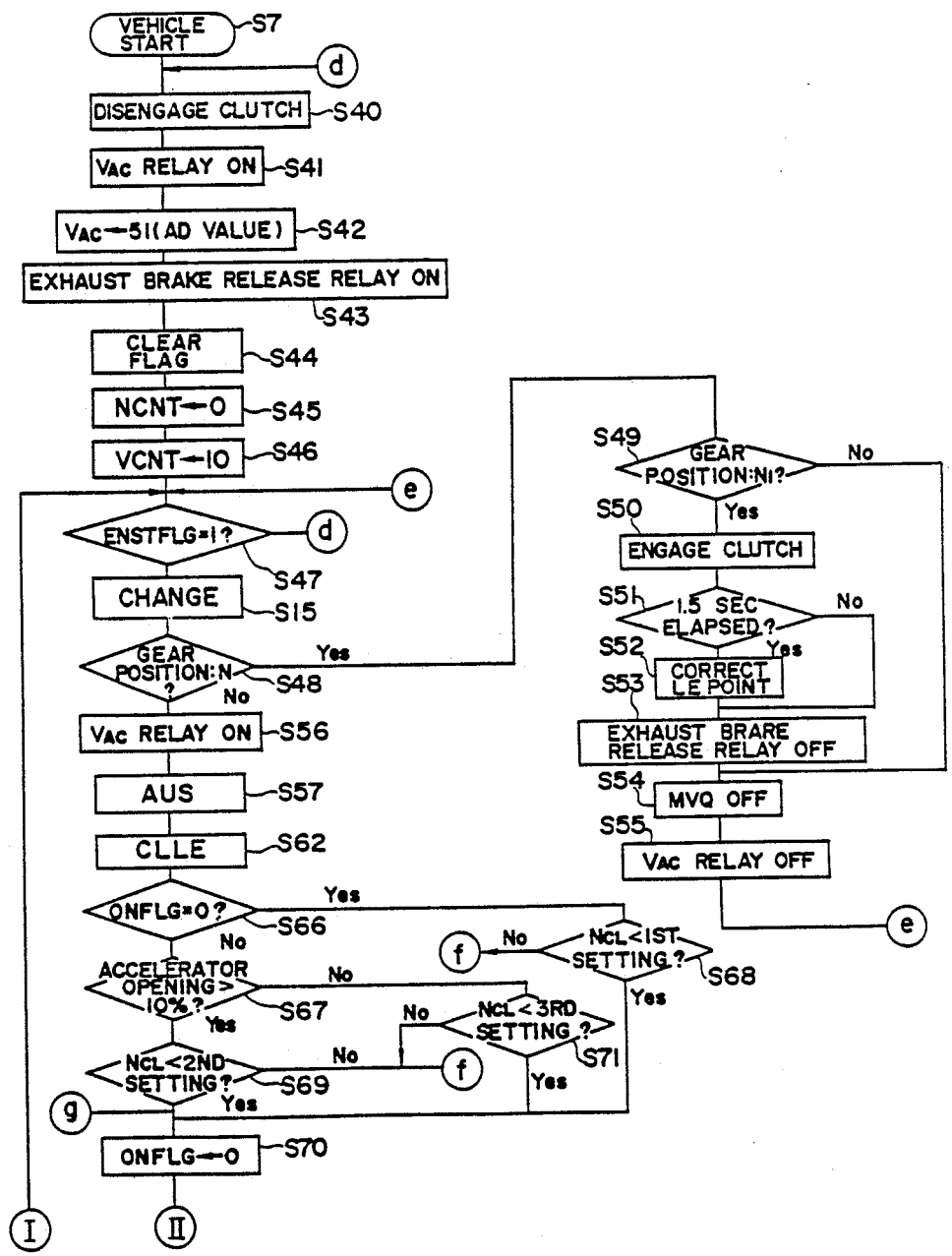

F I G. 7(j)
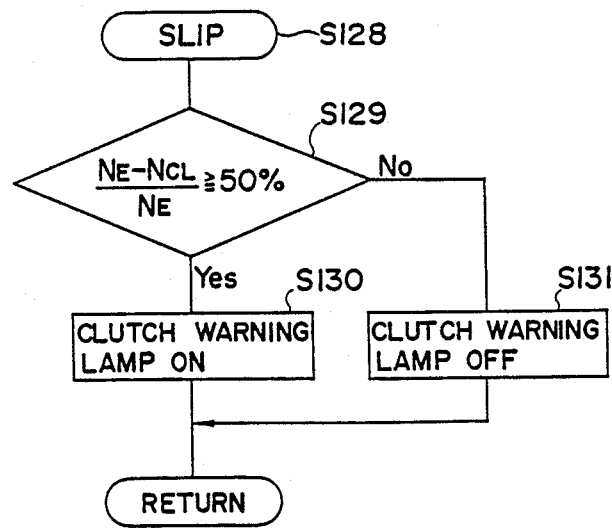

F I G. 23
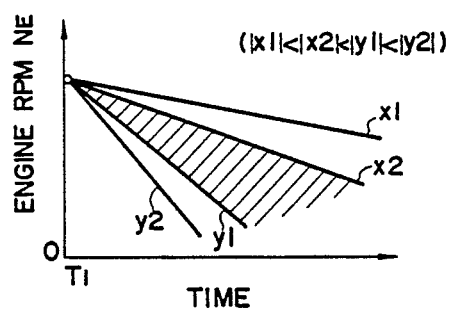

F I G. 24(a)
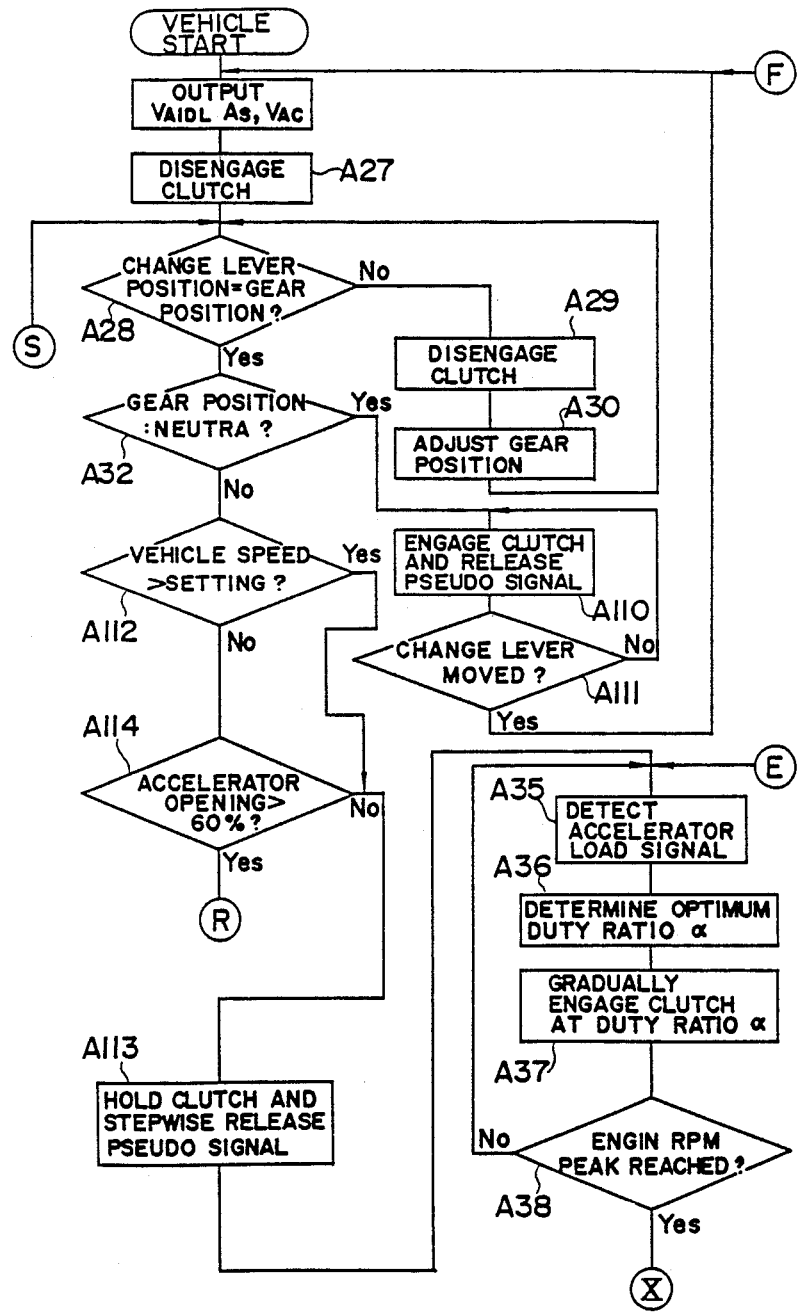

F I G. 25
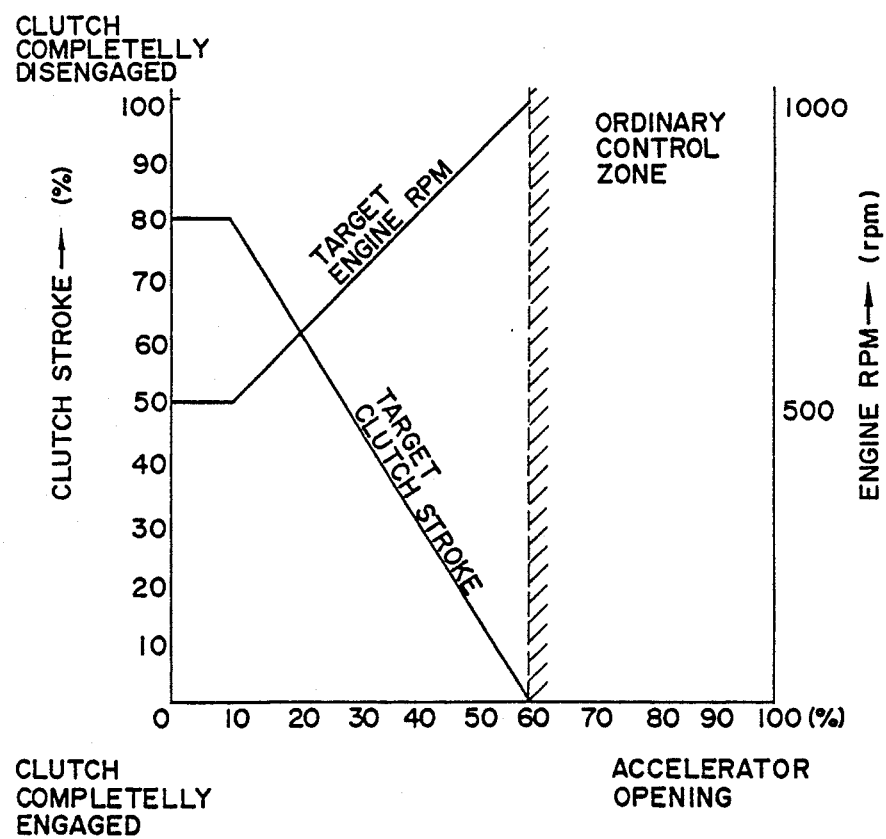

STARTING CONTROL APPARATUS FOR AUTOMATIC TRANSMISSION SYSTEM

DESCRIPTION

1. Technical Field

This invention relates to a starting control apparatus for an automatic transmission system of the type in which the stroke of a friction clutch interposed between an engine of a vehicle and a transmission is electronically controlled through an actuator, and the meshing position of the gears of the transmission is also electronically controlled through gear position change-over means.

This invention relates also to a duty control circuit incorporated in an automatic transmission system of a type as described above, so as to generate and apply a pulse signal to an electromagnetic valve controlling the operation of an actuator actuating a clutch of a vehicle.

2. Background Art

For the purpose of alleviating the driver's effort to maneuver a large-sized truck, bus or the like, an automatic transmission system capable of automatically selecting the gear position depending on the running condition of the vehicle has been proposed.

Conventional automatic transmission systems are exclusively designed for use in small-sized passenger cars.

This automatic transmission system has generally such a structure that a fluid coupling such as a hydraulic torque converter is interposed between an engine and a planetary gear type transmission controlled by hydraulic pressure, and the gear position of the planetary gear type transmission is changed over by hydraulic pressure, and the gear position of the planetary gear type transmission is changed over by gear position change-over means.

An important matter to be taken into consideration for the development of an automatic transmission system suitable for application to a large-sized truck or the like is that the number of production of vehicles of this kind is very small as compared to that of passenger cars. Therefore, newly designing an expensive torque converter or the like is quite disadvantageous from the aspect of cost, and it is desirable that the existing drive system including the friction clutch and transmission as well as the existing production equipment, be directly utilized without any alteration.

On the other hand, a clutch actuator used in an automatic transmission system is operated by a fluid supplied from a high-pressure fluid source, and the charge-discharge of the fluid is controlled by an electromagnetic valve. A duty control circuit is connected to such an electromagnetic valve. The electromagnetic valve is opened and closed according to a duty ratio of a pulse signal generated from the duty control circuit to increase or decrease the amount of actuation of the clutch actuator controlling the clutch, so that stepwise control of the state of engagement of the clutch can be achieved. That is, when the vehicle is to be started or when the speed ratio of the vehicle is changed, it is desirable to finely adjust the position of the clutch from the disengaged position toward the engaged position. One prior art means for realizing such fine adjustment of the clutch position, includes a plurality of oscillation circuits generating pulse signals having respectively different duty ratios which are disposed in parallel, so that one of the pulse signals having the desired duty ratio can be suitably selected.

DISCLOSURE OF INVENTION

With such knowledge in mind, it is a primary object of the present invention to provide a starting control apparatus for an automatic transmission system, which can automatically achieve a smooth speed shift under electronic control in spite of the fact that the existing drive system is directly used without any alteration.

In accordance with the present invention, there is provided a starting control apparatus for an automatic transmission system comprising engine control means for controlling an increase and a decrease of the rotation speed of an engine; a clutch coupled to an output shaft of the engine; a parallel-shaft type gear transmission coupled at an input shaft thereof to the clutch; a clutch actuator for actuating engagement and disengagement of the clutch; clutch position detecting means for detecting engagement and disengagement of the clutch; shift position change-over means for changing the meshing state of the parallel-shaft type gear transmission; operating condition detecting means for detecting the operating condition of the vehicle; operation control means for controlling the operation of the actuator and the shift position change-over means; target engine rotation-speed generating means for generating a target engine rotation speed corresponding to the amount of accelerator pedal depression detected by the operating condition detecting means; vehicle-starting judging means for judging as to whether or not the shift position change-over means is actuated to establish a vehicle-starting speed ratio on the basis of a signal applied from the operating condition detecting means; engine rotation-speed increasing means operating, when the vehicle-starting judging means judges that the shift position change-over means is actuated to establish the vehicle-starting speed ratio, to apply to the engine control means an accelerator pseudo signal voltage computed on the basis of the target engine rotation speed and the present engine rotation speed detected by the operating condition detecting means, thereby increasing the present engine rotation speed to the target engine rotation speed; clutch urging means for applying, in response to a signal applied from the engine rotation-speed increasing means, a signal to the operation control means to urge the clutch from a disengaged state toward an engaged state; synchronous rotation judging means for judging, when the engine rotation speed has been increased to a peak thereof by the engine rotation-speed increasing means, as to whether or not the engine rotation speed is synchronous with a clutch rotation speed; clutch engagement judging means for deciding that the clutch is to be completely engaged when the synchronous rotation judging means judges that the engine and the clutch are under synchronous rotation but deciding that the clutch is to be operated in a semi-engaged state when the synchronous rotation judging means judges that the engine and the clutch are under asynchronous rotation; and accelerator pseudo signal-voltage stepwise releasing means for applying to the engine control means a signal for stepwise releasing the accelerator pseudo signal voltage when the clutch position detecting means detects that the clutch is completely engaged as a result of judgment the clutch engagement judging means.

The clutch is operated through the clutch actuator controlled by the operation control means, thereby permitting or interrupting transmission of drive force from the engine to the parallel-shaft type gear transmission. The operation control means controls the operating characteristic of the clutch actuator to transmit the drive force with least shift shock. The shift position change-over means is operated by the operation control means in interlocking relation with the operation of the clutch, so that the optimum gear position can be automatically selected. This shift operation is carried out on the basis of the will of the driver and a predetermined running condition of the vehicle.

On the other hand, in a vehicle starting stage, the engine rotation-speed increasing means eliminates an unnecessary increase of the engine rotation speed when the rotation speed of the engine approaches to the target engine rotation speed corresponding to the amount of depression of the accelerator pedal, while the synchronous rotation judging means judges synchronization between the engine rotation speed and the clutch rotation speed at the time where the engine rotation speed has reached a peak, and the clutch engagement judging means attains an ideal state of clutch engagement conforming to the synchronization thereby ensuring smooth starting although the vehicle is started at a very low speed. In order to prevent an abrupt variation of the rotation speed of the engine, the accelerator pseudo signal-voltage stepwise releasing means releases gradually the accelerator pseudo signal voltage in a stepwise manner.

In the known duty control circuit, the number of stepwise-changing duty ratios is restricted by the number of, for example, timer circuits, and its is almost impossible to further increase the number of pulse signals having respectively different duty ratios. Further, parts errors and differences of temperature dependences tend to be included in external parts constituting the individual oscillation circuits, resulting in a tendency of fluctuation of the duty ratios. It is another object of the present invention to provide a duty control circuit for use in the automatic transmission system, which can divide the stepwise change of the duty ratio more finely than the prior art one.

The present invention which attains the above object provides a duty control circuit which comprises, an oscillator generating basic pulses, a counter repeatedly counting the basic pulse from zero in each of pre-set counting periods and generating the count, a control part generating a duty determination number signal so that an electromagnetic valve for actuating a clutch actuator in the automatic transmission system can be opened and closed at proper timing with a predetermined duty ratio, a comparator generating a pulse width signal each time the count exceeds the duty determination number, and a logic circuit applying a pulse signal having a duty ratio corresponding to the pulse width signal to the electromagnetic valve during the period of time in which the logic circuit receives the electromagnetic-valve operating signal determined by the control part.

Thus, when the count of the basic pulses successively counted in each of the pre-set counting periods exceeds the duty determination number, the comparator generates the pulse width signal during that period of time, and the pulse signal having the duty ratio corresponding to the pulse width signal is applied at the proper time to the electromagnetic valve from the logic circuit.

BRIEF DESCRIPTION OF DRAWINGS

FIG. 5 to FIGS. 9(a), 9(b), 9(c), 9(d), 9(e), 9(f), 9(g) and 9(h) are flow charts showing an example of a control program in the first embodiment.

FIGS. 19(a), 19(b) to FIGS. 22(a), 22(b) and 22(c) are flow charts showing an example of a control program in the second embodiment.

FIG. 23 is a graph showing a region of the change rate of the engine rotation speed during a speed shift in the second embodiment.

FIG. 25 is a graph showing an example of a map for determining a target clutch stroke and a target engine rotation speed corresponding to an accelerator opening.

FIG. 28 shows schematically the structure of a duty control circuit which is another embodiment of the present invention.

FIG. 29 is a waveform diagram illustrating the opration of the circuit shown in FIG. 28.

BEST MODE FOR CARRYING OUT THE INVENTION

A first embodiment of the present invention will be described with reference to the drawings.

Figure 1:
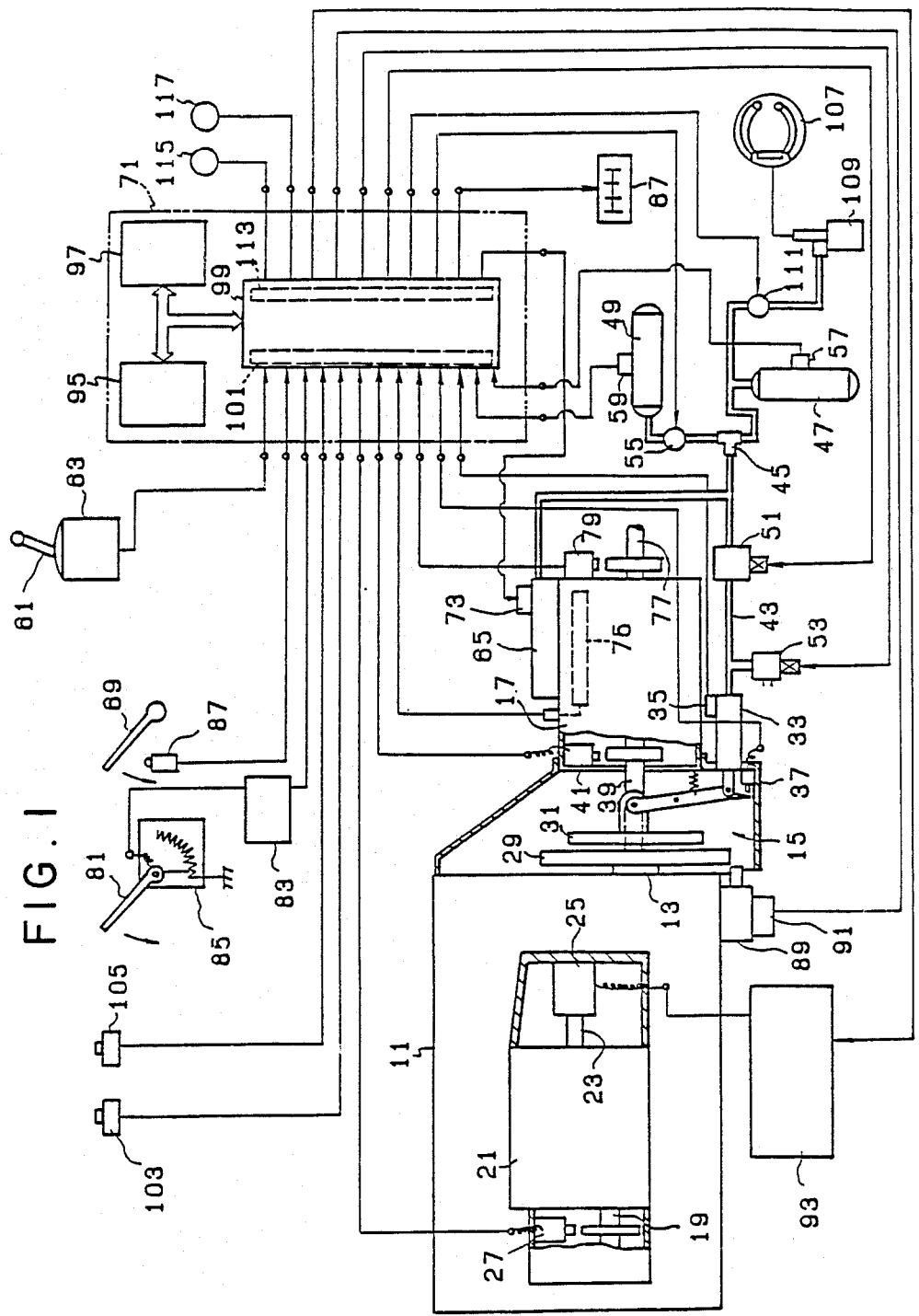
FIG. 1 shows schematically the structure of a first embodiment of the automatic transmission system according to the present invention.
Figure 2:
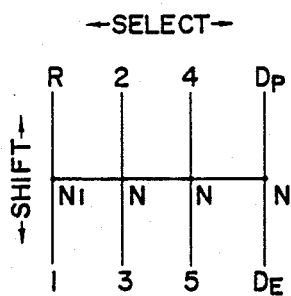
FIG. 2 is a conceptual diagram showing an example of a shift pattern in the first embodiment.
Figure 3A:
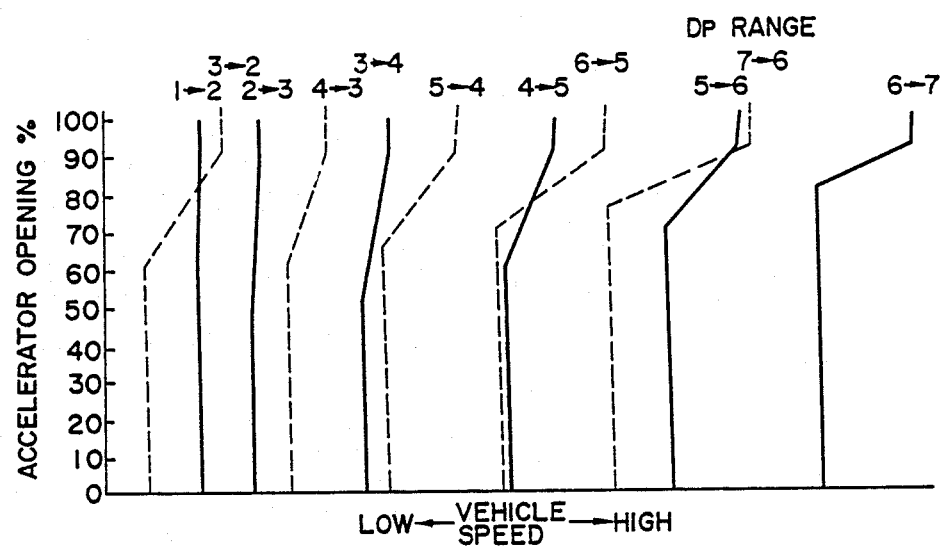
FIGS. 3(a) and 3(b) are graphs showing an example of shift maps in a Dp range and a D range in the first embodiment respectively.
Figure 3B:
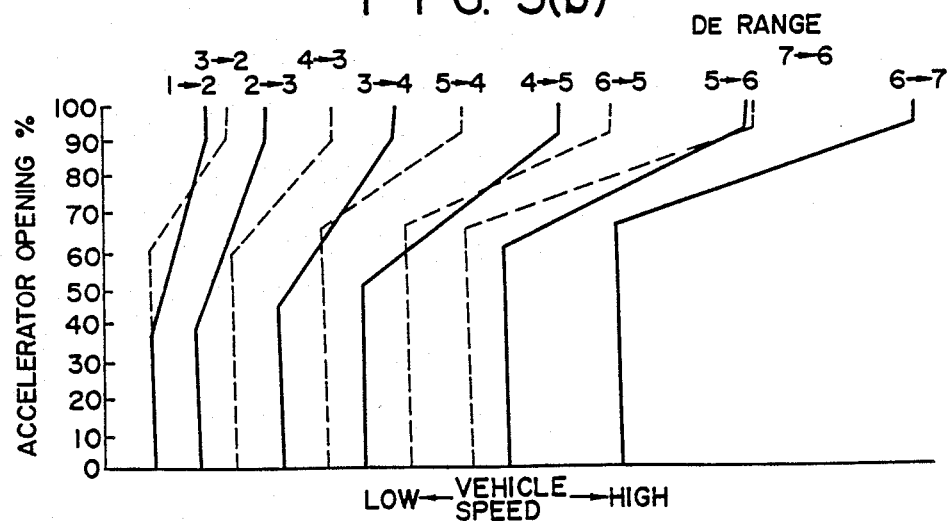

As shown in FIG. 1 illustrating the concept of the first embodiment of the automatic transmission system realizing the starting control apparatus of the present invention, the automatic transmission system is mounted to cover a Diesel engine (referred to hereinafter simply as an engine) 11 and a gear transmission 17 which receives the rotating force of an engine output shaft 13 through a mechanical friction clutch (referred to hereinafter simply as a clutch) 15. Mounted to the engine 11 is a fuel injection pump (referred to hereinafter simply as an injection pump) 21 which includes an input shaft 19 rotating at a rotation speed which is ½ of that of the engine output shaft 13. An electromagnetic actuator 25 is connected to a control rack 23 of the pump 2, and an engine rotation sensor 27 generating an rpm signal of the output shaft 13 of the engine 11 is associated with the input shaft 19. A clutch disc 31 of the clutch 15 is brought into pressure engagement with a flywheel 29 by well-known pressing means (not shown). When an air cylinder 33 acting as a clutch actuator is placed in its operating state from a non-operating state, the pressing means is urged in the releasing direction, and the clutch 15 changes from the engaged state to its disengaged state. (FIG. 1 shows the clutch 15 in its disengaged state.) The clutch 15 is provided with a clutch stroke sensor 35 sensing the disengaged state or engaged state of the clutch 15 on the basis of the clutch stroke. However, in lieu of the clutch stroke sensor 35, a clutch toner sensor 37 may be utilized. An input shaft 39 of the gear transmission 17 is associated with a clutch rpm sensor 41 generating a signal indicative of the rpm (referred to hereinafter as a clutch rotation speed) of the input shaft 39. An air passage 43 connected to the air cylinder 33 is connected through a check valve 45 to a pair of air tanks 47 and 49 which are sources of high pressure air. Mounted midway of the air passage 43 are an electromagnetic valve 51 which acts as on-off means for duty-controlling the supply of actuating air, another electromagnetic valve 53 which is of a type opened when energized and which is duty-controlled to permit communication of the interior of the air cylinder 33 with the atmosphere, and another electromagnetic valve (not shown) which is of a type closed when energized and which permits communication of the interior of the air cylinder 33 with the atmosphere only when the vehicle is running. These three electromagnetic valves 51, 53 are on-off controlled to control engagement and disengagement of and durations of engagement and disengagement of the clutch 15. In the pair of air tanks 47 and 49, the air tank 49 is an emergency one, and, when there is no air in the main air tank 47, an electromagnetic valve 55 is opened to supply air. These air tanks 47 and 49 are provided with air sensors 57 and 59 generating an ON signal when the internal air pressure drops to less than a predetermined value. In order to change over the gear position of the gear transmission 17 which established various speed ratios, the driver manipulates a change lever 61 to bring it to a corresponding shift position in a shift pattern as, for example, shown in FIG. 2, thereby changing over a speed ratio selection switch 63. On the basis of a shift signal generated as a result of change-over of the speed ratio selection switch 63, a gear shift unit 65 acting as gear position change-over means is actutated, so that the gear position can be changed over to the desired speed ratio corresponding to that selected on the shift pattern. The selected gear position is displayed on a gear position indicator 67. In FIG. 2, R indicates a reverse range: N and N1 indicate a neutral range: 1, 2, 3, 4, 5 indicate ranges of specified speed shifts respectively; and Dp, De indicate ranges of automatic speed shifts between a 2nd speed and a 7th speed. When the Dp range or De range is selected, one of the 2nd speed to the 7th speed is automatically determined on the basis of the running condition of the vehicle by running an optimum speed-ratio determining routine described later. FIGS. 3(a) and 3(b) show modes of speed shifts in the Dp range of powerful automatic speed shifts and in the De range of economy automatic speed shifts respectively. As shown in FIGS. 3(a) and 3(b), an upshift and a downshift occur in different speed shift regions respectively, and the timing of speed shifts between the 2nd speed and the 7th speed in the Dp range is set on a higher speed side relative to the De range so as to deal with, for example, a heavy-loaded condition of the vehicle. Also, when the driver is depressing a brake pedal 69 or when he is operating an exhaust brake device (not shown), previously-programmed respectively different shift maps are selected. Three shift maps are prepared for each of the Dp range and De range. The gear shift unit 65 is provided with a plurality of electromagnetic valves 73 (only one of which is shown in FIG. 1) energized by energizing signals applied from a control unit 71, and a pair of power cylinders (not shown) supplied with high-pressure actuating air from the air tank 47(49) through the electromagnetic valves 53 to actuate a select fork and a shift fork (not shown) of the gear transmission 17. The respective power cylinders are actuated by the energizing signal applied to the electromagnetic valves 73, thereby actuating the select and shift forks in order and changing the meshing mode of the gears of the gear transmission 17. Further, the gear shift unit 65 is associated with gear position switches 75 acting as gear position sensors sensing individual gear positions. Gear position signals from these gear position switches 75 are applied to the control unit 71. Further, an output shaft 77 of the gear transmission 17 is associated with a vehicle speed sensor 79 generating a vehicle speed signal. Further, an accelerator pedal 81 is associated with an accelerator load sensor 85 which converts a resistance change corresponding to the amount of depression of the accelerator pedal 81 into a voltage value, and this voltage value is then converted into a digital signal by an A/D converter 83. A brake sensor 87 associated with the brake pedal 69 generates a brake signal of high level in response to the depression of the brake pedal 69. The engine 11 is provided with a starter 89 which meshes suitably with a ring gear formed on the outer periphery of the flywheel 29 to start the engine 11. A starter relay 91 is connected to the control unit 71. The reference numeral 93 in FIG. 1˙ designates a microcomputer mounted in the vehicle independently of the control unit 71 so as to carry out various controls of the vehicle. The microcomputer 93 executes the drive control, etc. of the engine 11 in response to input signals from various sensors (not shown). This microcomputer 93 applies an energizing signal to the electromagnetic actuator 25 for the injection pump 21 so as to increase or decrease fuel, thereby controlling the increase or decrease in the rpm (referred to hereinafter as an engine rotation speed) of the output shaft 13 of the engine 11. That is, the engine rotation speed is increase and decreased according to an engine rotation speed increase-decrease signal generated from the control unit 71.

The control unit 71 is a microcomputer provided exclusively for the automatic transmission system and includes a microprocessor (referred to hereinafter as a CPU) 95, a memory 97 and an interface 99 which is an input signal processing circuit. Applied to input ports 101 of the interface 99 are output signals from the speed ratio selection switch 63, brake sensor 87, accelerator load sensor 85, engine rotation sensor 27, clutch rotation speed sensor 41, gear position switches 75, vehicle speed sensor 79, clutch touch sensor 37 (used when detecting the disengaged or engaged state of the clutch 15 in lieu of the clutch stroke sensor 35), clutch stroke sensor 35, air sensors 57, 59, a slope-starting auxiliary switch 103 described below, and a 1st-speed starting switch 105 described below. The slope-starting auxiliary switch 103 is provided for actuating a system (referred to hereinafter as an AUS) preventing rearward movement of the vehicle in the case of starting the vehicle on an ascent. In such a case, the vehicle is started while controlling the supply of air to an air master 109 of the wheel brakes 107 by an electromagnetic valve (referred to hereinafter as an MVQ) 111, and this MVQ 111 is controlled by the control unit 71. The 1st-speed starting switch 105 is provided for achieving vehicle starting at the 1st speed in the Dp range or De range, and, by turning on this switch 105, the vehicle is started at the 1st speed in the automatic shift mode. On the other hand, output ports 113 are connected to the microcomputer 93, starter relay 91, electromagnetic valves 53, 55, 73, 111 and cut valve 51 to apply output signal to them respectively. The reference numeral 115 in FIG. 1 designates an air warning lamp energized by an output from a drive circuit (not show) when the internal air pressure of the air tanks 47 and 49 does not attain the predetermined setting. The reference numeral 117 designates a clutch warning lamp energized by an output when the amount of wear of the clutch 15 exceeds a predetermined value.

Figure 4:
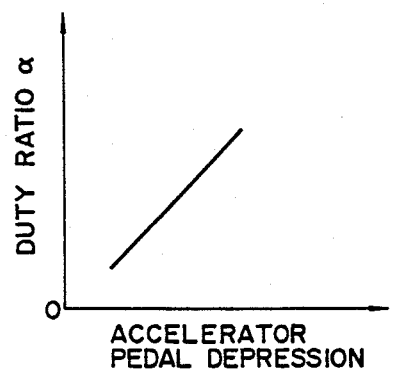
FIG. 4 is a graph showing an example of a map for determining the duty ratio in the first embodiment.

The memory 97 includes a read-only ROM written with a program and data shown in a flow chart of FIGS. 5 to 9, and a write/read RAM. More precisely, besides the program described above, a map of the duty ratio of the electromagnetic valve 53 relative to the value of the accelerator load signal, as shown in FIG. 4, is stored previously in the ROM, and, by suitably referring to this map, the corresponding value is read out. The aforementioned speed ratio selection switch 63 generates a select signal and a shift signal as a speed shift signal. The speed ratios corresponding to all the combinations of the pair of these two signal are previously stored in the form of a data map, and, in response to the application of a select signal and a shift signal, this map is referred to apply the corresponding output signals to the individual electromagnetic valves 73 of the gear shift unit 65, so as to shift the gear position to the desired speed ratio corresponding to the speed shift signal. In this case, upon completion of the desired speed shift, the gear position signals are generated from the gear position switches 75. Judgment is made as to whether or not all the gear position signals corresponding to the select signal and shift signal are generated, and, on the basis of the result of judgment, a signal indicative of whether the meshing of the gears is normal or abnormal is generated. Further, the ROM stores a map as shown in FIGS. 3(a) and 3(b) for determining an optimum speed ratio on the basis of the vehicle speed signal, accelerator load signal and engine rotation signal when the desired speed ratio is present in the Dp range or De range.

The sequence of shift control in the illustrated embodiment of the present invention will be described with reference to FIGS. 5 to 9.

Figure 5:
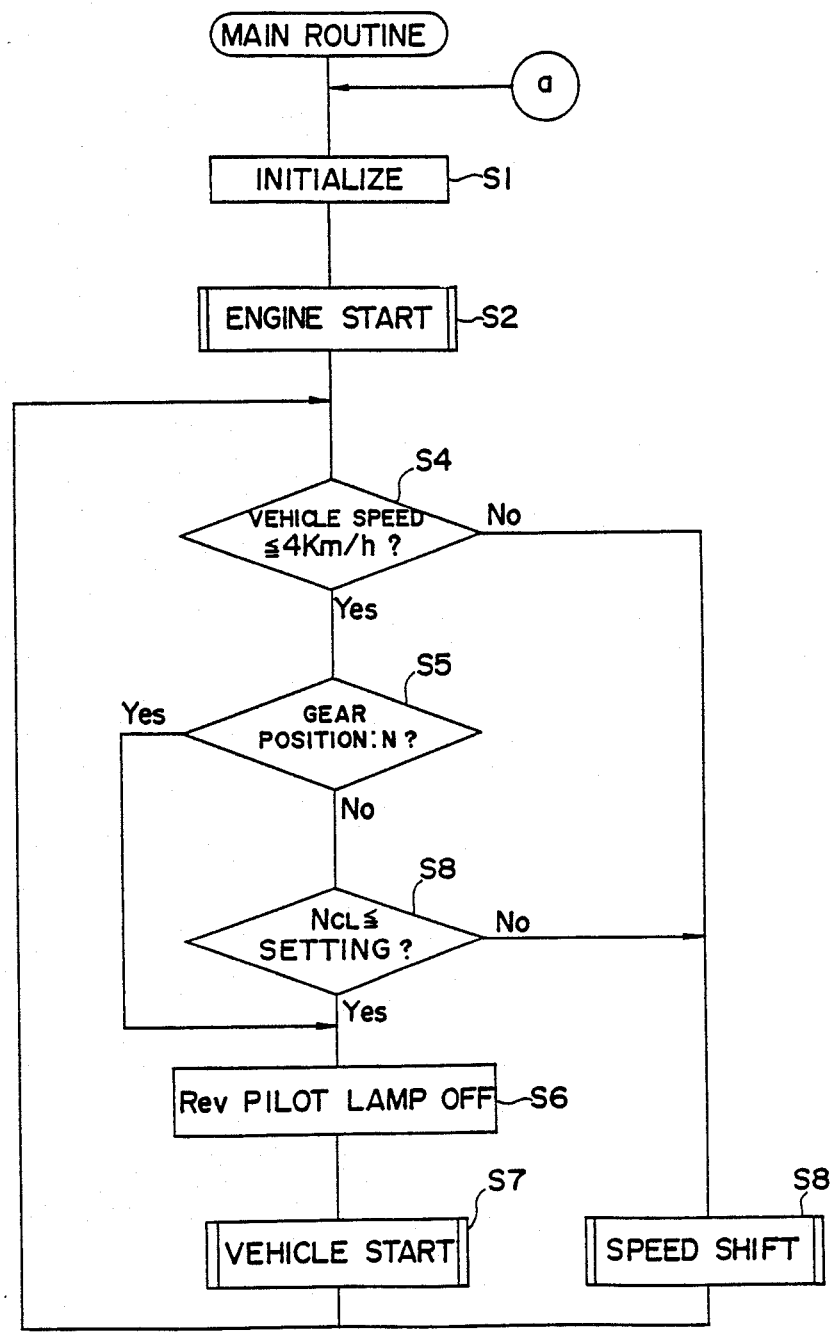

Referring to FIG. 5, as soon as the program starts, initialization is executed in step S1 in which the memory, etc. in the control unit 71 are cleared, and, when the clutch 15 is engaged at a normal pressure under a normal condition, a dummy data of a semi-engaged clutch position (referred to hereinafter as an LE point) is read. At this LE point, the clutch 15 is disengaged to a certain extent from the engaged state, and transition from the rotating state to the stopped state occurs on the driving wheels of the vehicle. The initialization is followed by an engine starting routine (step S2), and, after completion of the engine starting routine, a vehicle speed signal and a clutch rotation speed signal are applied as inputs. When the value of the vehicle speed signal exceeds 4 Km/h, a speed shift routine (step S8) is run. On the other hand, when the value of the vehicle speed signal is proved to be equal to or smaller than 4 Km/h, in step S4, judgment is made as to whether or not the gear position is N (step S5). When the result of judgment proves that the gear position is N, a reverse-indicating Rev pilot lamp (not shown) is deenergized (step S6), and a vehicle starting routine is run (step S7). On the other hand, when the result of judgment proves that the gear position is other than N, judgment is made in step S8 as to whether or not the clutch rotation speed NcL is equal to or lower than a predetermined setting. When the result of judgment proves that the clutch rotation speed NcL is lower than the setting, the Rev pilot lamp is deenergized, and the vehicle starting routine is run. On the other hand, when the result of judgment proves that the clutch rotation speed NcL exceeds the setting, the vehicle speed is regarded to exceed 4 Km/h, and the speed shift routine is run.

Figure 6A:
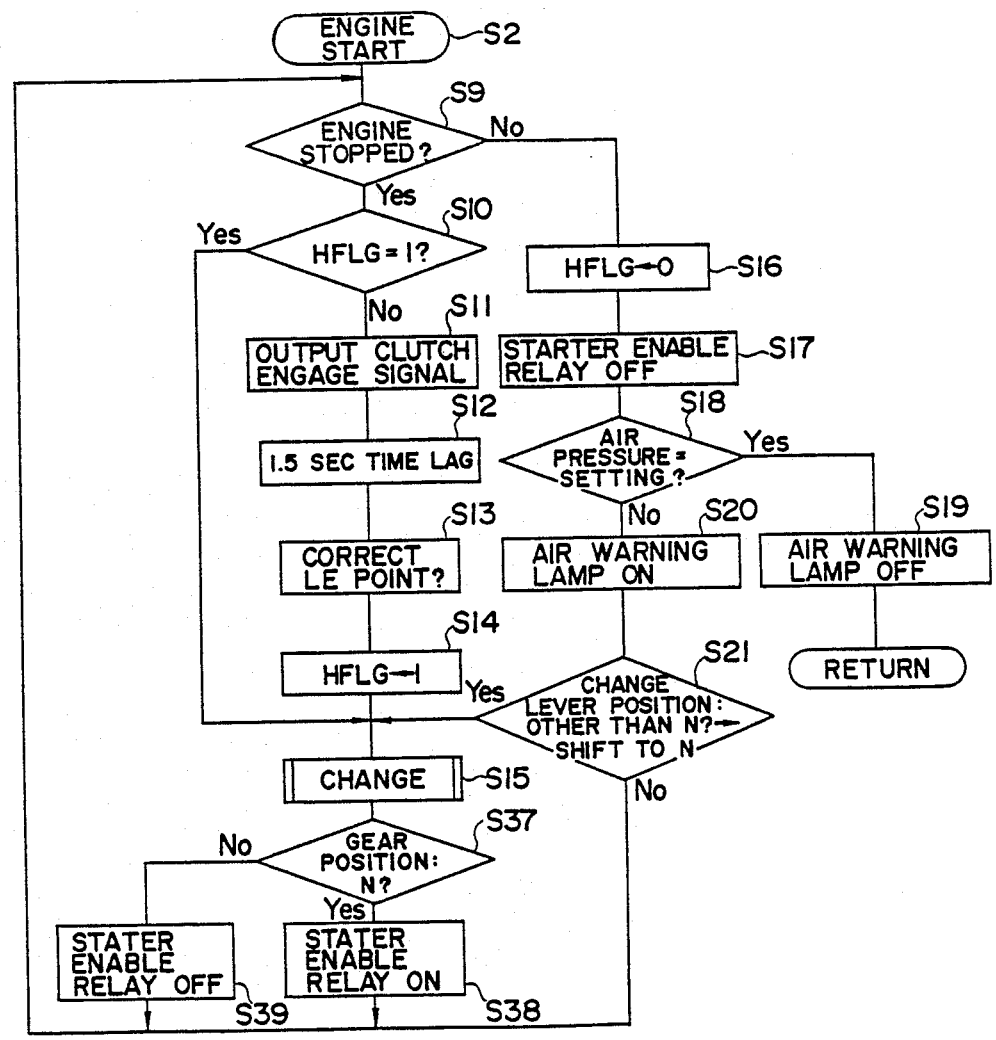
Figure 6B:
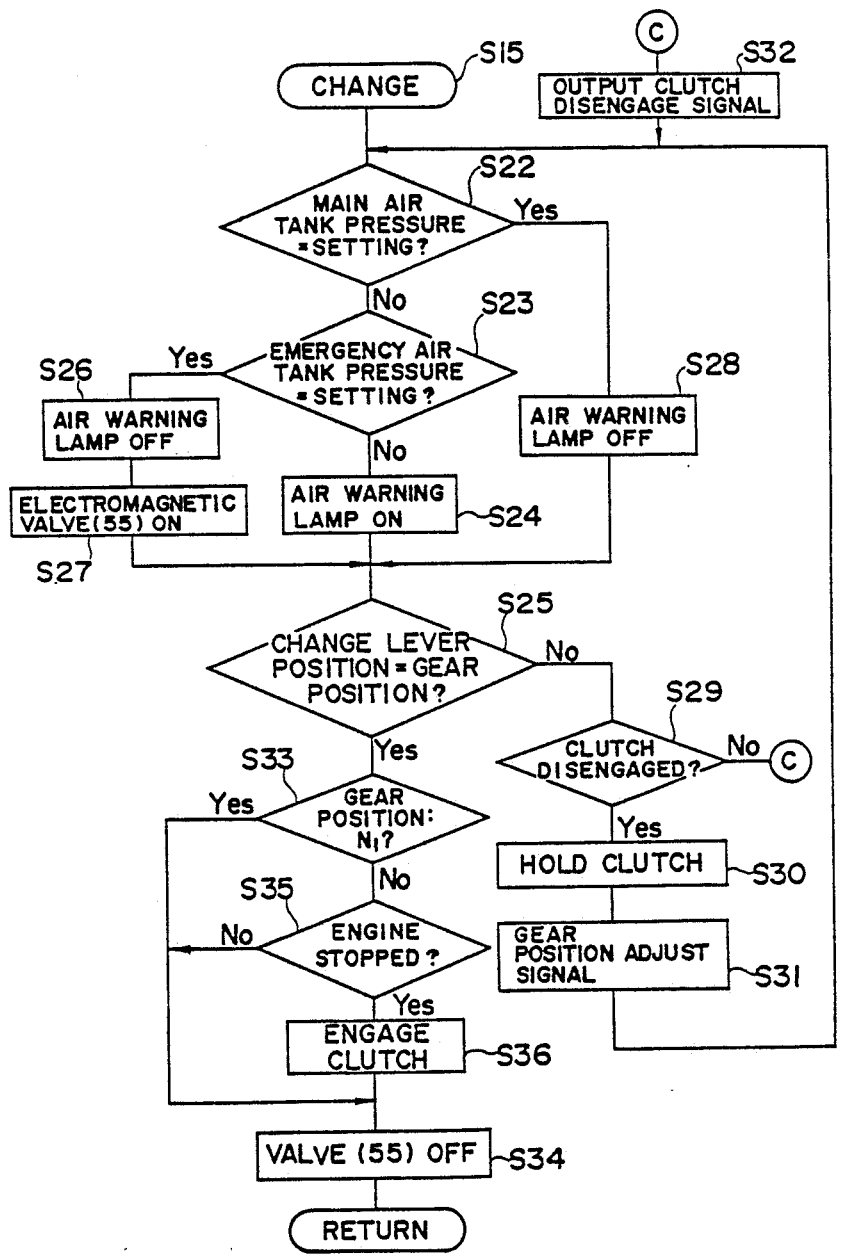

In the engine starting routine (step S2) shown in FIGS. 6(a) and 6(b), the signal indicative of the engine rotation speed N is applied as an input, and judgment is made as to whether or not the value of the engine rotation speed signal lies within the stop range of the engine 11. When the result of judgment proves that the engine 11 stops, judgment is made as to whether or not the LE point has been corrected at the engine starting time depending on the degree of wear of the facing of the clutch 15, the presence or absence of a vehicle load, etc. (step S10). That is, when a flag HFLG is 1, it is judged that the LE point has been corrected at the engine starting time. By the correction of the LE point, the stroke of the clutch disc 31, until the clutch 15 is completely engaged from the LE point, is maintained substantially constant, so that the clutch 15 can be smoothly engaged regardless of the state of the vehicle. When the result of judgment proves that the flag HFLG is not set at 1, a clutch engaging signal is generated (step S11), and, after a time lag of 1.5 sec. (step S12), the LE point is corrected (step S13). The flag HFLG is set at 1 (step S14), and a CHANGE routine is run (step S15). This CHANGE routine is also run, when the engine 11 is stopped, and HFLG=1 is judged. On the other hand, when the result of judgment proves that the engine 11 is not stopped, the flag HFLG is cleared (step S16), and a starter enable relay (not shown) is turned off (step S17). Then, whether or not the pressure of air in the main air tank 47 and emergency air tank 49 has built up to the predetermined setting is checked (step S18). When the result of checking proves that the pressure of air has built up to the predetermined setting, the air warning lamp 115 is deenergized (step S19) to complete the engine starting routine. On the other hand, when the result of checking proves that the pressure of air has not built up to the predetermined setting, the air warning lamp 115 is energized (step S20), and judgment is made as to whether or not the change lever 16 has been shifted to the N position from a position other than N (step S21). When the result of judgment proves that the change lever 61 has been shifted to the N position from a position other than N, the CHANGE routine is run. On the other hand, when the result of judgment proves that the change lever 61 has not been shifted to the N position from a position other than N, the step S21 is followed by the step S9 in which judgment is made as to whether or not the value of the engine rotation speed N lies within the stop range of the engine 11.

In the CHANGE routine C step S15, judgment is made as to whether or not the pressure of air in the main air tank 47 has built up to the predetermined setting (step S22). When the predetermined air pressure has not built up, judgment is made as to whether or not the pressure of air in the emergency air tank 49 has built up to the predetermined setting (step S23). When the result of judgment proves that the predetermined air pressure has not built up in the emergency air tank 49, the air warning lamp 115 is energized in step S24 to inform the driver of the fact that the pressure of air in the main air tank 47 and emergency air tank 49 is lower than the predetermined setting, and judgment is made in step S25 as to whether or not the position of the change lever 61 coincides with the gear position. That is, judgment is made as to whether or not the speed shift signal coincides with the gear position signal, and the gear position of the gear transmission 17 coincides with the desired speed ratio (which is previously set at, for example, the 2nd speed when the $D_E$ range or $D_p$ range is selected) specified by the select signal. When the result of judgment proves that the predetermined air pressure has built up in the emergency air tank 49, the air warning lamp 115 is deenergized (step S26), and, after turning off the electromagnetic valve 55 associated with the emergency air tank 49 (step S27), judgment is made as to whether or not the position of the change lever 61 coincides with the gear position (step S25). On the other hand, when the result of judgment proves that the predetermined air pressure has built up in the main air tank 47, the air warning lamp 115 is deenergized. (step S28), and judgment is made as to whether or not the position of the change lever 61 coincides with the gear position. (step S25). When the gear position differs from the position of the change lever 61, judgment is made as to whether or not the clutch 15 is disengaged (step S29). When the result of judgment proves that the clutch 15 is disengaged, the air pressure of the clutch 15 is held at the present value (step S30), and, after generating a signal for adjusting the gear position to the position of the change lever 61 (step S31), judgment is made again as to whether or not the predetermined air pressure has built up in the main air tank 47. When the result of judgment in the step S29 proves that the clutch 15 is engaged, a clutch disengaging signal is generated in step S32, and, then, judgment is made again as to whether or not the predetermined air pressure has built up in the main air tank 47. When the result of judgment in the step S25 proves that the position of the change lever 61 and the gear position are the same, judgment is made as to whether or not the gear position is the neutral position $N_1$ (step S33). When the result of judgment proves that the gear position is the position $N_1$, the electromagnetic valve 55 is turned off (step S34), and the program returns to the engine starting routine in the main flow. When the result of judgment proves that the gear position is other than the position $N_1$, judgment is made as to whether or not the engine 11 is stopped (step S35). When the result of judgment proves that the engine 11 is stopped, the clutch 15 is engaged (step S36), and, after turning off electromagnetic valve 55, the program returns to the engine starting routine in the main flow. On the other hand, when the result of judgment proves that the engine 11 is not stopped, the electromagnetic valve 55 is turned off, and the program returns to the engine starting routine in the main flow.

Upon completion of the CHANGE routine, judgment is made as to whether or not the gear position is the position N (step S37) as shown in FIG. 6(a). When the gear position is the position N, the starter enable relay is turned on (step S38), and judgment is made again as to whether or not the value of the engine rotation speed $N_E$ lies within the stop range of the engine 11. When the gear position is not the N position, the starter enable relay is turned off (step S39), and judgment is made as to whether or not the value of the engine rotation speed $N_E$ lies within the stop range of the engine 11.

After completion of the engine starting routine, the vehicle speed signal and the clutch rotation speed signal are read, and, when they are smaller than predetermined values, the vehicle starting routine is run (step S7).

As shown in FIGS. 7(a) to 7(j), the clutch 15 is first disengaged (step S40), and an accelerator pseudo signal voltage output relay (not shown) is turned on (step S41). An idling equivalent voltage corresponding to the idling rotation of the engine 11 is applied as an accelerator pseudo signal voltage $V_{AC}$ to the electromagnetic actuator 25 (step S42), and an exhaust brake release relay (not shown) is turned on (step S43). Various flags are cleared (step S44), and counters are initialized (steps S45 and S46). Then, judgment is made as to whether or not the engine rotation speed $N_E$ is lower than an engine-stalling preventive rotation speed (step S47). That is, when a flag ENSTFLG=1, it is judged that the engine rotation speed $N_E$ is lower than the engine-stalling preventive rotation speed. When the result of judgment proves that the engine rotation speed $N_E$ is lower than the engine-stalling preventive rotation speed, the steps starting from the aforementioned step of clutch disengagement are repeated until the engine rotation speed $N_E$ becomes higher than the engine-stalling preventive rotation speed. When the engine rotation speed $N_E$ becomes higher than the engine-stalling preventive rotation speed, the aforementioned CHANGE routine is executed (step S15). After completion of the CHANGE routine, whether or not the gear position is N is detected on the basis of the select signal (step S48). When the gear position is N, whether or not the gear position is $N_1$ is judged (step S49). When the result of judgment proves that the gear position is $N_1$, the clutch 15 is engaged (step S50). After judgment of the clutch engagement for 1.5 sec, the $L_E$ point is corrected, and the exhaust brake release relay is turned off (steps S51 to S53). When the clutch engagement for 1.5 sec is not judged, the exhaust brake release relay is turned off without the $L_E$ point correction. After turning off the exhaust brake release relay, the MVQ 111 for the AUS is turned off (step S54), and, after turning off the accelerator pseudo signal-voltage output relay (step S55) judgment is made again as to whether or not the flag ENSTFLG=1. On the other hand, when the gear position is other than $N_1$, the MVQ 111 is turned off (step S54), and, after turning off the accelerator pseudo signal-voltage output relay (step S55), judgment is made as to whether or not the flag ENSTFLG=1. When the gear position is other than N, the accelerator pseudo signal-voltage output relay is turned on (step S56), and the program proceeds to an AUS routine including steps S57 to S61.

Figure 7B:
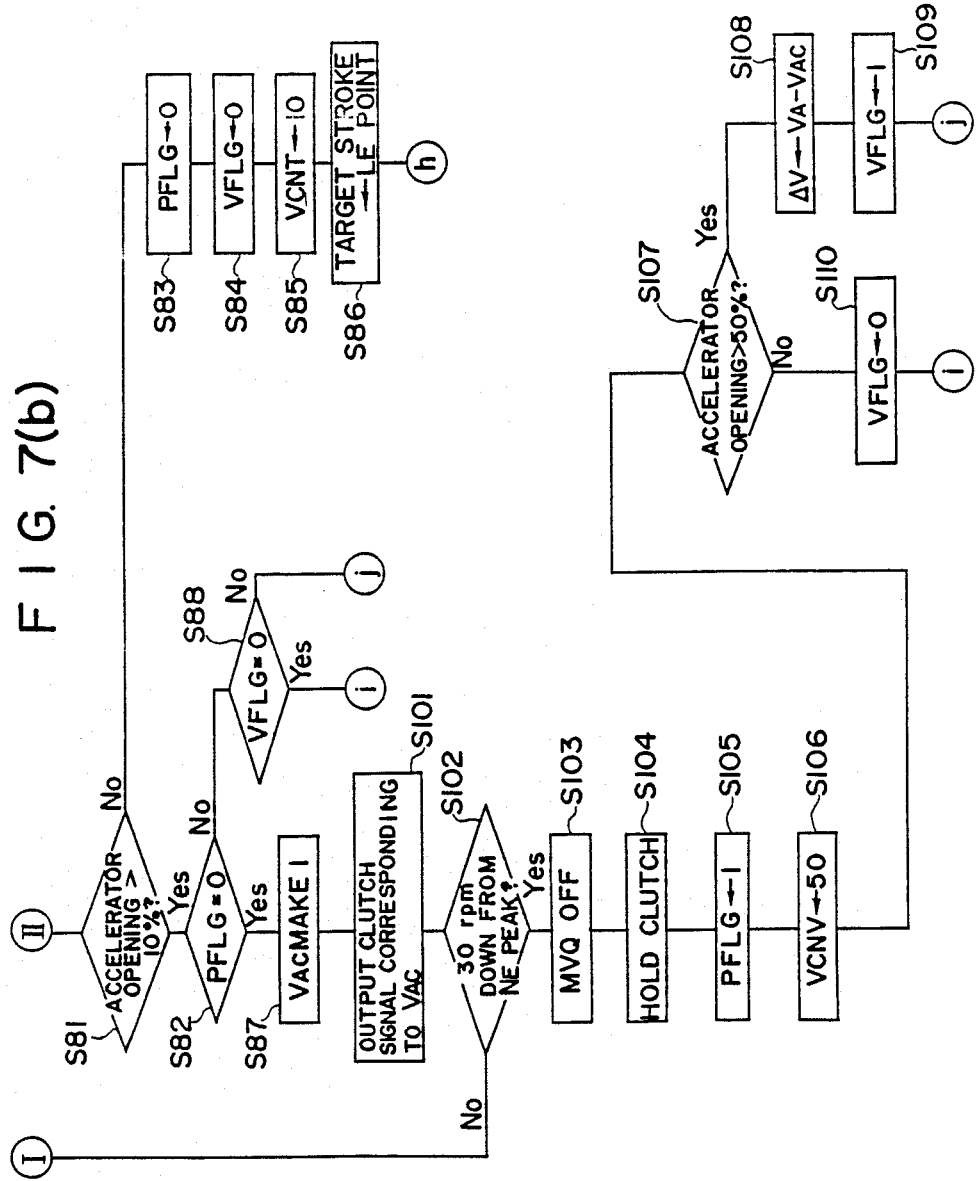
Figure 7C:
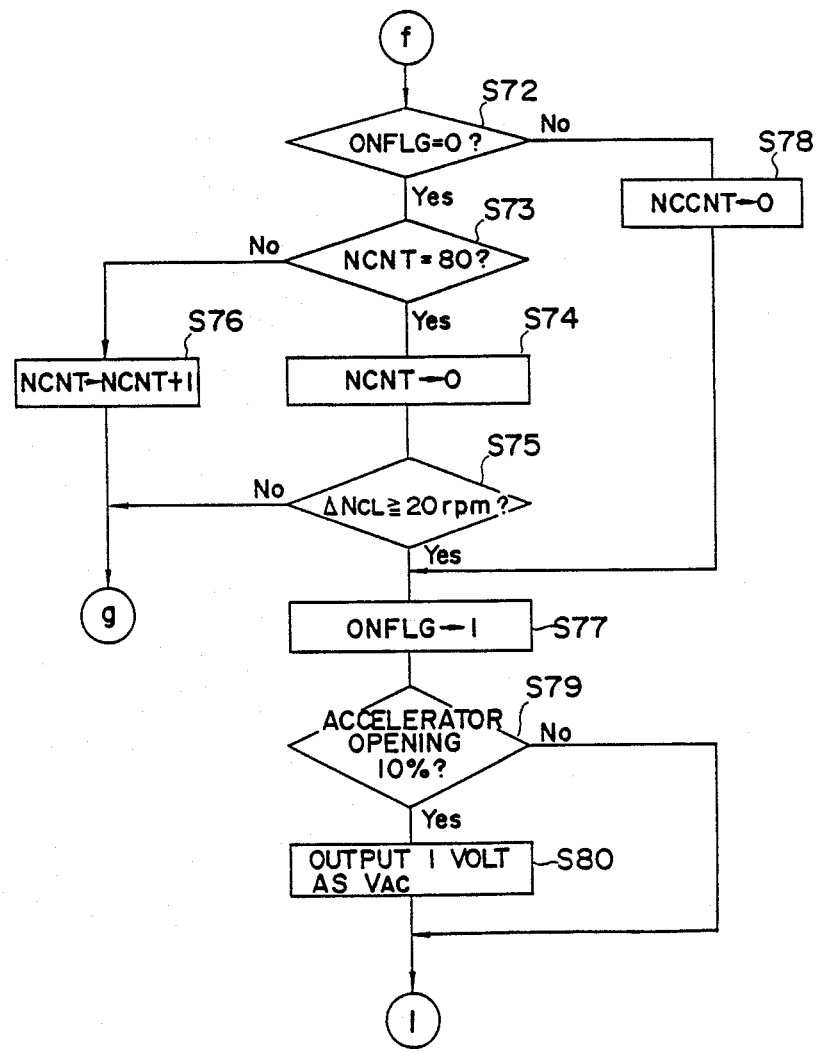
Figure 7D:
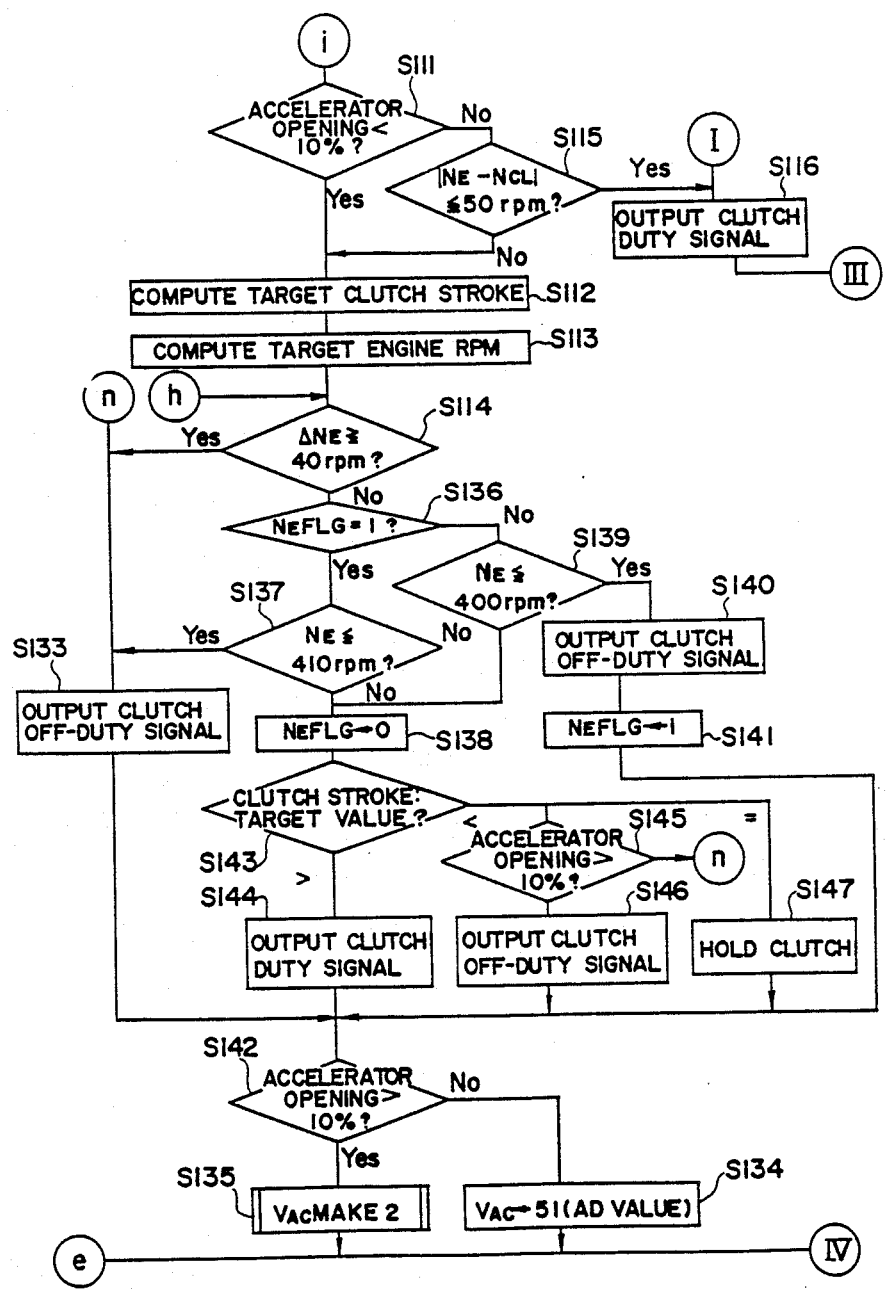
Figure 7E:
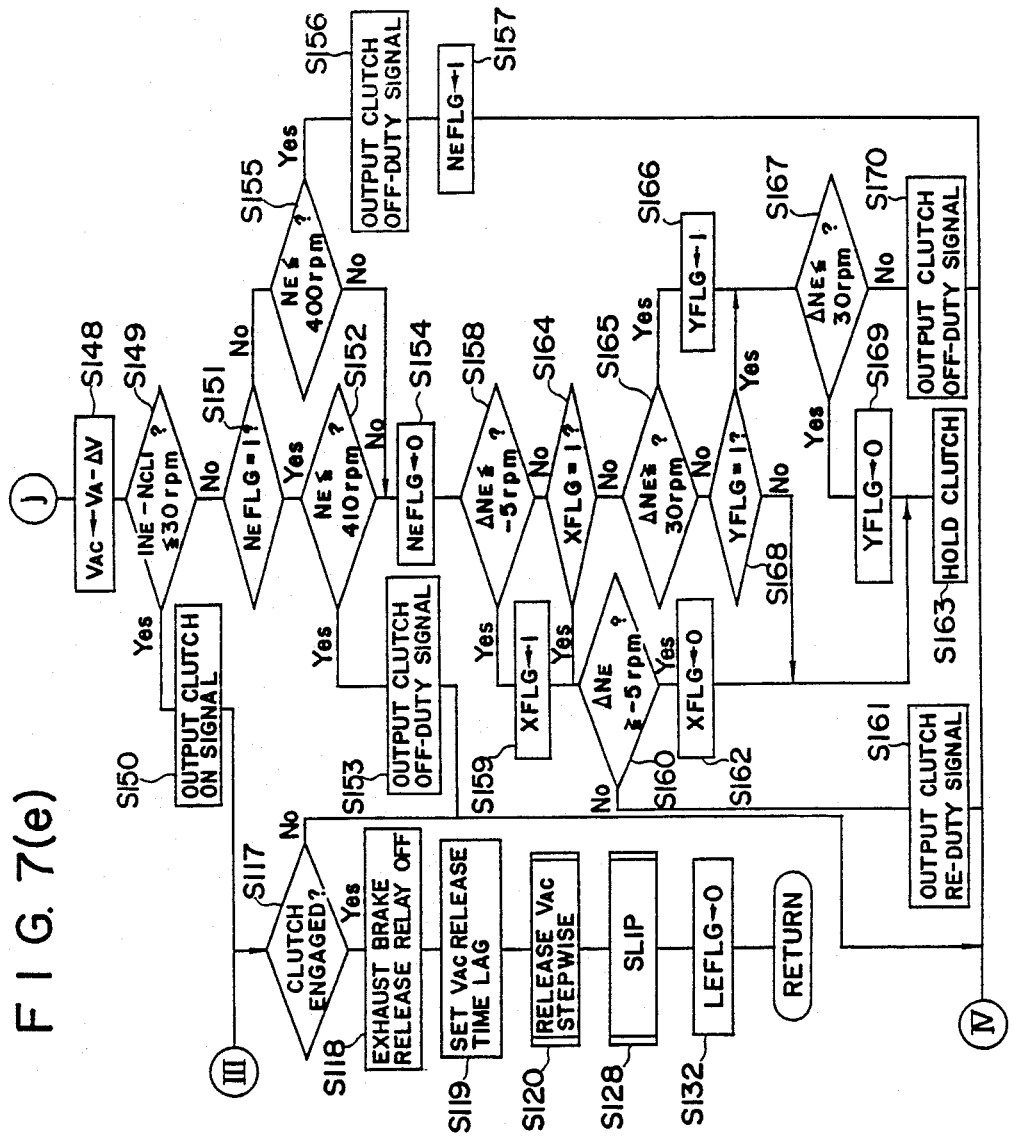
Figure 7F:
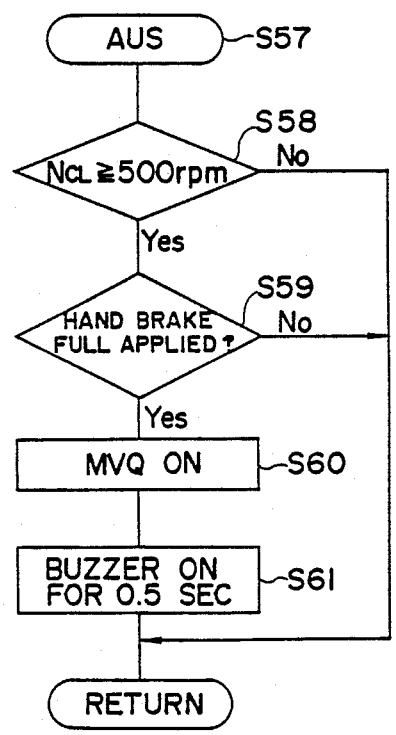

In the AUS routine (step S57) shown in FIG. 7(f), when the clutch rotation speed NcL is equal to or lower than 500 rpm (step S58), and the hand brake is fully operated (step S59), the MVQ 111 is turned on (step S60) to sound a buzzer (not shown) for 0.5 sec (step S61) and to apply the wheel brakes 107. When the clutch rotation speed NcL is higher than 500 rpm, and the hand brake is not sufficiently operated, the program returns to the main flow.

Figure 7G:
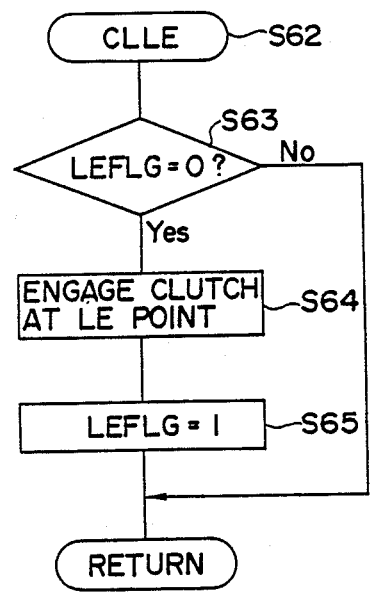
Figure 7H:
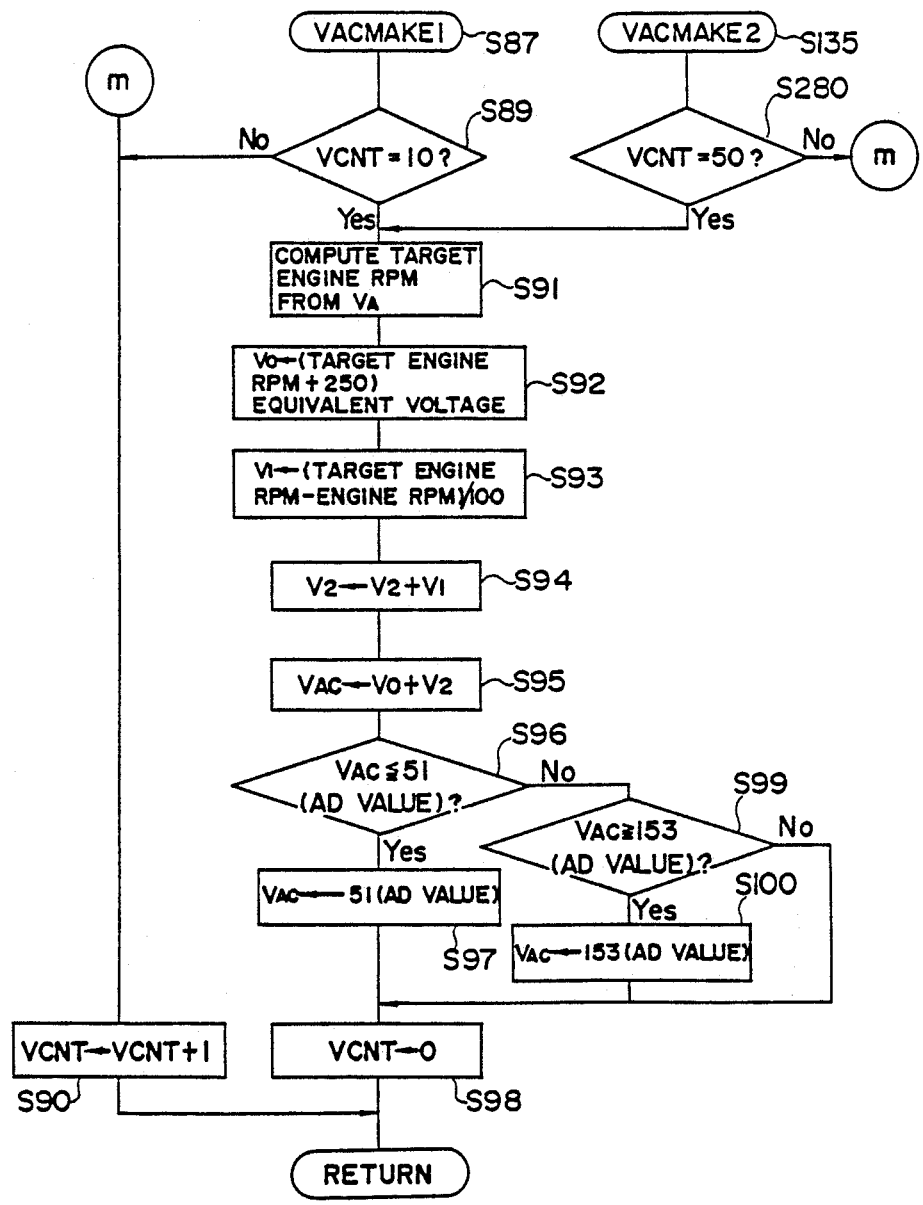
Figure 7I:
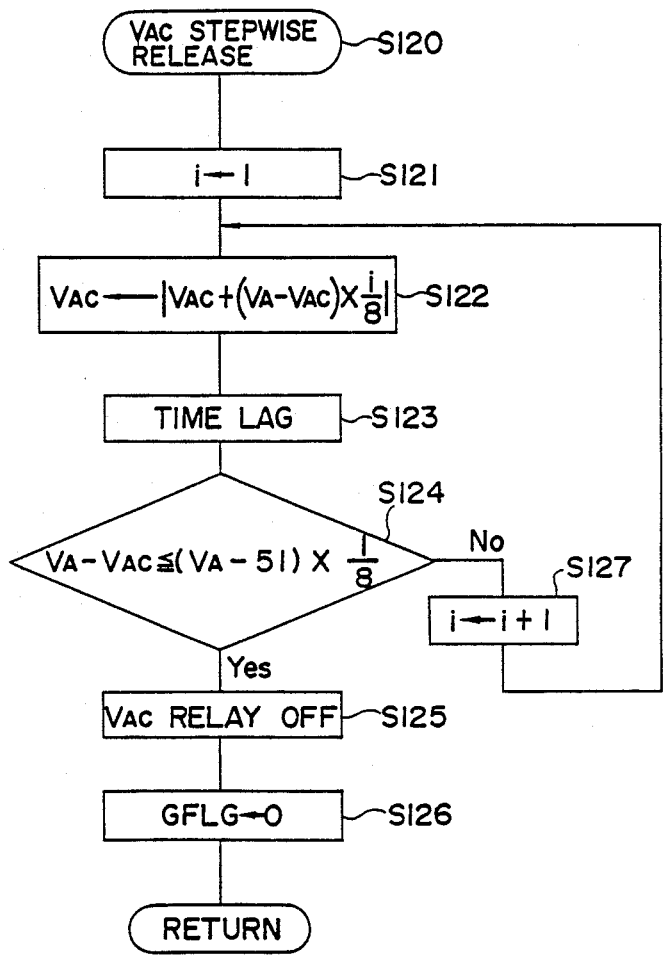

Completion of the AUS routine is followed by a CLLE routine (steps S62 to S65) shown in FIG. 7(g), in which the clutch 15 is urged to a point immediately before the $L_E$ point. In the CLLE routine, judgment is made as to whether or not the clutch 15 is engaged up to the $L_E$ point, and a flag LEFLG is cleared (step S63). When the result of judgment proves that the flag LEFLG is not cleared, it indicates engagement of the clutch 15 up to the LE point, and the program returns to the main flow. On the other hand, when the result of judgment proves that the flag LEFLG is cleared, the clutch 15 is engaged up to the $L_E$ point (step S64), and, after setting the flag LEFLG=1 (step S65), the program returns to the main flow.

After completion of the CLLE routine, judgment is made as to whether or not a flag ONFLG, which is set when engagement of the clutch 15 is started at the time of starting the vehicle on a descent, is cleared (step S66). When the result of judgment proves that the flag ONFLG is not cleared, judgment is made as to whether or not the accelerator opening is more than 10% (step S67). On the other hand, when the result of judgment proves that the flag ONFLG is cleared, judgment is made as to whether or not the clutch rotation speed NcL is lower than a first predetermined setting (step S68). When the accelerator opening is more than 10%, judgment is made as to whether or not the clutch rotation speed NcL is lower than a second predetermined setting larger than the first predetermined setting (step S69), and, when the clutch rotation speed NcL is lower than the second predetermined setting, the flag ONFLG is cleared (step S70). When the accelerator opening is less than 10%, judgment is made as to whether or not the clutch rotation speed NcL is lower than a third predetermined setting smaller than the first predetermined setting (step S71), and, when the clutch rotation speed NcL is lower than the third predetermined setting, the flag ONFLG is cleared (step S70). When the clutch rotation speed NcL is higher than the first and third predetermined settings, judgment is made as to whether or not the flag ONFLG is cleared (step S72) as shown in FIG. 7(c). When the result of judgment proves that the flag ONFLG is cleared, judgment is made as to whether or not a time-lag counter NcNT has counted 80 after the vehicle has started to run on the descent (step S73). When the count of the counter NCNT is 80, the counter NCNT is reset to 0 (step S74), and judgment is made as to whether or not the amount of change ΔNcL of the clutch rotation speed NcL is equal to or more than 20 rpm (step S75). On the other hand, when the count of the counter NCNT does not attain 80, the counter NCNT counts one (step S76), and the flag ONFLG is cleared. When the amount of change NcL of the clutch rotation speed NcL is equal to or more than 20 rpm, and the vehicle has started to run on the descent, the flag ONFLG is set at 1 (step S77), and engagement of the clutch 15 is started, while when the amount of change ΔNcL of the clutch rotation speed NcL is less than 20 rpm, the flag ONFLG is cleared. On the other hand, when the result of judgment as to whether or not the flag ONFLG is cleared proves that the flag ONFLG is not cleared, the counter NCNT is reset to 0 (step S78), and the flag ONFLG is set at 1. After setting the flag ONFLG at 1, judgment is made as to whether or not the accelerator opening is less than 10% (step S79). When the result of judgment is less than 10%, an accelerator pseudo signal voltage $V_{AC}$ equal to an idling equivalent voltage of 1 volt is generated (step S80), and this step S80 is followed by a clutch duty signal output step described later. On the other hand, when the result of judgment proves that the accelerator opening is more than 10%, the step S79 is directly followed by the clutch duty signal output step described later. After the flag is cleared because the clutch rotation speed NcL is lower than the settings or because the counter NCNT counts one, judgment is made as to whether or not the accelerator opening is more than 10% (step S81). When the result of judgment proves that the accelerator opening is more than 10%, judgment is made as to whether or not the engine rotation speed $N_E$ has attained its peak point at the vehicle starting time, and a flag PFLG is cleared (step S82). On the other hand, when the result of judgment proves that the accelerator opening is not more than 10%, the flag PFLG is cleared, and, also, a flag VFLG, which is set when a voltage $V_A$ corresponding to an accelerator opening of 50% appears at the time at which the engine rotation speed $N_E$ attains its peak point at the vehicle starting time, is cleared (steps S83 and S84). Then, an output timing counter VCNT for counting the timing of generation of the accelerator pseudo signal voltage $V_{AC}$ at the vehicle starting time is set at 10 (step S85), and a target stroke of the clutch 15 is set at the value corresponding to the $L_E$ point (step S86). The step S86 is followed by a step (described later) in which judgment is made as to whether or not the amount of change $\Delta N_E$ of the engine rotation speed $N_E$ is equal to or more than 40 rpm. (Refer to h in FIGS. 7(b) and 7(d).) When the flag PFLG is cleared, the step S82 is followed by a $V_{AC}$ MAKE1 routine (step S87), while when the flag PFLG is not cleared, judgmnt is made as to whether of not the flag VFLG is cleared (step S88). When the result of judgment proves that the flag VFLG is cleared, the step S88 is followed by a step (described later) in which judgment is made as to whether or not the accelerator opening is less the 10%. (Refer to i in FIGS. 7(b) and 7(d).). On the other hand, when the result of judgment proves that the flag VFLG is not cleared, the step S88 is followed by a step (described later) in which the accelerator pseudo signal voltage $V_{AC}$ is replaced by ($V_A - \Delta V$), where $V_A$ is the present accelerator-opening equivalent voltage and $\Delta V$ is an accelerator differential voltage. (Refer to ⓙ in FIGS. 7(b) and 7(e).)

As shown in FIG. 7(b), in the $V_{AC}$ MAKE1 routine, judgment is made as to whether or not the count of the counter VCNT is 10 (step S89). When the count of the counter VCNT does not attain 10, the counter VCNT counts one (step S90), and the program returns to the main flow. On the other hand, when the count of the counter VCNT is 10, a target engine rotation speed is computed on the basis of the present accelerator opening equivalent voltage $V_A$ (steps S91). Then, voltage values corresponding to (the target engine rotation speed +250) and (the target engine rotation speed − the present engine rotation speed $N_E$)/100 are written in operation memories $R_0$ and $R_1$ storing output voltage values $V_0$ and $V_1$ of the accelerator pseudo signal voltage respectively (steps S92 and S93). Then, $(V_2+V_1)$ is set in an operation memory $R_2$ (not shown) storing a voltage value $V_2$ (step S94), and the accelerator pseudo signal voltage $V_{AC}$ is set at $(V_0+V_2)$ (step S95). Judgment is then made as to whether or not the accelerator pseudo signal voltage $V_{AC}$ is equal to or less than 51 in an AD value (the idling equivalent voltage of 1 volt) (step S96). When the result of judgment proves that $V_{AC}$ is equal to or less than 51, the accelerator pseudo signal voltage $V_{AC}$ is set at 51 in AD value, and, after resting the counter VCNT to 0, the program returns to the main flow (steps S97 and S98). On the other hand, when the result of judgment proves that the accelerator pseudo signal voltage $V_{AC}$ is more than 51 in AD value, judgment is made as to whether or not the accelerator pseudo signal voltage $V_{AC}$ is equal to or more than 153 (corresponding to 3 volts) in AD value (step S99). When the result of judgment proves that the accelerator pseudo signal voltage $V_{AC}$ is not more than 153, the counter VCNT is reset to 0, and the program returns to the main flow. On the other hand, when the result of judgment proves that the accelerator pseudo signal voltage $V_{AC}$ is more than 153 in AD value, the accelerator pseudo signal voltage $V_{AC}$ is set at 153 in AD value (step S100), and, after resting the counter VCNT to 0, the program returns to the main flow. This V MAKE1 routine functions to increase the engine rotation speed, and the output value of the accelerator pseudo signal voltage $V_{AC}$ is determined in a manner as described below.

An increment or decrement $\Delta V_{AC}/\Delta t$ of the accelerator pseudo signal voltage $V_{AC}$ is computed as follows:

$$\frac{\Delta V_{AC}}{\Delta t} = \beta \times \text{(the target engine rotation speed} - \text{the present engine rotation speed)} \quad (1)$$

Where $\beta$: a proportional constant ($<1$)
Then, the output value of the accelerator pseudo signal voltage $V_{AC}$ is determined as follows:

$$V_{AC} = V_{AC} + \int \frac{\Delta V_{AC}}{\Delta t} dt \quad (2)$$

Where
$V_{AC}$: a voltage corresponding to (the target engine rotation speed $+\alpha$) under a no-loaded condition
Where $\alpha$: a constant determined from the decrease in engine rotation speed Ne arising from clutch engagement.

An unnecessary increase of the engine rotation speed can be prevented by determining the accelerator pseudo signal voltage $V_{AC}$ in the manner described in the $V_{AC}$ MAKE1 routine, thereby approaching the engine rotation speed $N_E$ to its target rotation speed.

Figure 14:
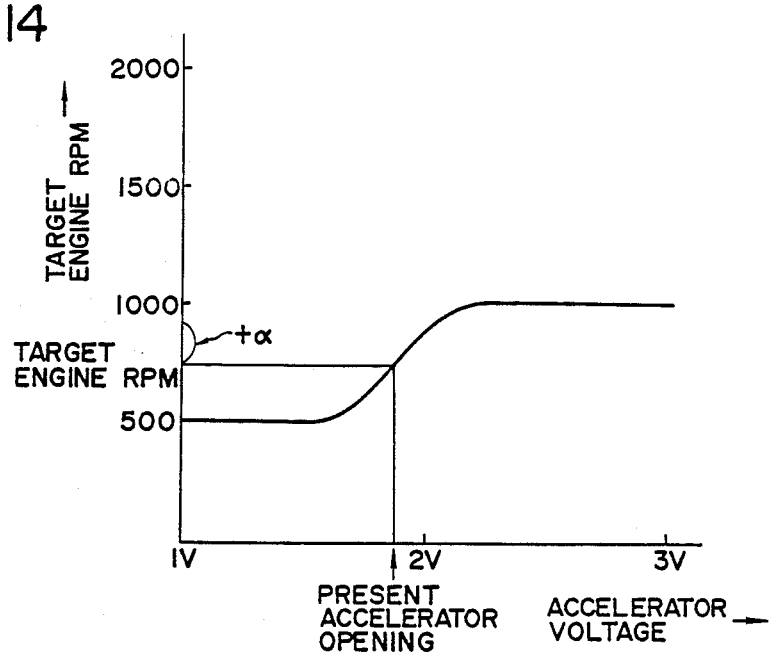
FIG. 14 is a graph showing a target engine rotation speed corresponding to an accelerator opening in a modification of first embodiment.
Figure 15:
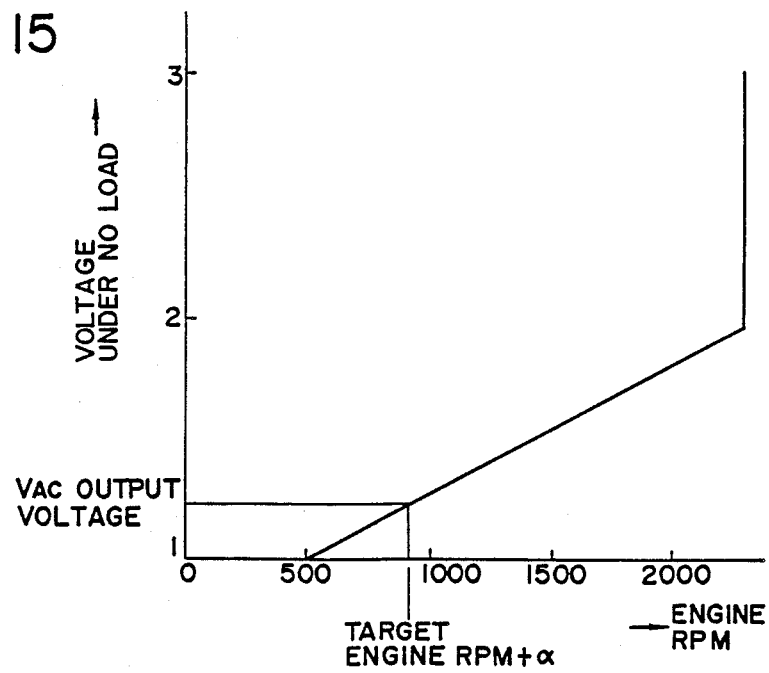
FIG. 15 is a graph showing the relation between the engine rotation speed and a voltage value indicative of the engine rotation speed under a no-loaded condition in the modification.
Figure 16:
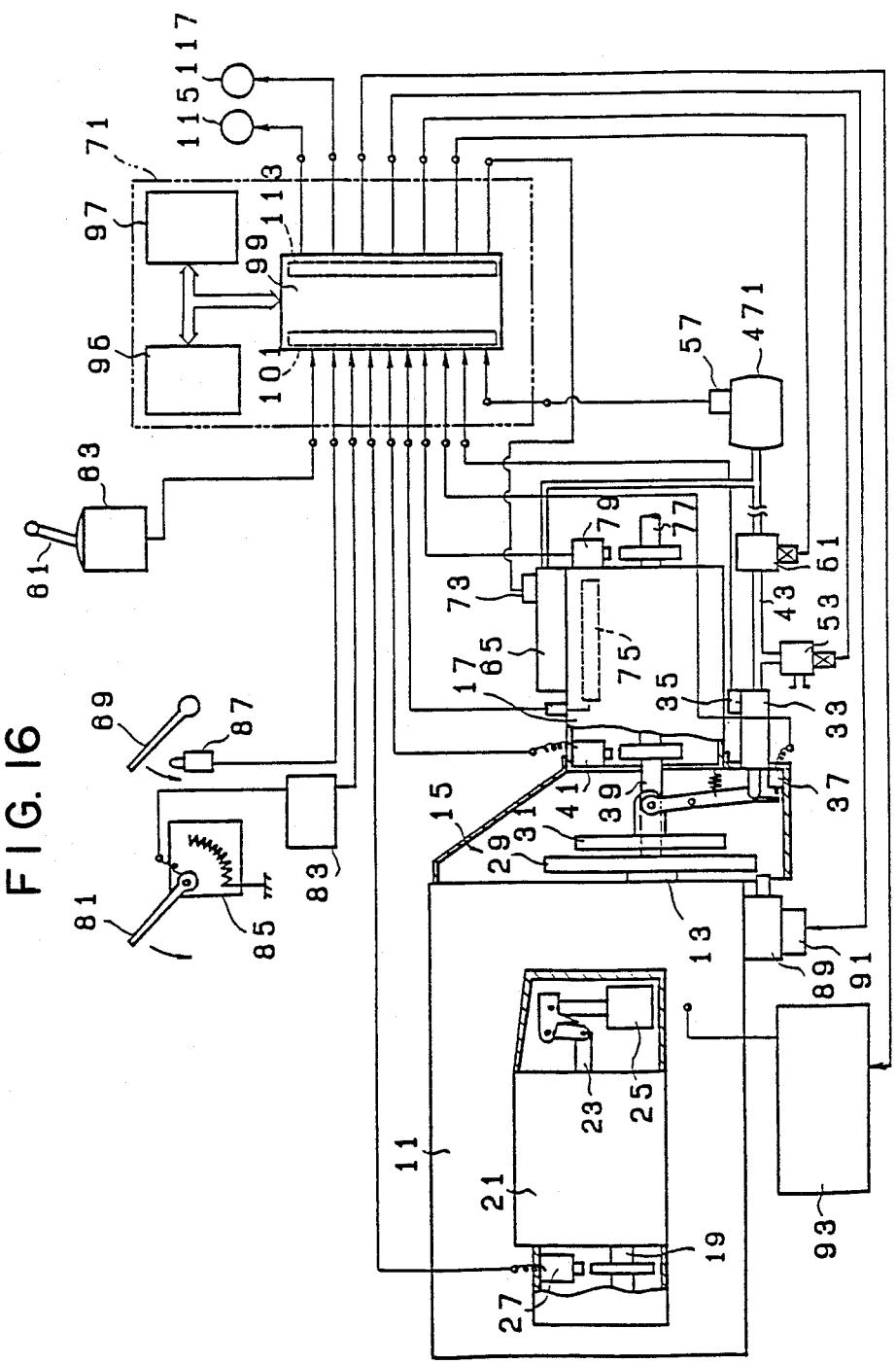
FIG. 16 shows schematically the structure of a second embodiment of the automatic transmission system according to the present invention.

The $V_{AC}$ MAKE1 routine described above has referred to the case where the output value of the accelerator pseudo signal voltage $V_{AC}$ is determined by the equation (2) as the sum of the voltage corresponding to (the target engine rotation speed $+\alpha$) under a no-loaded condition and the integral of the increment or decrement of $V_{AC}$ expressed by the expression (1). In lieu of the above computation, $V_{AC}$ may be determined in a manner as described below. That is, as shown in FIG. 14, a target engine rotation speed to be used in a low-speed starting control routine is previously determined in relation to the accelerator opening determined by the depression of the accelerator pedal 81 by the driver. The constant $\alpha$, which is determined by taking into account a decrease of the engine rotation speed $N_E$ due to engagement of the clutch 15, is added to the target engine rotation speed shown in FIG. 14, and the sum is selected. Then, as shown in FIG. 15, the voltage corresponding to (the target engine rotation speed $+\alpha$) is generated as the accelerator pseudo signal voltage $V_{AC}$, so as to increase the engine rotation speed $N_E$. Subsequently, the clutch 15 may be gradually engaged under duty control.

Upon completion of the $V_{AC}$ MAKE1 routine (step S87), a clutch duty signal corresponding to the accelerator pseudo signal voltage $V_{AC}$ is generated (step S101), and judgment is made as to whether or not the engine rotation speed $N_E$ has been decreased by 30 rpm from the peak point (step S102). When the result of judgment proves that the engine rotation speed $N_E$ has not been decreased, the program returns to the step S47 where judgment proves that the engine rotation speed $N_E$ has been decreased by 30 rpm from the peak point, the MVQ 111 is turned off to hold the rotation of the clutch 15, and, by judging that the engine rotation speed $N_E$ has attained its peak point at the vehicle starting time (PFLG←1), the count of the counter VCNT is set at 50 (steps S103 to S106). The peak point appears since the rotation speed of the output shaft 13 of the engine 11 decreases when the input shaft 39 of the gear transmission 17, to which the rotation of the engine output shaft 13 is connected through the clutch 15, starts to transmit drive force to the driving wheels. (Refer to FIG. 10.)

Figure 13:
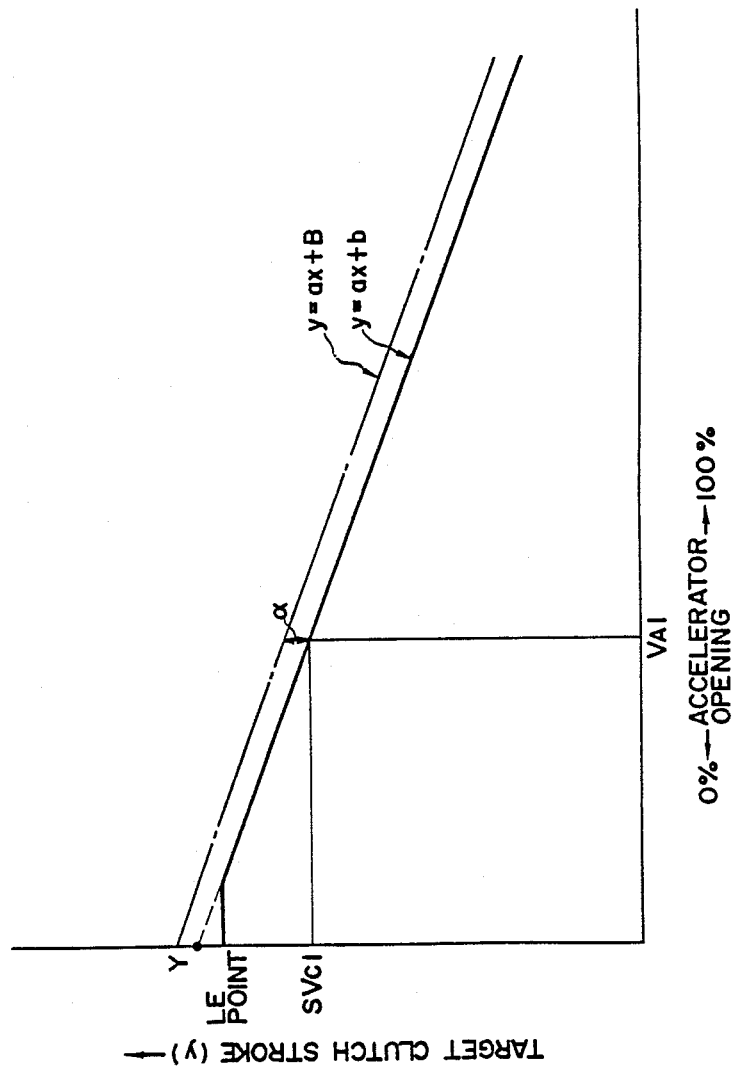
FIG. 13 is a graph showing the relation between a target clutch stroke and the accelerator opening in the first embodiment at the vehicle starting time.

Then, as a vehicle-starting state change-over function, judgment is made as to whether or not the accelerator opening is more than 50% (step S107). When the result of judgment proves that the accelerator opening is more that 50%, the difference between the present accelerator opening equivalent voltage $V_A$ and the accelerator pseudo signl voltage $V_{AC}$ is taken as the accelerator differential voltage $\Delta V$ (step S108), and it is judged that the present accelerator opening equivalent voltage $V_A$ corresponds to an accelerator opening of more than 50% when the peak point of the engine rotation speed $N_E$ is reached at the vehicle starting time (VFLG=1) (step S109). The step S109 is followed by a step (described later) in which the accelerator pseudo signal voltage $V_{AC}$ is replaced by $(V_A-\Delta V)$. Steps starting from the step where the accelerator pseudo signal voltage $V_{AC}$ is replaced by $(V_A-\Delta V)$, are an ordinary control routine. On the other hand, when the accelerator opening is less than 50%, the flag VFLG is cleared (step S110), and judgment is made in step S111 in FIG. 7(d) as to whether or not the accelerator opening is less than 10% steps starting from the step where whether the accelerator opening is less than 10% or not is judged, are a slow-speed starting control routine. When the result of judgment made in step S88 as to whether or not the flag VFLG is cleared proves that the flag VFLG is cleared, judgment is made as to whether or not the accelerator opening is less than 10%. When the accelerator opening is less than 10%, a target stroke of the clutch 15 is computed, and a target engine rotation speed is computed (steps S112 and S113). Then, judgment is made as to whether or not the amount of change $\Delta N_E$ of the engine rotation spee $N_E$ per 50 msec is equal to or more than 40 rpm (step S114). This judgment as to whether or not the amount of change $\Delta N_E$ is equal to or more than 40 rpm is made after the afroementioned step where the $L_E$ point is selected as the target stroke of the clutch 15. On the other hand, when the accelerator opening is more than 10%, judgment is made as to whether or not the absolute value of the difference between the engine rotation speed $N_E$ and the clutch rotation speed NcL is equal to or less than 50 rpm (step S115). When the result of judgment proves that the difference is more than 50 rpm, the target stroke of the clutch 15 is computed, while when the result proves that the difference is equal to or less than 50 rpm, a clutch duty signal is generated (step S116). This clutch duty signal output step is followed by a clutch engagement function in the low-speed starting control routine. Further, this clutch duty signal output step is carried out, when the accelerator pseudo signal voltage $V_{AC}$ of 1 volt is generated, and the accelerator opening is more than 10% as described above. The aforementioned target clutch stroke computation step provides a target clutch stroke (designated by y herein) will be described with reference to FIG. 13.

(1') On the basis of the accelerator opening (designated by $V_{A1}$) at the peak point of the engine rotation speed $N_E$ and the clutch stroke (designated by $SV_{C1}$), a y-intercept b of a linear equation $Y=ax+b$ is computed, where
a: a constant and b: variable.

$$b=SV_{C1}-aV_{A1}.$$

(2) In order that the clutch 15 may not tend to be engaged to cause engine stalling when, for example, the engine rotation speed $N_E$ becomes low after the peak point, a correction factor+ is used to replace the y-intercept b by B, as follows:

$$B=SV_{C1}=aV_{A1}+\alpha.$$

(3) The clutch 15 is placed in a slipping state when the Y-intercept b passes a point (designated by Y) where the clutch 15 tends to slip. Therefore, B is set at B=Y.

From the above conditions 1, 2 and 3, the target clutch stroke y is given by $$Y=ax+SV_{C1}-aV_{A1}+\alpha$$

or $$Y=ax+Y$$

and stalling of the engine 11 and slipping of the clutch 15 do not occur at the peak point of the engine rotation speed.

Returning to the flow chart, judgment is made as to whether or not the clutch 15 is engaged after generation of the clutch duty signal (step S117). When the result of judgment proves that the clutch 15 is not engaged, the step S117 is followed by the aformentioned step in which the flag ENSTFLG is set at ENSTFLG=1. On the other hand, when the result of judgment proves that the clutch 15 is engaged, the exhaust brake release relay is turned off, and a time lag for releasing the accelerator pseudo signal voltage $V_{AC}$ is set (steps S118 and S119). Then, a $V_{AC}$ stepwise release rountine (step S120) is run in which the accelerator pseudo signal voltage $V_{AC}$ is released stepwise. This $V_{AC}$ stepwise release routine including steps S120 to S127 provides a function for releasing the accelerator pseudo signal voltage stepwise.

In this $V_{AC}$ stepwise release routine, a clutch load signal voltage $V_A$ appearing at the time of complete engagement of the clutch 15 is read, and the accelerator pseudo signal voltage $V_{AC}$ is increased for a predetermined period of time by an amount corresponding to $\frac{1}{8}$ of the difference between $V_A$ and $V_{AC}$. This operation is repeated until the value obtained by subtracting a newest accelerator pseudo signal voltage $V_{AC}$ from a newest accelerator opening equivalent voltage $V_A$ becomes smaller than $\frac{1}{8}$ of the value obtained by subtracting from the newest accelerator opening equivalent voltage $V_A$, an accelerator opening equivalent voltage $V_A$ acting on the electromagnetic actuator 25 at the position of the control rack 23 corresponding to the idling rotation of the engine 11. When such time is reached, the accelerator pseudo signal voltage $V_{AC}$ is released, and the program returns to the main flow. In this manner, the output signal applied to the electromagnetic actuator 25 is increased stepwise without immediately raising its level to the level of the accelerator opening equivalent voltage $V_A$, so as to alleviate the shock. After releasing the accelerator pseudo signal voltage $V_{AC}$ stepwise, a slip routine (step S128) computing the amount of wear of the clutch 15 is run. In the slip routine including steps S128 to S131, judgment is made as to whether or not the value of (the engine rotation speed $N_E$—the clutch rotation speed NcL)/the engine rotation speed $N_E$ is equal to or more than 50%. When this value is equal to or more than 50%, the clutch warning lamp 117 is energized, and the program returns to the main flow. On the other hand, when this value is less than 50%, the clutch warning lamp 117 is not energized, and the program returns to the main flow. Upon completion of this slip routine, a flag LEFLG is cleared (step S132) to complete the vehicle starting routine.

When the amount of change $\Delta N_E$ of the engine rotation speed $N_E$ per 50 msec is equal to or more than 40 rpm, a clutch off-duty signal is generated (step S133), and judment is made as to whether or not the accelerator opening is more than 10% (step S142). When the result of judgment proves that the accelerator opening is not more than 10%, the accelerator pseudo signal voltage $V_{AC}$ is set at 51 in AD value, and the flag ENSTFLG is set at ENSTFLG=1 as described already (step S134). On the other hand, when the result of judgment proves that the accelerator opening is equal to or more than 10%, a $V_{AC}$ MAKE2 routine (step S135) is run, and then, the flag ENSTFLG is similarly set at ENSTFLG=1. In the $V_{AC}$ MAKE2 routine, when the count of the counter VCNT is 50 (step S280), the target engine rotation speed is computed on the basis of the present accelerator opening equivalent voltage $V_A$ computed in the $V_{AC}$ MAKE1 routine (step S91). On the other hand, when the count of the counter VCNT is other than 50, the counter VCNT counts one, and the program returns to the main flow. This $V_{AC}$ MAKE2 routine provides a function of generating a low-speed-starting accelerator pseudo signal voltage, and, since the counter of the counter VCNT is set at 50, the output timing of the accelerator pseudo signal voltage becomes longer than that determined in the $V_{AC}$ MAKE1 routine. When the amount of change $\Delta N_E$ of the engine rotation speed $N_E$ is not more than 40 rpm, judgment is made as to whether or not the engine rotation speed $N_E$ at the vehicle starting time is equal to or lower than 400 rpm ($N_E$ FLG=1) (step S136). When the engine rotation speed $N_E$ at the vehicle starting time is equal to or lower than 400 rpm, judgment is made as to whether or not the engine rotation speed $N_E$ is equal to or lower than 410 rpm (step S137). When the engine rotation speed $N_E$ is equal to or lower than 410 rpm, the aforementioned step of generating the clutch off-duty signal is executed, and the clutch disc 31 of the clutch 15 is caused to stroke away from the flywheel 29. When the engine rotation speed $N_E$ is higher than 410 rpm, the flag N FLG is cleared (step S139). On the other hand, when the engine rotation speed $N_E$ at the vehicle starting time is higher than 400 rpm, judgment is made as to whether or not the engine rotation speed $N_E$ is equal to or lower than 400 rpm (step S139). When the engine rotation speed $N_E$ is higher than 400 rpm, the flag $N_E$FLG is cleared, while when the engine rotation speed $N_E$ is equal to or lower than 400 rpm, the clutch off-duty signal is generated, and the flag N FLG is set at $N_E$FLG=1 (step S140 and S141). The step S141 is followed by step s142 where judgment is made as to whether or not the accelerator opening is more than 10%. The aforementioned steps starting from the step of judgment as to whether the flag $N_E$ FLG is 1 or not provide a function of engine rotation speed judgment, and the rotation speed of 400 rpm is the lower limit. After clearing the flag $N_E$FLG, judgment is made as to whether or not the clutch stroke is equal to its target value (step S143). When the clutch stroke is larger than the target value, a clutch duty signal is generated (step S144) to cause the clutch disc 31 of the clutch 15 to stroke toward the flywheel 29, and the aforementioned step is followed in which judgment is made as to whether or not the accelerator opening is more than 10% (step S145), and, when the accelerator opening is more than 10%, the clutch off-duty signal is generated to cause the clutch disc 31 of the clutch 15 to stroke away from the flywheel 29 (step S146). The above step is followed by the aforementioned step in which judgment is made as to whether or not the accelerator opening is more than 10%. When the accelerator opening is not more than 10%, the aforementioned step of generating the clutch off-duty signal when the engine rotation speed $N_E$ is equal to or lower than 410 rpm is carried out to cause the clutch disc 31 of the clutch 15 to stroke away from the flywheel 29, and this step is followed by the aforementioned step in which judgment is made as to whether or not the accelerator opening is more than 10%. Further, when the clutch stroke becomes equal to the target value, the air cylinder 33 provided for engaging the clutch 15 is held in its present state (step S147), and judgment is made as to whether or not the accelerator opening is more than 10%.

On the other hand, after setting the flag VFLG at VFLG=1 in the aforementioned step S109, the accelerator pseudo signal voltage $V_{AC}$ is replaced by the value obtained by subtracting $\Delta V$ from the present accelerator opening equivalent voltage $\overline{V}A$ (step S148). This replacement is also done when it is judged that the flag VFLG is not cleared, and this processing provides a function of generating an ordinary accelerator pseudo signal voltage. (Refer to j in FIGS. 7(b) and 7(e).) Then, judgment is made as to whether or not the absolute value of the difference between the engine rotation speed $N_E$ and the clutch rotation speed NcL is equal to or less than 30 rpm (step S149). When this difference is equal to or less than 30 rpm, it is judged that synchronization is attained between the engine rotation speed $N_E$ and the clutch rotation speed NcL, and a clutch-ON signal is generated (step S150). Then, judgment is made as to whether or not the clutch 15 is engaged (step S117). This clutch-ON signal output step provides a function of clutch engagement in an ordinary starting case. When the absolute value is larger than 30 rpm, judgment is made as to whether or not the flag $N_E$ FLG is $N_E$FLG=1, that is, whether or not the engine rotation speed $N_E$ at the vehicle starting time is equal to or lower than 400 rpm (step S151). When the flag is $N_E$FLG=1, judgment is made as to whether or not the engine rotation speed $N_E$ is equal to or lower than 410 rpm (step S152). When the engine rotation speed N is equal to or lower than 410 rpm, the clutch off-duty signal is generated (step S153), and the aforementioned step of judging as to whether the flag ENSTFLG=1 is followed. When the engine rotation speed $N_E$ exceeds 410 rpm, the flag ENSTFLG is cleared (step s154). When the flag $N_E$ FLG is not $N_E$FLG=1, judgment is made as to whether or not the engine rotation speed $N_E$ is equal to or lower than 400 rpm (step S155). When the engine rotation speed $N_E$ is equal to or lower than 400 rpm, a clutch off-duty signal is generated (step S156) to cause the clutch disc 31 of the clutch 15 to stroke away from the flywheel 29, and, after setting the flag $N_E$FLG at $N_E$ FLG=1 (step S157), the aforementioned step of judging as to whether or not the flag is ENSTFLG=1 is carried out. When the engine rotation speed $N_E$ is higher than 400 rpm, the flag $N_E$FLG is cleared (step S154). Steps starting from the aforementioned step of judging as to whether the flag $N_E$FLG is 1 or not provide the function of engine rotation speed judgment, and the rotation speed of 400 rpm is the lower limit. After clearing the flag $N_E$FLG, judgment is made as to whether or not the amount of change $\Delta N_E$ of the engine rotation speed per 50 msec is equal to or less than $-5$ rpm (step S158). When the amount of change $\Delta N_E$ is equal to or less than $-5$ rpm, it is regarded that the amount of change $\Delta N_E$ increases at the vehicle starting time (a flag XFLG=1), and judgment is made as to whether or not the amount of change $\Delta N_E$ is equal to or more than $-5$ rpm (steps S159 and S160). When the amount of change $\Delta N_E$ is not more than $-5$ rpm, that is, when the engine rotation speed $N_E$ does not sharply decrease, a clutch re-duty signal is generated to gradually engage the clutch 15 (step S161), and this step is followed by the aforementioned step of judging as to whether the flag ENSTFLG is 1 or not. When the amount of change $\Delta N_E$ of the engine rotation speed $N_E$ per 50 msec is equal to or more than $-5$ rpm, that is, when the engine rotation speed $N_E$ decreases sharply, the flag XFLG is cleared (step S162), and the air cylinder 33 provided for engaging the clutch 15 is held in its existing state (step S163). This step is followed by the aforementioned step of judging as to whether the flag ENSTFLG is 1 or not. On the other hand, when the result of judgment in the step S158 proves that the amount of change $\Delta N_E$ is more than $-5$ rpm, judgment is made as to whether the flag XFLG is 1 or not (step S164). When the flag XFLG is XFLG=1, the aforementioned judgment is made as to whether or not the amount of change $\Delta N_E$ is equal to or more than $-5$ rpm, while when the flag XFLG is not 1, judgment is made as to whether or not the amount of change $\Delta N_E$ is equal to or more than 30 rpm (step S165). When the amount of change $\Delta N_E$ is equal to or more than 30 rpm, it is judged that the amount of change $\Delta N_E$ at the vehicle starting time has sharply decreased (a flag YFLG=1), and judgment is made as to whether or not the amount of change $\Delta N_E$ is equal to or less than 30 rpm (steps S166 and S167). When the amount of change $\Delta N_E$ is not more than 30 rpm, judgment is made as to whether the flag YFLG is 1 or not (step S168). When the flag YFLG is 1, judgment is made as to whether or not the amount of change $\Delta N_E$ is equal to or less than 30 rpm (step S168), when the flag YFLG is not 1, the air cylinder 33 for engaging the clutch 15 is operated in its existing state (step S163), and the aforementioned step of judging as to whether the flag ENSTFLG is 1 or not is carried out. When the amount of change $\Delta N_E$ of the engine rotation speed $N_E$ per 50 msec is equal to or less than 30 rpm, the flag YFLG is cleared (step S169), and the air cylinder 33 for engaging the clutch 15 is operated in its existing state, and the aforementioned step of judging as to whether the flag ENSTFLG is 1 or not is carried out. When the amount of change $\Delta N_E$ is more than 30 rpm, a clutch off-duty signal is generated to disengage the clutch 15 relatively quickly (step S170), and the aforementioned step of judging as to whether the flag ENSTFLG is 1 or not is carried out.

Figure 8:
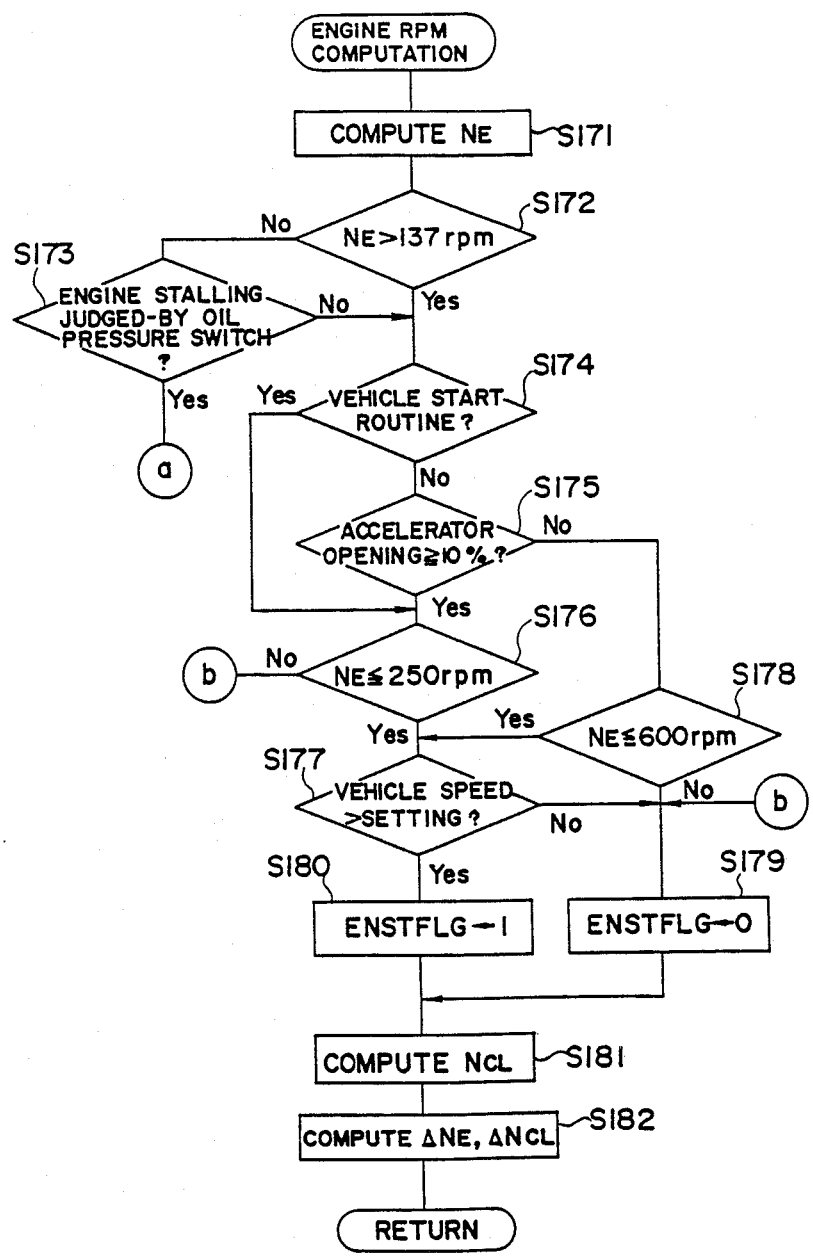
Figure 9A:
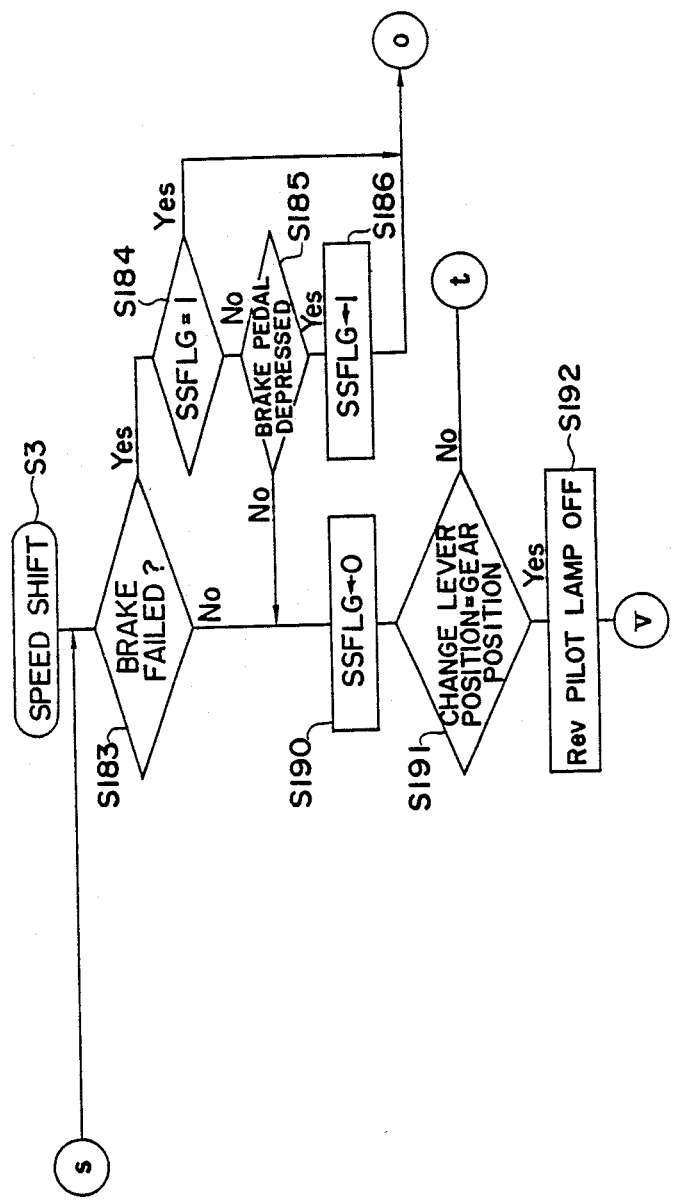
Figure 9B:
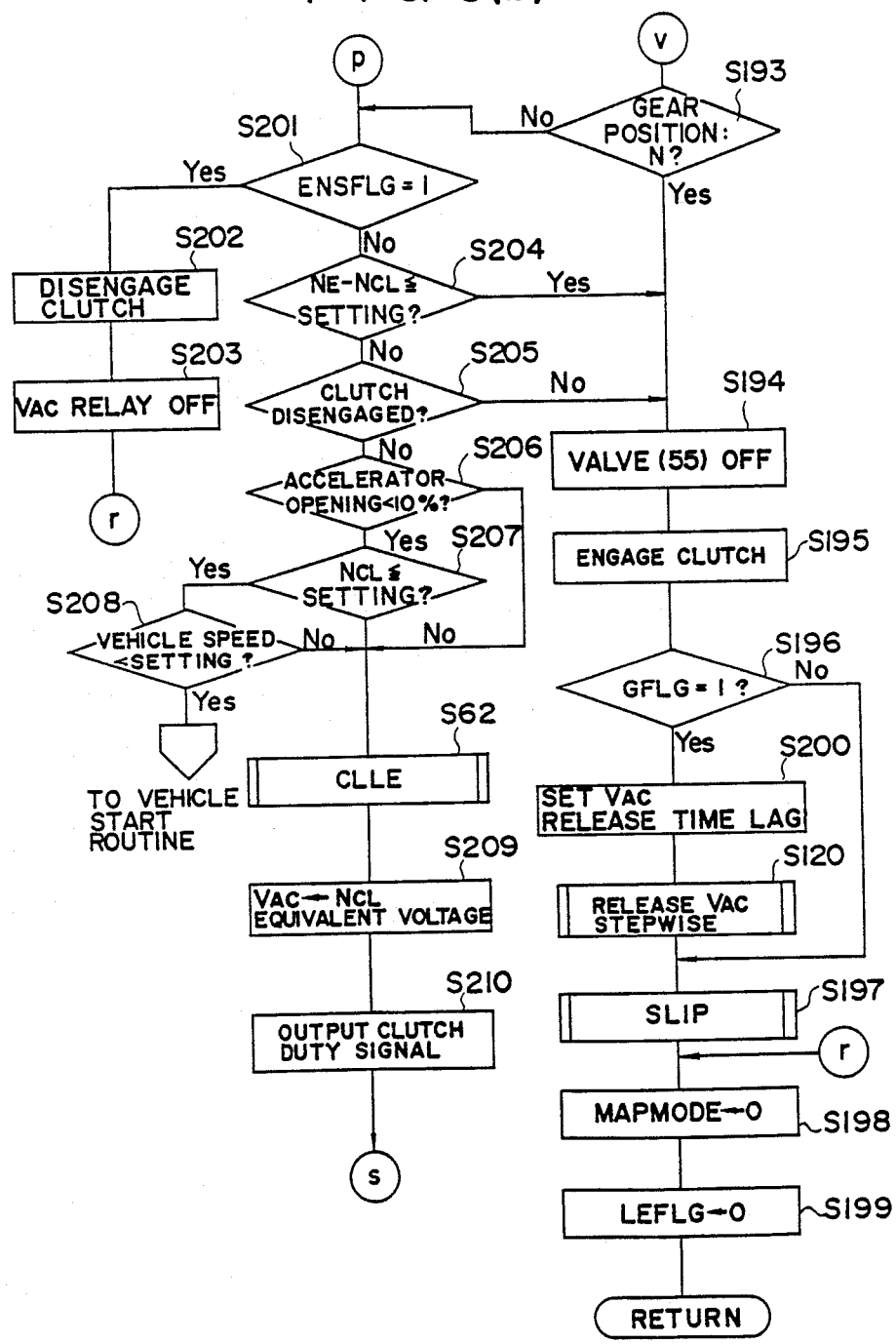
Figure 9C:
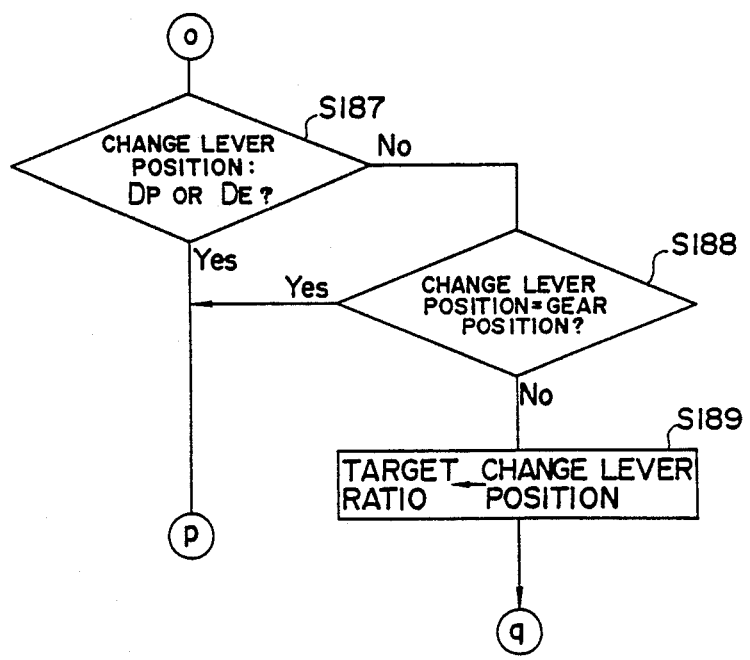
Figure 9D:
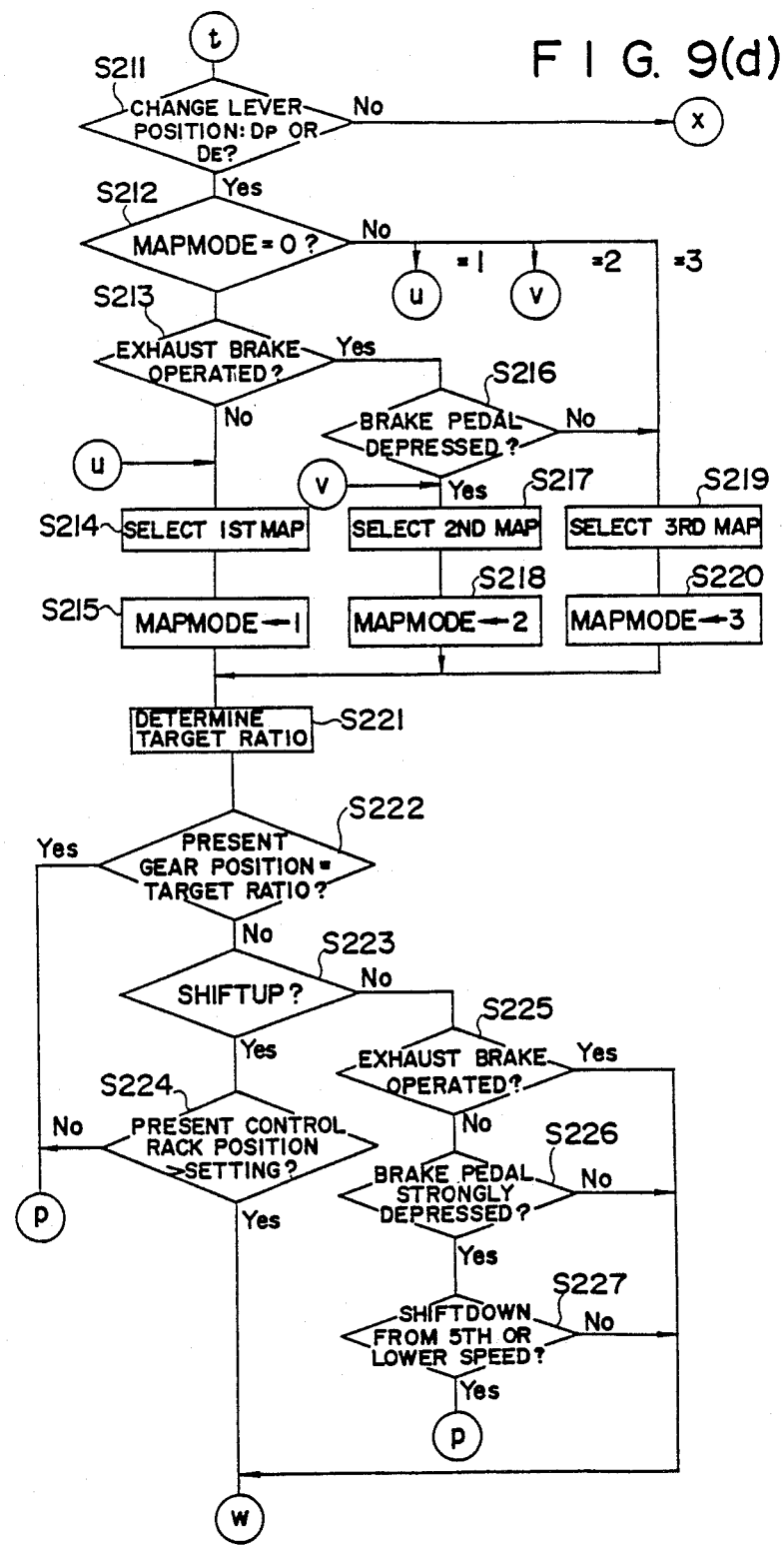
Figure 9E:
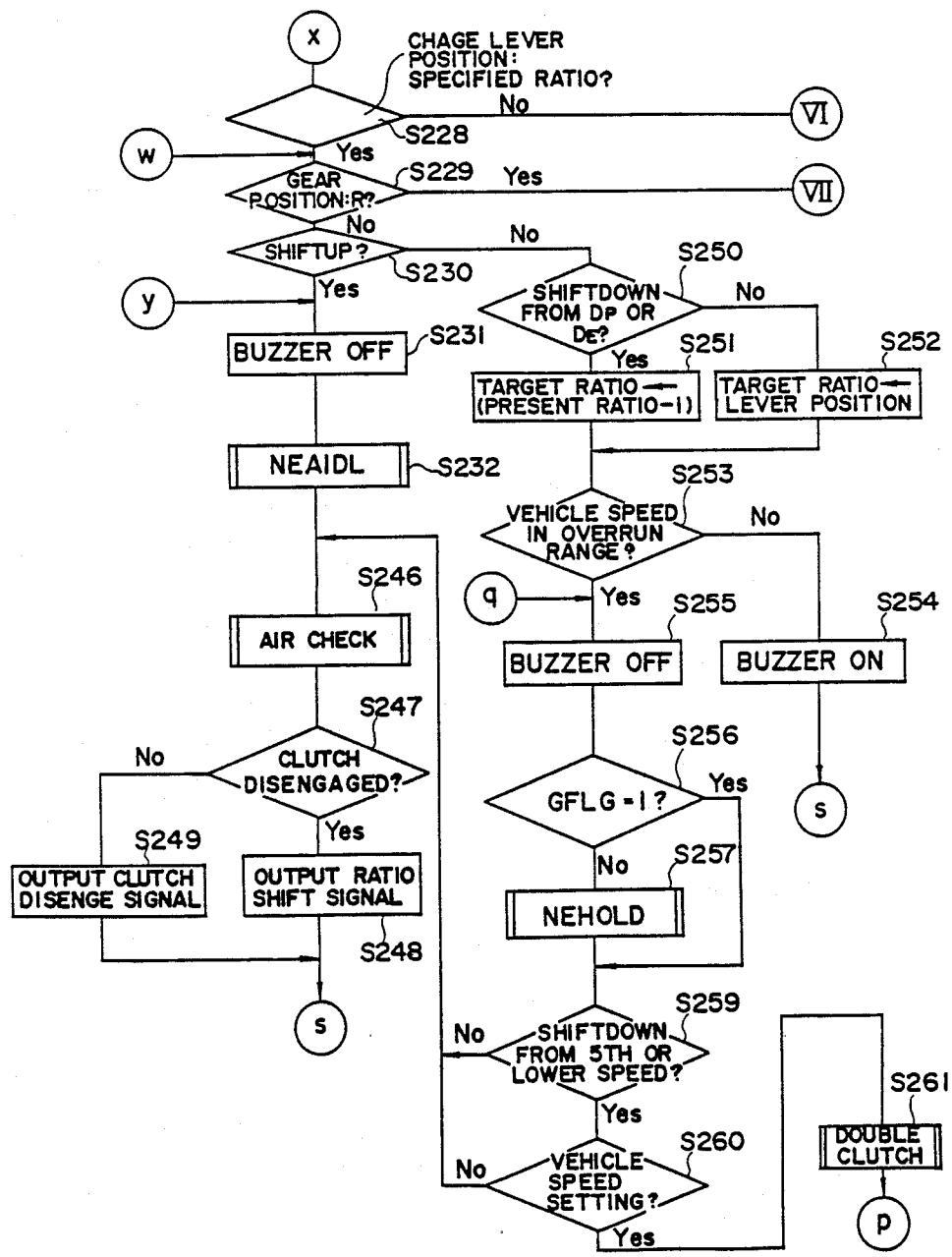
Figure 9F:
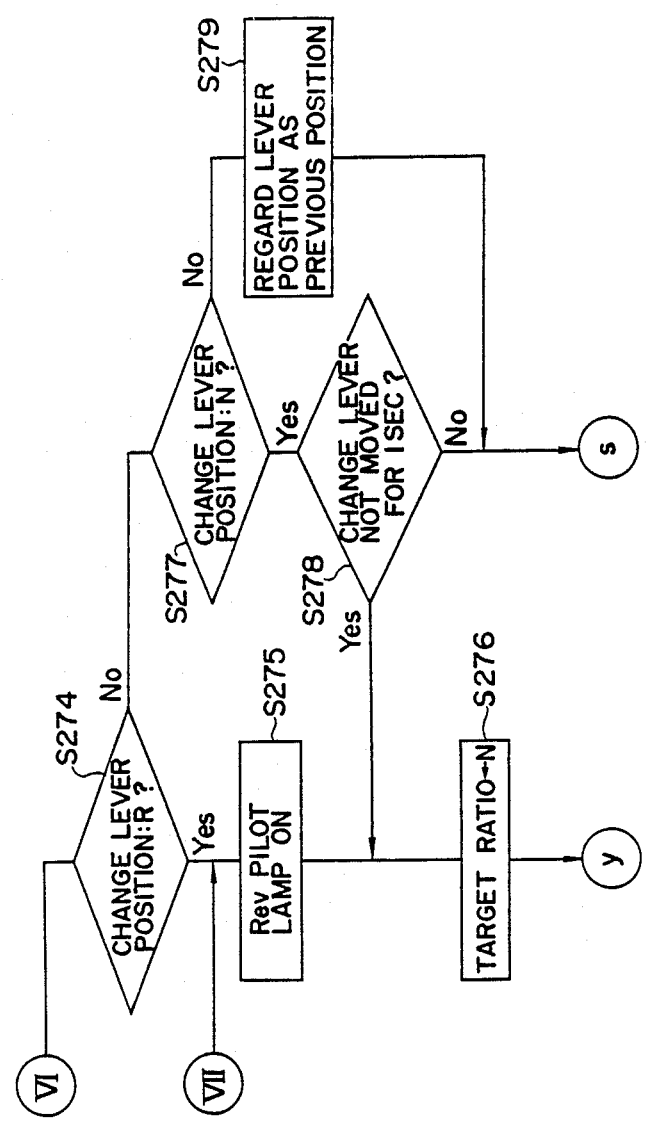
Figure 9G:
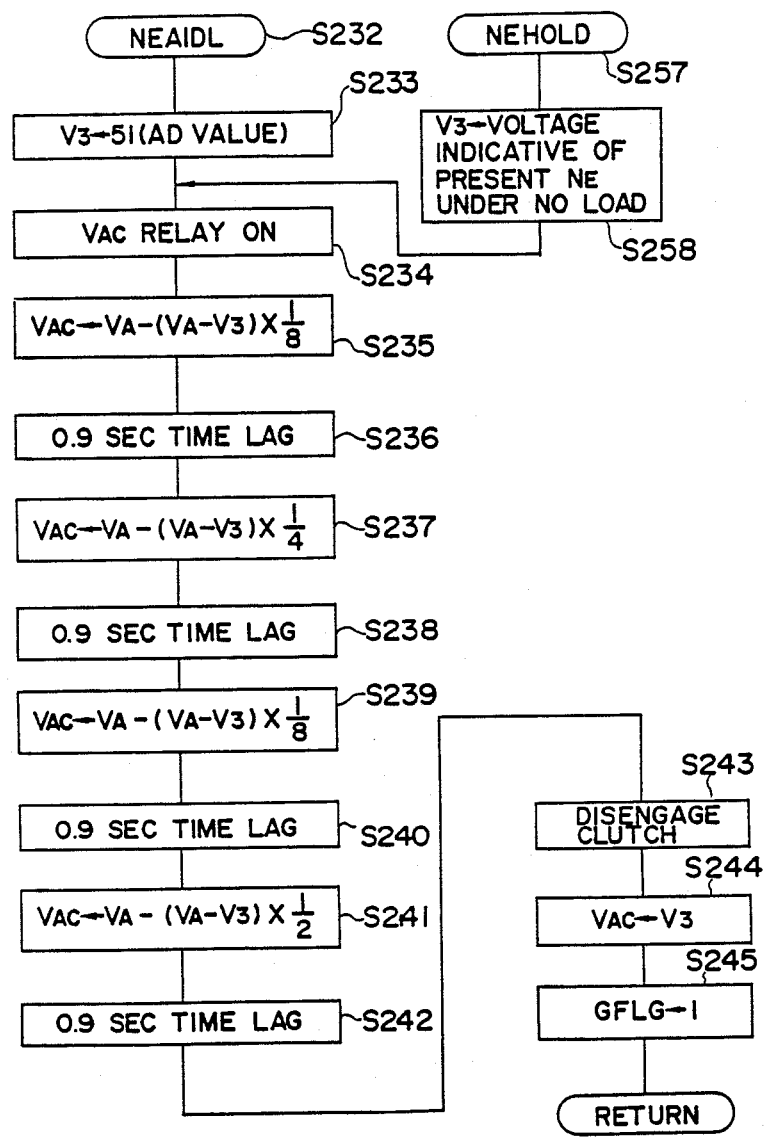
Figure 9H:
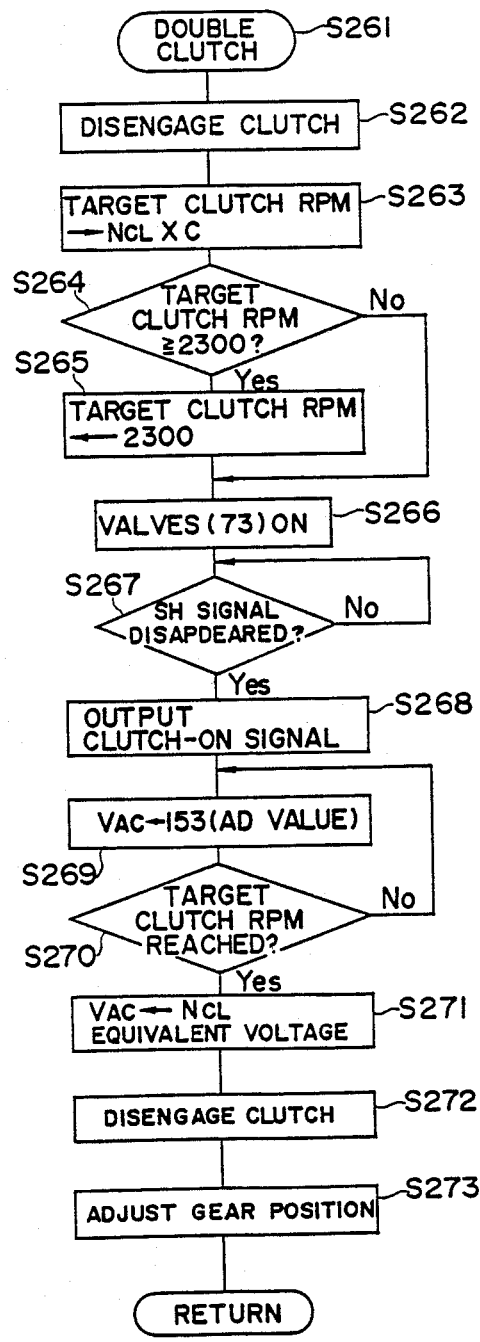

In the meantime, an engine rotation speed computation routine as shown in FIG. 8 is executed at a suitable position in the flow described above. First, engine rotation speed $N_E$ is computed, and judgment is made as to whether or not the engine rotation speed $N_E$ is higher than 137 rpm (steps S171 and S172). When the engine rotation speed $N_E$ is lower than 137 rpm, an oil pressure gauge switch (not shown) is monitored to judge as to whether or not the engine is stalled (step S173). When the engine is stalled, the aforementioned step of initialization prior to the engine starting is carried out. When the engine rotation speed $N_E$ is higher than 137 rpm and when monitoring on the oil pressure gauge switch does not indicate stalling of the engine, judgment is made in step S174 as to whether or not the vehicle starting routine is being executed. When the result of judgment proves that the vehicle is not in the starting stage, that is, when the vehicle is in its ordinary running mode, judgment is made as to whether or not the accelerator opening is equal to or not the accelerator opening is equal to or more than 10% (step S175). When the accelerator opening is equal to or more than 10% and when the vehicle is in its starting stage, judgment is made as to whether or not the engine rotation speed $N_E$ is equal to or lower than 250 rpm (step S176). When the engine rotation speed $N_E$ is equal to or lower than 250 rpm, judgment is made as to whether or not the vehicle speed is lower than a predetermined setting. When the accelerator opening is not more than 10%, judgment is made as to whether or not the engine rotation speed $N_E$ is equal to or lower than 600 rpm (step S178). When the engine rotation speed $N_E$ is equal to or lower than 600 rpm, the step S178 is followed by the step of judging as to whether the vehicle speed is lower than the predetermined setting or not, while when the engine rotation speed $N_E$ is higher than 600 rpm, the flag ENSTFLG is cleared (step S179). When the vehicle speed is lower than the predetermined setting and when the engine rotation speed $N_E$ is higher than 250 rpm, the flag ENSTFLG is cleared, while when the vehicle speed is higher than the predetermined setting, the flag ENSTFLG=1 is set. After clearing the flag ENSTFLG after setting the flag ENSTFLG=1, the clutch rotation speed NcL is computed, and, after computing the amount of change $\Delta N_E$ of the engine rotation speed $N_E$ per 50 msec and the amount of change NcL of the clutch rotation speed NcL per 50 msec (step S181 and S182), the program returns to the main flow.

After completion of the engine starting routine, the speed shift routine (step S3) is run under control of the control unit 71 when the vehicle speed or the clutch rotation speed NcL is higher than a predetermined setting. As shown in FIGS. 9(a) to 9(h), a select signal is applied to the input port 101 to check in step S183 as to whether or not a brake failure is present. When there is a failure in the wheel brakes 107 and the result of checking is YES, judgment is then made as to whether a flag SSFLG is 1 or not (step S184). When there is a failure in the wheel brakes 107 and the flag SSFLG indicative of depression of the brake pedal 69 is 1, judgment is made as to whether the change lever 61 is positioned on the Dp range or $D_E$ range or automatic speed shift (step S187). When the result of judgment is YES, the step S187 is followed by a step of judgment of the flag ENSTFLG described later, and the existing speed ratio is maintained. On the other hand, when the change lever 61 is not positioned on the Dp range or $D_E$ range, that is, when the change lever 61 is positioned on one or the specified ranges of manual speed shift, judgment is made as to whether or not the position of the change lever 61 coincides with the gear position (step S188). When the result of judgment is YES, the step S188 is similarly followed by the step of judgment of the flag ENSTFLG, while when the result of judgment is NO, a speed shift operation as described later is carried out after setting the position of the change lever 61 on the desired speed ratio (step S189). On the other hand, when the result of judgment of the flag SSFLG proves that the flag SSFLG=0, whether the brake pedal 69 is depressed or not is checked (step S185). When the result of checking proves that the brake pedal 69 is depressed, the flag SSFLG is set at SSFLG=1 (step 186), and the step S186 is followed by the aforementioned step S187. On the other hand, when the brake pedal 69 is depressed and when there is no failure in the wheel brakes 107, the flag SSFLG is cleared, and judgment is then made as to whether or not the position of the change lever 61 coincides with the gear position (steps S190 and S191).

When the result of judgment proves that the position of the change lever 61 coincides with the gear position, the Rev pilot lamp is deenergized, and judgment is then made as to whether or not the gear position is N (steps S192 and S193). When the gear position is N, there occurs no problem of synchronization during engagement of the clutch 15. Therefore, after turning off the air tank change-over electromagnetic value 55, the clutch 15 is engaged (steps S194 and S195). Then, when a flag GFLG indicative of generation of the accelerator pseudo signal voltage $V_{AC}$ during a speed shift is 1 or not is checked, and, when the signal voltage $V_{AC}$ is not generated, the program returns to the main flow after immediately checking the clutch 15 for the presence of a slip and clearing a shift-map selector memory MAP- MODE and the flag LEFLG (steps S196 to S199). On the other hand, when the accelerator pseudo signal voltage $V_{AC}$ is generated, the program proceeds after setting a time lag for releasing the accelerator pseudo signal voltage $V_{AC}$ (step S200) and then executing the aforementioned $V_{AC}$ stepwise release routine (step S120).

On the other hand, when the gear position is not N, the step S193 is followed by a flow for attaining synchronization of the clutch 15. First, whether the flag ENSTFLG is 1 or not is checked, and, when the flag ENSTFLG=1, that is, when the engine rotation speed $N_E$ is lower than the engine-stalling preventive rotation speed due to a speed decrease, the clutch 15 is disengaged, and a $V_{AC}$ relay is turned off (steps S210 to S203). Then, after clearing the shift-map selector memory MAPMODE and flag LEFLG as described above, the program returns to the main flow. On the other hand, when the flag ENSTFLG=0, judgment is made as to whether or not the difference between the engine rotation speed $N_E$ and the clutch rotation speed NcL is equal to or smaller than a predetermined setting, that is, whether or not the clutch rotation is synchronized with the engine rotation (step S204). When the result of judgment is YES which proves that the clutch rotation is synchronized with the engine rotation, the clutch 15 is immediately engaged as described above. On the other hand, when the result of judgment is NO, whether the clutch 15 is disengaged or not is checked (step S205). When the result of checking proves that the clutch 15 is engaged, the program returns directly to the aforementioned clutch engagement flow. On the other hand, when the clutch 15 is disengaged, judgment is made as to whether or not the accelerator opening is equal to or less than 10% (step S206). When the result of judgment is YES, that is, when the accelerator pedal 81 is not depressed, the step S206 is followed by the vehicle starting routine, provided that the clutch rotation speed NcL is lower than a predetermined setting, and the vehicle speed is lower than a predetermind setting (steps S207 and S208). On the other hand, when the difference between the engine rotation speed $N_E$ and the clutch rotation speed NcL is larger than the predetermined setting, the CLLE routine is executed to place the clutch 15 in a semi-engaged state. When the accelerator opening is more than 10%, this is interpreted that the driver has the wish to operate the vehicle, and the CLLE routine (step S62) is directly executed without proceeding to the vehicle starting routine. Then, an accelerator pseudo signal voltage $V_{AC}$ corresponding to the clutch rotation speed NcL is generated, and the clutch 15 is engaged at an optimum duty ratio (steps S209 and S210). Then, the program returns to the beginning of the speed shift routine, and the steps described above are repeated until synchronization or engagement of the clutch 15 is attained.

On the other hand, when the result of judgment as to whether or not the position of the change lever 61 coincides with the gear position (step S191) is NO, whether the position of the change lever 61 is on the Dp range or the $D_E$ range is checked (step S211). When the result of checking proves that the Dp range or $D_E$ range is selected, an optimum speed ratio corresponding to the operating condition is selected from among a plurality of pre-set shift maps (step S212). Describing in further detail, the contents of the shift-map selector memory MAPMODE is checked, and, when the content is 0, that is, when none of the shift maps is selected, judgment is made as to whether or not the exhaust brake device (not shown) is operated (step S213). When the exhaust brake device is not operated, the first shift map is selected, and 1 is set in the shift-map selector memory MAPMODE (steps S214 and S215). On the other hand, when the exhaust brake device is operated, whether the brake pedal 69 is depressed or not is further checked in step S216. When the brake pedal 69 is also depressed, the second shift map is selected, and 2 is set in the shift-map selector memory MAPMODE (steps S217 and S218). On the other hand, when the brake pedal 69 is not depressed, the third map is selected, and 3 is set in the shift-map selector memory MAPMODE (steps S219 and S220). Further, when one of the shift maps has been already selected in the speed shift routine being executed, the selected shift map is used in the program. This is because, once the speed shift routine is started and a shift map is selected, the same shift map is to be maintained till the end of the speed shift routine.

Then, a desired speed ratio is determined on the basis of the selected shift map, and judgment is made as to whether or not the present gear position coincides with the desired speed ratio (steps S221 and S222). When the result of judgment proves that the present gear position coincides with the desired speed ratio, the program proceeds to the aforementioned step of judgment of the flag ENSTFLG for maintaining the present speed ratio. On the other hand, when the present gear position differs from the desired speed ratio, judgment is made as to whether the desired speed ratio is high or low relative to the present gear position, that is whether or not a shiftup is to be made (step S223). When the shiftup is required, the speed ratio is shifted only when the position of the control rack 23 of the injection pump 21 is more than a predetermined setting, while when the shiftup is not required, the present speed ratio is maintained without making any speed shift (step S224). Such a judgment is required to prevent making a shiftup in spite of lack of a sufficient margin of the power of the engine 11. On the other hand, even when a shiftdown instead of a shiftup is required, the present speed ratio is maintained without making any speed shift, only when the exhaust brake device is not operated, the brake pedal 69 is strongly depressed, and the shiftdown is a downshift at a speed ratio lower than the 5th speed (steps S225 and S227). The speed ratio is shifted down except the above cases.

When the aforementioned result of judgment as to whether the position of the change lever 61 is on the Dp range or $D_E$ range is NO, judgment is made as to whether or not the position of the change lever 61 is on a forward speed ratio position of the manual range (step S228). When the forward speed ratio is selected, the program proceeds under the condition that the gear position is not R (step S229). Then, judgment is made as to whether or not a shiftup is required (step S230). When the shiftup is required, a buzzer is turned off (step S231), and an NEAIDL routine (step S232) is executed to disengage the clutch 15.

In the NEAIDL routine, a predetermined voltage value $V_3$ corresponding to the idling rotation speed of the engine 11 is written in the third operation memory $R_3$ for accelerator pseudo signal voltage generation purpose and the $V_{AC}$ relay is turned on so that a control signal controlling the control rack 23 can be applied to the electromagnetic actuator 25 (steps S233 and S234). Then, in steps S235 to S243, the accelerator pseudo signal voltage $V_{AC}$ is successively set at $V_A-($-

$V_A-V_3)\times\frac{1}{8}$, $V_A-(V_A-V_3)\times\frac{1}{4}$, $V_A-(V_A-V_3)\times\frac{3}{8}$ and $V_A-(V_A-V_3)\times\frac{1}{2}$ which are generated at a fixed time interval (for example, 0.09 sec) respectively. (Refer to FIG. 11.) Such a procedure is taken so that the accelerator pseudo signal voltage $V_{AC}$ is decreased stepwise without being instantaneously decreased, thereby alleviating the shift shock. Then, the clutch 15 is disengaged, and the program returns to the main flow after selecting the third operation memory voltage $V_3$ as the accelerator pseudo signal voltage $V_{AC}$ and setting the flag GFLG indicative of generation of the accelerator pseudo signal voltage $V_{AC}$ at GFLG=1 (steps S243 to S245).

After execution of the $N_EAIDL$ routine, an air check routine (step S246) is executed. Then, whether the clutch 15 has been actually disengaged or not is checked (step S247). When disengagement of the clutch 15 is confirmed, a shift signal for causing coincidence of the gear position with the desired speed ratio is applied to the electromagnetic valves 73 to attain the speed shift (step S248). On the other hand, when disengagement of the clutch 15 is not confirmed, a signal for disengaging the clutch 15 is generated (step S249), and the program returns to the beginning of the speed shift routine.

On the other hand, when the result of judgment in the step S230 proves that a shiftup is not required, that is when a shiftdown is required, judgment is made in step S250 as to whether the shiftdown is a downshift in the Dp range or in the $D_E$ range. When the result proves that the shiftdown is a downshift in the Dp range or $D_E$ range, a speed ratio down-shifted by one speed ratio from the present speed ratio is set at the desired speed ratio (step S251). On the other hand, when the result proves that the shiftdown is a downshift in the manual range, the position of the change lever 61 is set at the desired speed ratio (step S252). Then, judgment is made as to whether or not the shiftdown can be achieved without causing an overrun of the rotation of the engine 11 (step S253). When there is a possibility of an overrun, the overrun is warned to the driver by an overrun warning buzzer (step S254), and the program returns to the beginning of the speed shift routine without carrying out the speed shift. When there is no possibility of an overrun, the flag GFLG is checked after turning off the buzzer, and an $N_EHOLD$ routine is executed to disengaged the clutch 15 only when the accelerator pseudo signal voltage $V_{AC}$ is not generated (steps S255 to S257). The $N_EHOLD$ routine is the same as the aforementioned $N_EAIDL$ routine except that a voltage value $V_3$ corresponding to the present engine rotation speed $N_E$ under a no-loaded condition is written in the third operation memory $R_3$ for accelerator pseudo signal voltage generation purpose (step S258). Similarly, the accelerator pseudo signal voltage $V_{AC}$ is decreased stepwise, and the clutch 15 is disengaged. (Refer to FIG. 12.)

Then, under the condition that this shiftdown is not a downshift at a speed ratio lower than the 5th speed or the vehicle speed is not higher than a predetermined setting at that speed ratio, the speed shift is done after execution of the aforementioned air check routine (steps S259, S260 and S246). On the other hand, when the downshift is a shiftdown at a speed ratio lower than the 5th speed or when the vehicle speed is higher than the predetermined setting at that speed ratio, a double clutch routine (step S261) is executed.

In this double clutch routine, the clutch 15 is disengaged, and a target clutch rotation speed is provisionally set by multiplying the present clutch rotation speed NcL by a constant C (for example, 1.5) which is previously determined according to the state of speed shift (steps S262 and S263). Then, judgment is made as to whether or not this target clutch rotation speed is equal to or higher than 2,300 rpm which is an upper limit (step S264). When the target clutch rotation speed is equal to or higher than 2,300 rpm, 2,300 rpm is selected as the target clutch rotation speed, while when the target clutch rotation speed is lower than 2,300 rpm, the latter speed is selected as the target clutch rotation speed. Then, the electromagnetic valves 73 are turned on to disengage the gears thereby restoring the gear position to the N position, and, after generating the clutch-ON signal the accelerator pseudo signal voltage $V_{AC}$ is set at a predetermined value so that the clutch rotation speed NcL attains the target clutch rotation speed (steps S266 to S270). Then, the accelerator pseudo signal voltage $V_{AC}$ is set at the voltage corresponding to the clutch rotation speed NcL, and, after disengaging the clutch 15 and adjusting the gear position, the program returns to the main flow (steps S271 to S273).

When the aforementioned result of judgment (step S288) as to whether or not the position of the change lever 61 is in a forward speed ratio position of the manual range is NO, judgment is made as to whether or not the change lever 61 is positioned on a reverse range (step S274). When the result proves that the change lever 61 is positioned in the reverse range, it indicates that the change lever 61 is erroneously shifted to the reverse range during forward running. Therefore, the Rev pilot lamp is energized, and the neutral range is selected as the desired speed ratio (steps S275 and S276). Also, when the gear position is set at R although a forward range is selected by the change lever 61 (step S299), the Rev pilot lamp is similarly energized, and the neutral range is selected as the desired speed ratio. On the other hand, when the change lever 61 is not positioned in the R range, judgment is further made as to whether or not the position of the change lever 61 is N (step S277). When the change lever 61 positioned in the N range is not moved from that position for 1 sec (step S278), it is regarded that the driver selected N, and the neutral range is selected as the desired speed ratio. On the contrary, when the change lever 61 positioned in the N range has moved from that position within 1 sec, the program returns to the beginning of the speed shift routine. On the other hand, when the change lever 61 is not positioned in the N range, that is, when the change lever 61 is in an indefinite position where none of the ranges is selected, the previous position of the change lever 61 is regarded as the present position of the change lever 61 (step S279), and the program returns to the beginning of the speed shift routine.

In this first embodiment, air pressure from the vehicle's air tanks 47 and 49 is utilized to drive the air cylinder 33 actuating the clutch 15. However, it is apparent that oil pressure may also be used as the control medium. In such a case, a source of oil pressure including an oil pump must be additionally provided, resulting in an increased cost. It is also apparent that the sequence of shift control, the shift pattern, etc. employed in this embodiment may be suitably modified in minor details as required. The present inventions is also applicable to a vehicle equipped with a gasoline engine. Further, a dummy clutch pedal may be provided for the convenience of a driver who is accustomed with manipulation of a manual transmission. In such a case, arrangement may be such that, in the R range and specified speed ranges 1, 2, 3, 4 and 5, the clutch pedal functions in preferential relation to the operation of the air cylinder 33.

According to the first embodiment of the starting control apparatus for an automatic transmission system, a drive system including a conventional friction clutch and a conventional gear transmission is used intact, and air from vehicle's air tanks is used as a control medium for driving an actuator for the friction clutch and driving a power cylinder for gear position change-over means, thereby carrying out speed shifts. Therefore, a low-cost automatic transmission system can be provided without greatly modifying the existing vehicle production equipment. Further, the control unit possesses a function of increasing the engine rotation speed, a function of changing over the mode of vehicle starting, a function of generating an ordinary accelerator pseudo signal voltage, a function of generating a low-speed-starting accelerator pseudo signal voltage, a function of setting a target clutch stroke, a function of engaging the clutch, a function of judging the engine rotation speed, and a function of stepwise releasing the accelerator pseudo signal voltage. Therefore, the vehicle can be started smoothly, and starting shock to the driver can be eliminated to ensure comfortable starting.

Figure 17:
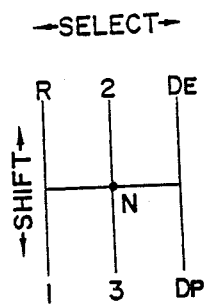
FIG. 17 is a conceptual diagram showing an example of a shift pattern in the second embodiment.
Figure 18:
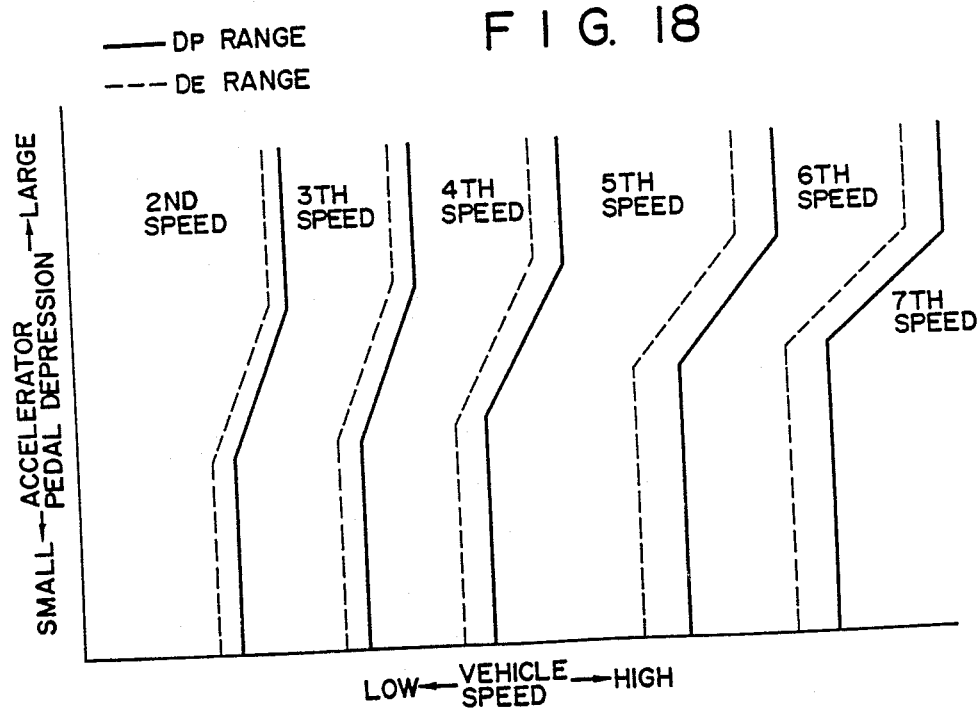
FIG. 18 is a graph showing an example of speed shift characteristics in a Dp range and a D range in the second embodiment.

A second embodiment of the present invention will next be described with reference to FIGS. 4, 10 to 12 and 16 to 23. The general structure of the second embodiment shown in FIG. 16 corresponding to FIG. 1 and a control program of the second embodiment are substantially the same as those of the first embodiment. Therefore, the same reference numerals are used to designate the same or equivalent parts appearing in FIG. 1 to dispense with repetition of the same description. This second embodiment differs structurally from the first embodiment shown in FIG. 1 in that the second embodiment employs a shift pattern as shown in FIG. 17, whereas that in the first embodiment is as shown in FIG. 2. Further, the second embodiment differs from the first embodiment in that the second embodiment employs a shift map as shown in FIG. 18, whereas the first embodiment employs those shown in FIGS. 3(a) and 3(b) as an example of shift maps. In the second embodiment, an air tank 471 is provided with an air sensor 57 generating an ON signal when the internal air pressure drops to less than a predetermined value. In order to change over the gear position of the gear transmission 17 which establishes various speed ratios, the driver manipulates the change lever 61 to bring it to a corresponding shift position in a shift pattern as, for example, shown in FIG. 17, thereby changing over the speed ratio selection switch 63. On the basis of a shift signal generated as a result of change-over of the speed ratio selection switch 63, the gear shift unit 65 acting as gear position change-over means is actuated, so that the gear position can be changed over to the desired speed ratio corresponding to that selected on the shift pattern. In FIG. 17, R indicates a reverse range; N indicates a neutral range; 1, 2, 3 indicate ranges of specified speed shifts respectively; and Dp, $D_E$ indicate ranges of automatic speed shifts between a 2nd speed and a 7th speed. When the Dp range or $D_E$ range is selected, one of the 2nd speed to the 7th speed is automatically determined on the basis of the running condition of the vehicle by executing an optimum speed-ratio determining routine described later. As shown in FIG. 18 which illustrates modes of speed shifts in the Dp range of powerful automatic speed shifts and in the $D_E$ range of economy speed shifts, the timing of speed shifts between the 2nd speed and the 7th speed is indicated by the dotted lines in the case of the $D_E$ range and by the solid lines in the case of the Dp range, and the speed shifts in the Dp range are set on a higher speed side relative to the $D_E$ range so as to deal with a heavy loaded condition or the like of the vehicle.

The sequence of shift control in the second embodiment will be described with reference to FIGS. 16 to 23.

Figure 19A:
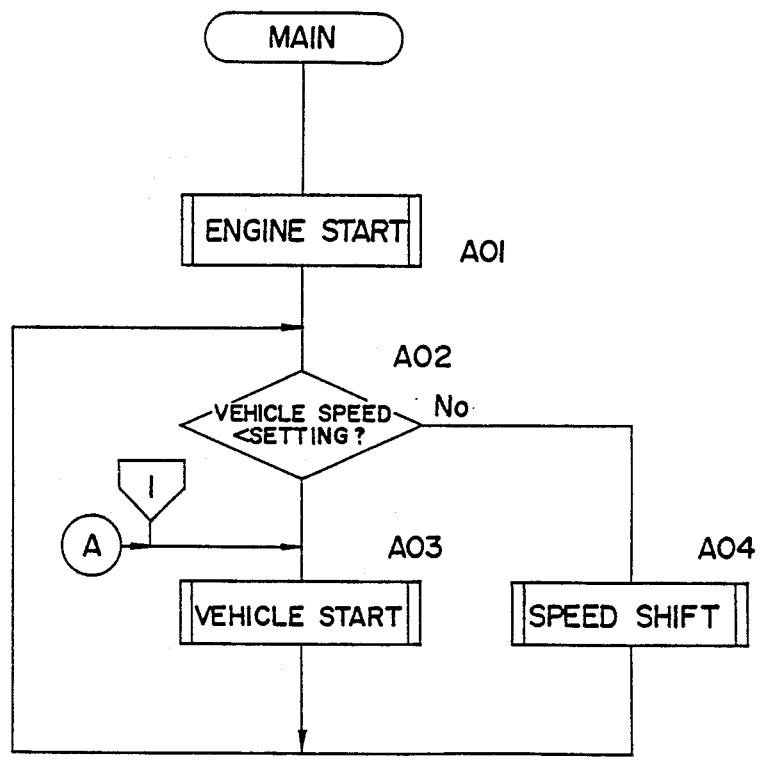
Figure 19B:
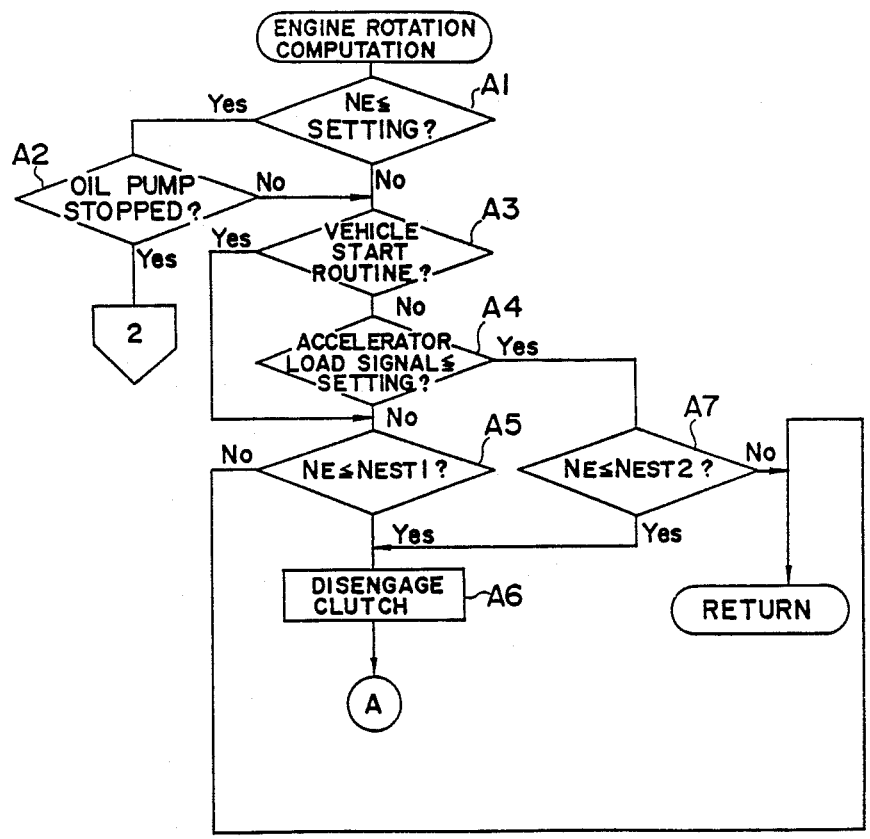

As shown in FIGS. 19(a) and 19(b), when the program starts, the control unit 71 executes an engine starting routine (step A01). After the engine starting routine is run, a vehicle speed signal is applied to the control unit 71. The control unit 71 executes a vehicle starting routine (step A03) when the value of the vehicle speed signal is detected to be smaller than a predetermined value (for example, 0Km/h to 3Km/h) in step A02. On the other hand, the control unit 71 executes a speed shift routine when the vehicle speed value is larger than the predetermined value (step A04). However, when the engine rotation speed $N_E$ is computed, and the engine rotation speed $N_E$ detected before the execution of the vehicle starting routine is judged to be lower than a predetemined setting (for example, the idling rotation speed), the control unit 71 judges as to whether or not the oil pump is stopped, and when the oil pump is not in operation, regards that the engine is not in operation and executes the engine starting routine again (steps A1 and A2). When the result of judgment proves that the oil pump is not stopped or that the engine rotation speed $N_E$ exceeds the predetermined setting, the control unit 71 judges in step A3 as to whether or not the vehicle starting routine is being executed. When the result of judgment proves that the vehicle starting routine is not being executed, the control unit 71 compares an accelerator load signal with a predetermined value to judge as to whether the accelerator load signal exceeds or is less than the predetermined value (step A4). When the result of judgment proves that the vehicle starting routine is being run and that the accelerator load signal exceeds the predetermined value, the control unit 71 compares the engine rotation speed $N_E$ with a first engine-stalling preventive rotation speed N with a first engine-stalling preventive rotation speed $N_{EST1}$ (step A5) and acts to disengage the clutch 15 to run the vehicle starting routine again when the result of comparison proves that the engine rotation speed $N_E$ is lower than the first engine-stalling preventive rotation speed $N_{EST1}$ (step A6). On the other hand, when the accelerator load signal is smaller than the predetermined value, the control unit 71 compares the engine rotation speed $N_E$ with a second engine-stalling preventive rotation speed $N_E$ higher than the first engine-stalling preventive rotation speed $N_{EST1}$ (step A7) and acts to disengage the clutch 15 to run the vehicle starting routine again when the result of comparison proves that the engine rotation speed $N_E$ is lower than the second engine-stalling preventive rotation speed $N_{EST2}$ The program proceeds to the vehicle starting routine when the result of judgment proves that the engine rotation speed $N_E$ exceeds the second engine-stalling preventive rotation speed $N_{EST2}$ or that the engine rotation speed $N_E$ exceeds the first engine-stalling preventive rotation speed $N_{EST1}$.

Figure 20:
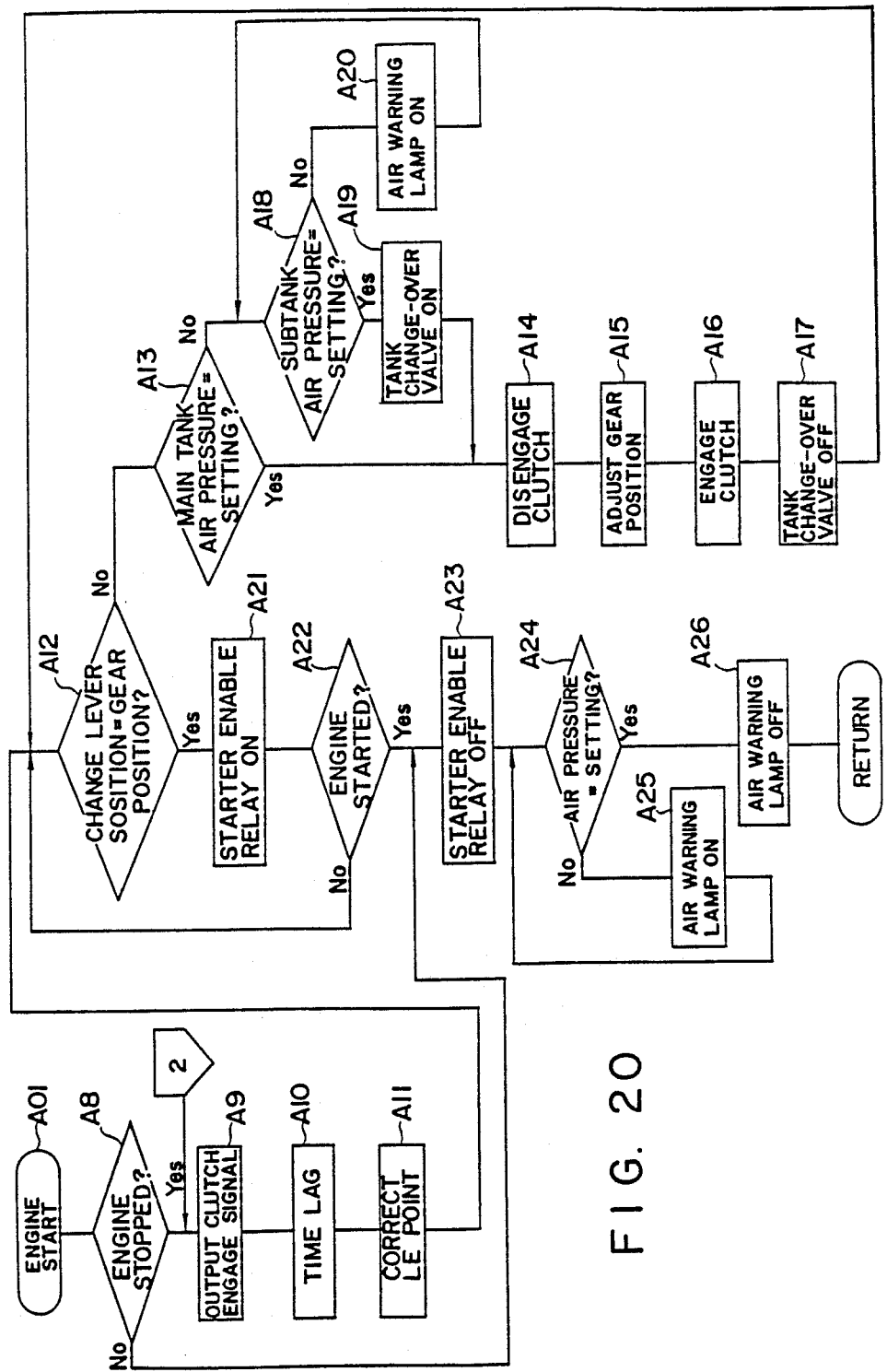

In the engine starting routine shown in FIG. 20, the control unit 71 judges in step A8 as to whether or not the value of the signal indicative of the engine rotation speed $N_E$ lies within a stop range of the engine 11, and, when the result of judgment proves that the the engine 11 is not in operation, generates a clutch engaging signal (step A9). After a time lag, the clutch 15 is engaged under the normal pressure and normal condition (step A10). After the clutch 15 is engaged under the normal pressure and normal condition, an LE point, where the clutch 15 is disengaged to a certain extent from the normal engaged position, and transition from the rotating state to the stopped state occurs on the driving wheels of the vehicle, is corrected depending on the amount of wear of the facing of the clutch 15 and the presence or absence of a vehicle load (step A11). By so correcting, the stroke of the clutch disc 31, required until the clutch 15 is completely engaged from the LE point, is maintained substantially constant, and the clutch 15 can be smoothly engaged regardless of the state of the vehicle. After the correction of the LE point, judgment is made as to whether or not the position of the change lever 61 coincides with the gear position (step A12). That is, judgment is made as to whether or not the speed shift signal coincides with the gear position signal, and the gears of the gear transmission 17 are arranged to provide the desired speed ratio (which is previously set at, for example, the 2nd speed when the $D_E$ range or Dp range is selected) specified by the speed ratio selection switch 63. When the gear position differs from the position of the change lever 61, judgment is made as to whether or not the pressure of air in the air tank 471, which is the main tank, builds up to the predetermined value (step A13). When the result of judgment proves that the air pressure is equal to the predetermined value, the clutch 15 is disengaged (step A14), and the actuator (not shown) is operated by the internal air of the air tank 471 to cause automatic coincidence of the gear position with the position of the change lever 61 (step A15). After engaging the clutch 15 again (step A16) and turning off an electromagnetic valve provided for changing over between the main tank or the air tank 471 and a sub-tank (not shown) (step A17), judgment is made again as to whether or not the gear position coincides with the position of the change lever 61 (step A12). On the other hand, when the pressure of air in the air tank 471 is lower than the predetermined setting, judgment is made as to whether or not the pressure of air in the sub-tank builds up to the predetermined setting (step A18). When the result of judgment proves that the predetermined pressure is built up, the change-over-purpose electromagnetic valve is turned on (step A19), and the clutch 15 is disengaged (step A14). The power cylinders are actuated by the internal air of the sub-tank to automatically select the gear position corresponding to the position of the change lever 61. When the pressure of air in the sub-tank is not built up to the predetermined setting, the air warning lamp 115 is energized in step A20 to inform the driver of the fact that the pressure of air in the air tank 471 and sub-tank is lower than the predetermined setting. On the other hand, when the result of judgment proves that the gear position coincides with the position of the change lever 61, a starter enable relay is turned on (step A21). When the starter enable relay is turned on, the starter 89 can start the operation of the engine 11. Judgment is made in step A22 as to whether or not the engine 11 has been started. When the result of judgment proves that the engine 11 has been started, the starter enable relay is turned off (step A23), while, when the result of judgment proves that the engine 11 has not been started, judgment is made again as to whether or not the gear position coincides with the position of the change lever 61. After turning off the starter enable relay, the pressure of air in the main tank 471 and sub-tank is checked to determine whether or not it has built up to the predetermined setting step (A24). When the result of checking proves that the predetermined pressure has not been built up, the air warning lamp 115 is energized (step A25), and judgment is repeated until the pressure of air builds up to the predetermined setting. When the result of checking proves that the predetermine pressure has built up, the air warning lamp 115 is deenergized (step A26) to complete the engine starting routine.

Figure 10:
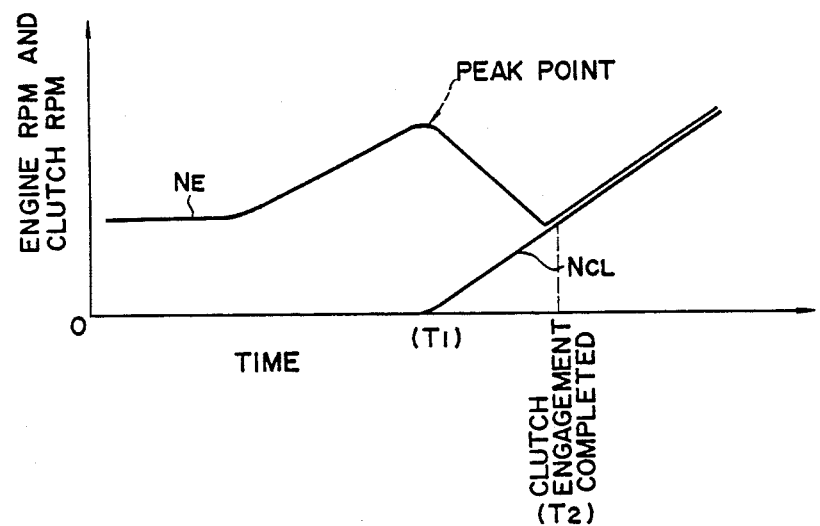
FIG. 10 is a graph showing an example of time-related changes of the engine rotation speed an clutch rotation speed during a speed shift in the first embodiment.
Figure 21A:
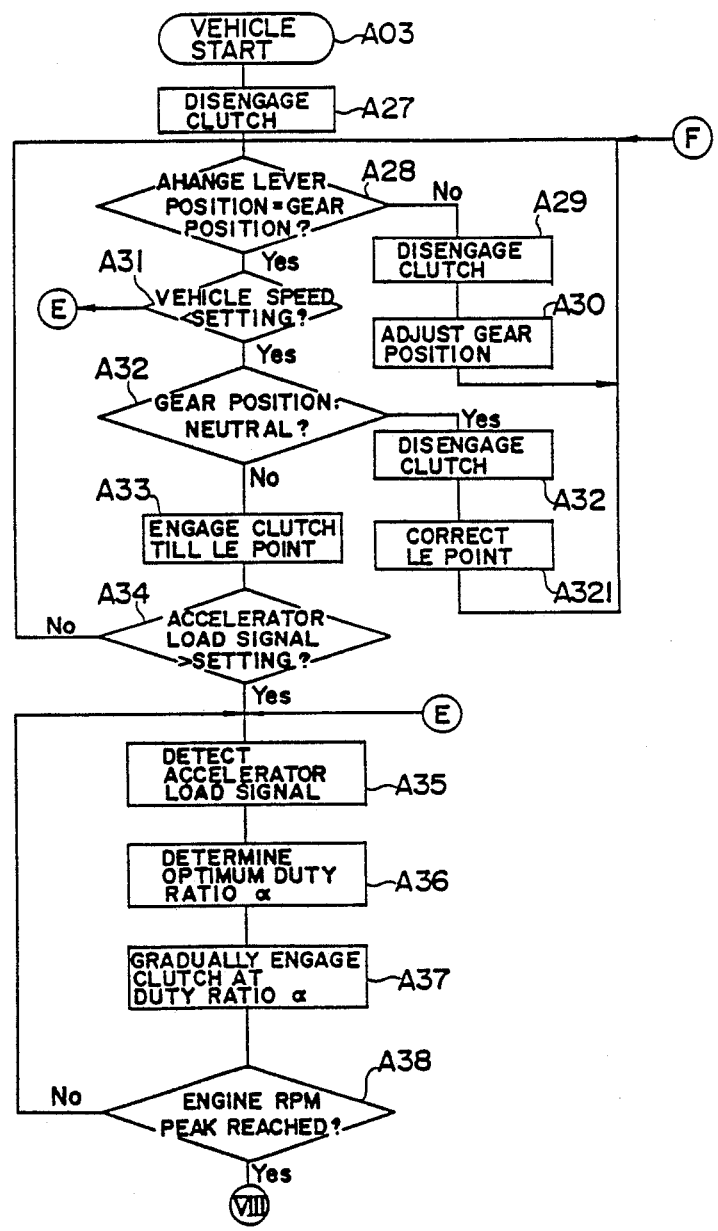
Figure 21B:
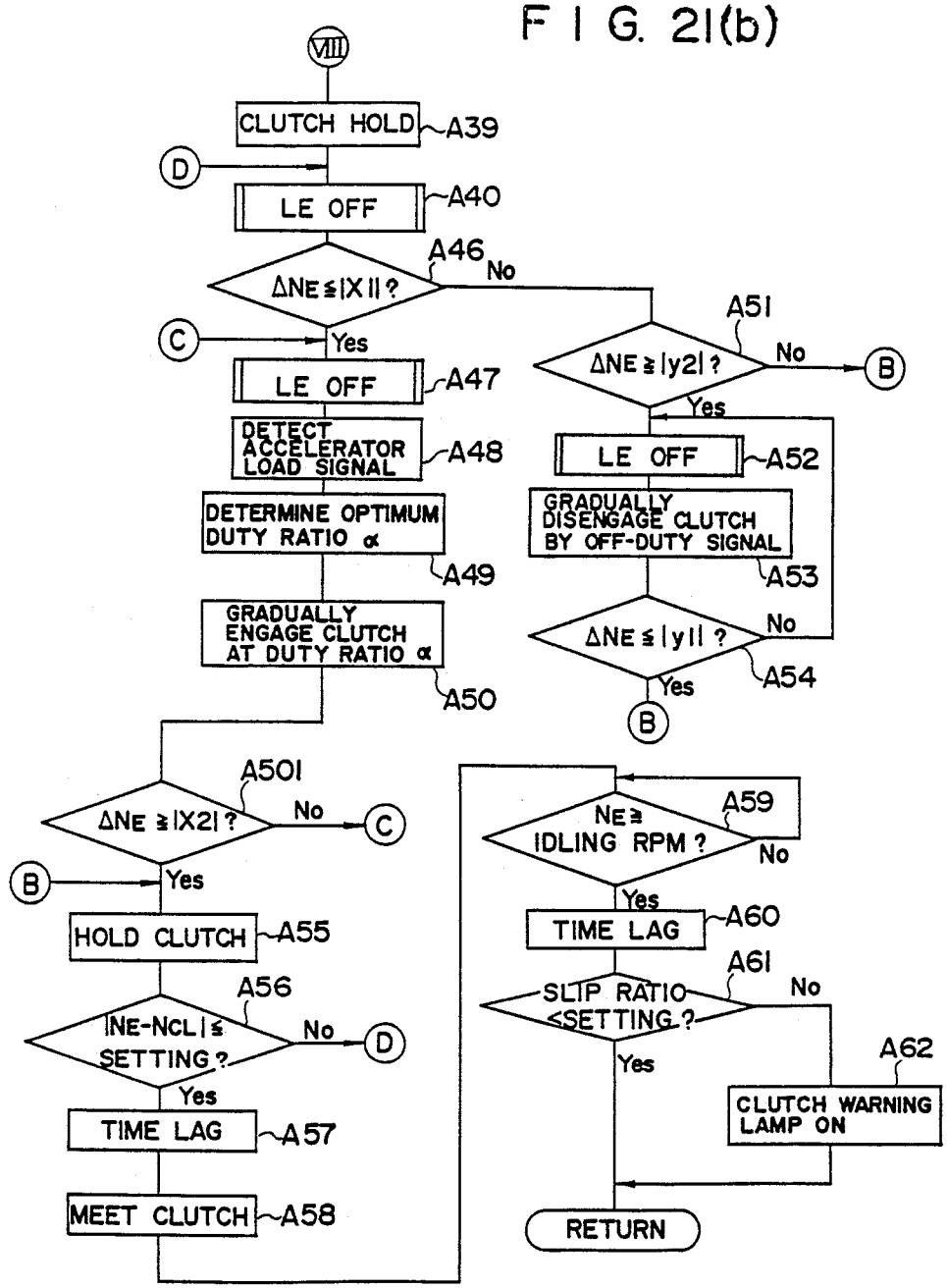
Figure 21C:
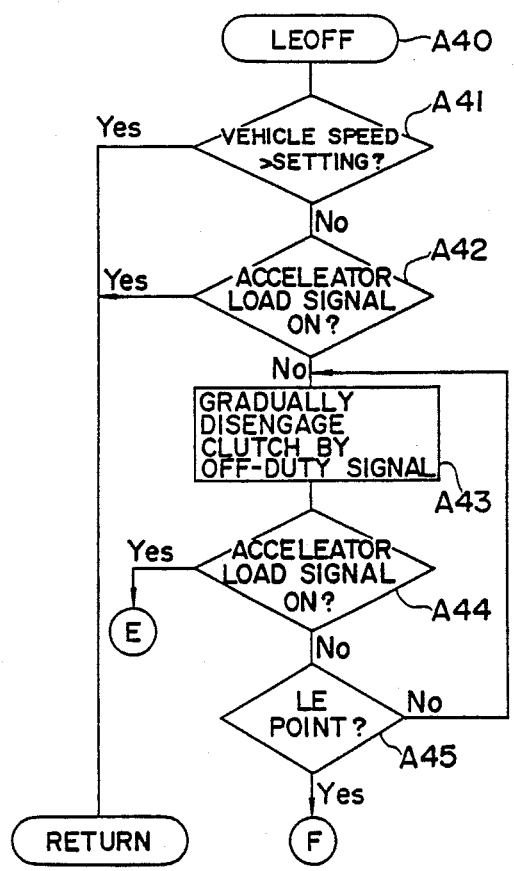

After completion of the engine starting routine, the vehicle speed signal is read, and, when the vehicle speed is lower than the predetermined setting, the vehicle starting routine is started. As shown in FIGS. 21(a), 21(b) and 21(c), the CPU 95 applies an ON signal to the cut valve 51 to disengage the clutch 15 (step A27). Then, judgment is made as to whether or not the gear position coincides with the position of the change lever 61 (step A28), and, when the result of judgment is NO, the gear position is set at the desired speed ratio (steps A29 and A30). When the gear position coincides with the position of the change lever 61, judgment is made again as to whether or not the vehicle speed is lower than the predetermined setting (step A31). When the result of judgment is NO because the vehicle speed is higher than the predetermined setting, the program proceeds to step where the accelerator load signal is detected as described later. On the other hand, when the result of judgment is YES, judgment is made as to whether or not the gear position attaining the desired speed ratio is neutral on the basis of the speed shift signal (step A32). When the result of judgment is YES, the LE point is corrected again (step A320 and A321). On the other hand, when the result of judgment is NO because the gear position is not neutral, the clutch 15 is engaged until the LE point is reached (steps A32 and A33). Then, judgment is made as to whether or not the level of the accelerator load signal is higher than a predetermined level (a voltage as low as that merely indicative of the will of the driver to start the vehicle) (step A34). When the result of judgment is NO because the driver has no will of starting the vehicle, the aforementioned steps are repeated. On the other hand, when the result of judgment is YES because the driver has the will of starting the vehicle, step A34 is followed by step A35 where the accelerator load signal is detected. Then, the optimum duty ratio corresponding to the detected value of the accelerator load signal is read from the map of FIG. 4 (step A36). A pulse signal representing the optimum duty load is then fed to the electromagnetic valve 53 to engage the clutch 15 gradually (step A37). At this time, the CPU 95 applies a select signal to the input port 101 so that the signal indicative of the engine rotation speed $N_E$ can be continuously applied, and the time-serial data of the engine rotation speed $N_E$ based on the signal indicative of the engine rotation speed $N_E$ are sequentially stored in the RAM of the memory 97. The data are computed until the peak point of the engine rotation speed $N_E$ shown in FIG. 10 illustrating an example of changes in the engine rotation speed $N_E$ and clutch rotation speed NcL, is detected. Until this peak point is detected, in step A38, the result of judgment is NO, and the steps are repeated from the accelerator load signal detecting step. On the other hand, when the peak point is detected at time $T_1$, the electromagnetic valve 53 is held in its on state from this time T₁ (step A39). The peak point appears due to the fact that the rotation of the output shaft 13 of the engine 11 causing the rotation of the input shaft 39 of the gear transmission 17 through the clutch 15 decreases as the drive power starts to be transmitted to the driving wheels.

Then, an LEOFF routine (step A40) is executed. This LEOFF routine deals with the case where the vehicle is driven quite slowly with the clutch 15 being maintained in its semi-engaged state, unlike the case of ordinary starting. That is, in such a case, low-speed starting control means including the electromagnetic valve 53, vehicle speed sensor 79 and accelerator load sensor 85 is operated. According to this LEOFF routine, judgment is first made as to whether or not the vehicle speed is higher than a predetermined setting (step A41). When the result of judgment is YES because the vehicle speed is higher than the predetermined setting, the vehicle is judged to be ordinarily started. The LEOFF routine is ended, and the program returns to the vehicle starting flow. On the other hand, when the result of judgment is NO, judgment is then made as to whether or not the accelerator pedal 81 is depressed (step A42). When the result of judgment is YES, the LEOFF routine is similarly ended. On the other hand, when the result of judgment is NO, the friction clutch 15 is gradually disengaged by application of an off-duty signal to the electromagnetic valve 53 until the Le point is reached (step A43). In the meantime, judgment is made as to whether or not the accelerator pedal 81 is depressed (step A44). When the result of judgment proves that the accelerator pedal 81 is depressed, the program returns to the aforementioned step of accelerator load signal detection. Further, when the clutch 15 is judged to be retracted to the $L_E$ point (step a45), the program returns to the aforementioned step of judging coincidence between the position of the change lever 61 and the gear position. Thus, since the friction clutch 15 is gradually actuated in the engaging or disengaging direction depending on the vehicle speed and accelerator load, shock occurring accelerator pedal 81 is released in a flapping manner and the clutch 15 is instantaneously disengaged during low-speed starting of the vehicle, can be eliminated to realize smooth and slow starting of the vehicle.

When the LEOFF routine is ended and the vehicle is judged to be ordinarily started, the clutch 15 is engaged to the clutch-meet state from the semi-engaged state corresponding to the $L_E$ point. Since, at this time, the engine rotation speed $N_E$ which has passed the peak point decreases gradually with the increase in the clutch rotation speed NcL corresponding to the rotation speed of the input shaft 39 of the gear transmission 17, the engine rotation speed $N_E$ is so controlled that the falling rate of the engine rotation speed $N_E$ lies within a predetermined range thereby lessening the shift shock. More precisely, judgment is first made as to whether or not the engine rotation falling rate $\Delta N_E$ per predetermined time is less than a first setting $|X|$ shown in FIG. 23 (step A46). When the result of judgment is YES, the accelerator load signal is detected again after execution of the aforementioned LEOFF routine to determine the optimum duty ratio α corresponding to the detected value, and the clutch 15 is gradually engaged according to this duty ratio α (steps A47 to a50). Thereafter, in step A501, judgment is made as to whether or more than a second setting $|X_2|(|X_1|<|X_2|)$. When the result of judgment is NO, the program returns to the aforementioned LEOFF routine to repeat the loop for maintaining constant the engine rotation falling rate $\Delta N_E$. On the other hand, when the engine rotation falling rate $\Delta N_E$ is larger than $|X_1|$, judgment is made as to whether or not this engine rotation falling rate $\Delta N_E$ is equal to or larger than a third setting $|Y_2|(|X_2|<|Y_2|)$ (step A51). When the result of judgment is YES, the clutch 15 is gradually disengaged by off-duty (step A53) after execution of the LEOFF routine (step A52). Then, judgment is made as to whether or not the engine rotation falling rate $\Delta N_E$ is equal to or less than a fourth setting $|Y_1|(|Y_1|<|Y_2|)$ (step A54). When the result of judgment is NO, the loop for disengaging the clutch 15 is repeated. When, on the other hand, the result of judgment is YES, or when the result of judgment is NO in the aforementioned step where judgment is made as to whether or not the engine rotation falling rate $\Delta N_E$ is equal to or less than $|Y_2|$, or when the result of judgment is YES in the aforementioned step A501 where judgment is made as to whether or not the engine rotation falling rate $\Delta N_E$ is equal to or larger than $|X_2|$, then, the engine rotation falling rate $\Delta N_E$ lies substantially within the hatched region shown in FIG. 23. Therefore, the condition is now satisfied in which the clutch 15 can be changed over from the semi-engaged state to the full-engaged state without accompanying any starting shock and without excessively extending the time required for starting the vehicle. The air pressure applied to the clutch 15 is held at the existing value (step A55). Then, the CPU 95 judges as to whether the difference between the engine rotation speed $N_E$ and the clutch rotation speed NcL is equal to or smaller than a predetermined setting (for example, $|N_E-NcL|=$about 10 rpm) in step A56. When the result of judgment is NO, the aforementioned loop is repeated. On the other hand, the result of judgment is YES at time T₂. A predetermined time lag from time T₂ is set, and, after this time lag, the electromagnetic valve 53 is full opened to attain the clutch-meet (steps A57 and A58). Then, judgment is made as to whether or not engine rotation speed $N_E$ is higher than the idling rotation speed. When the above condition is satisfied, and, after a predetermine time lag, the CPU 95 computes the slip rate of the clutch 15 (the difference between the engine rotation speed $N_E$ and the clutch rotation speed NcL/the engine rotation speed $N_E$) and compares the value of the slip rate with a predetermined value (steps A59 to A61). When the slip rate is less than the predetermined value, the program returns to the main flow. On the other hand, when the slip rate is larger than the predetermined value, the CPU 95 judges that the amount of wear of the clutch 15 is larger and applies an ON signal or a clutch wear signal to the clutch warning lamp 117 through the output port 113 and through a drive circuit (not shown) thereby energizing the clutch warning lamp 117 (step A62).

Figure 22A:
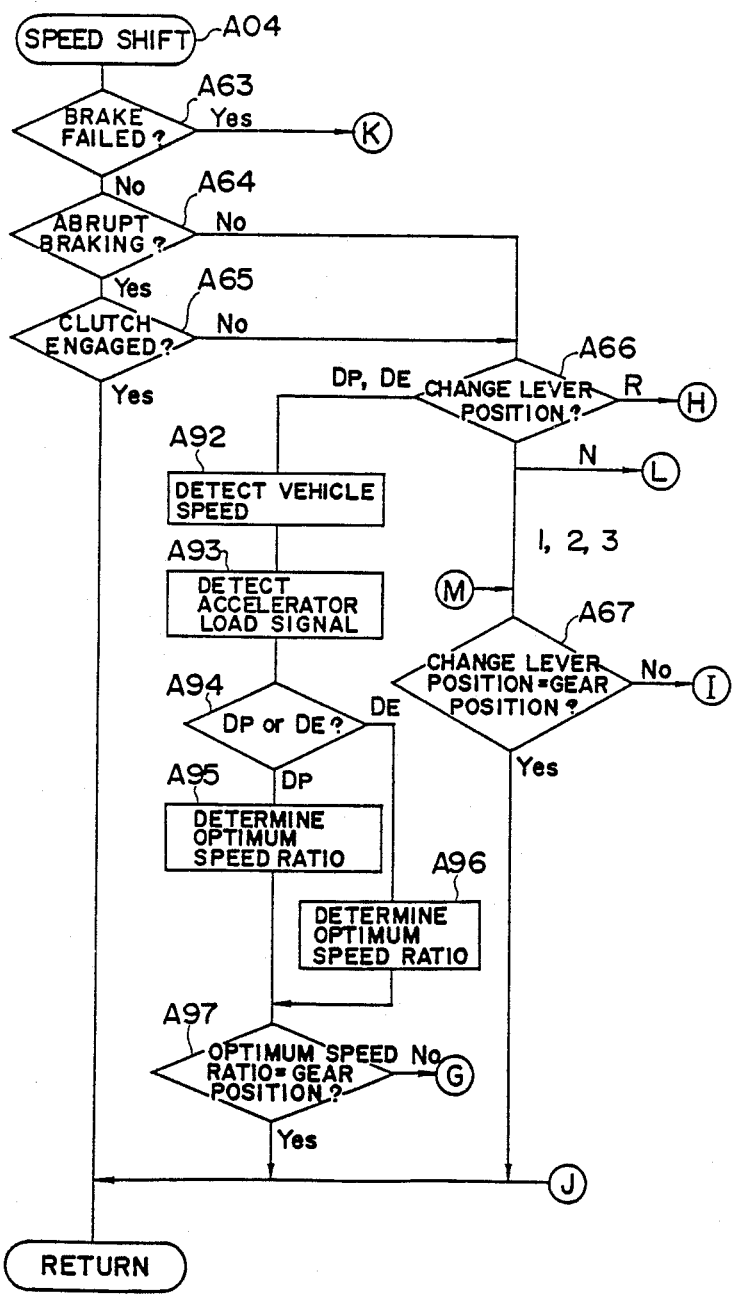
Figure 22B:
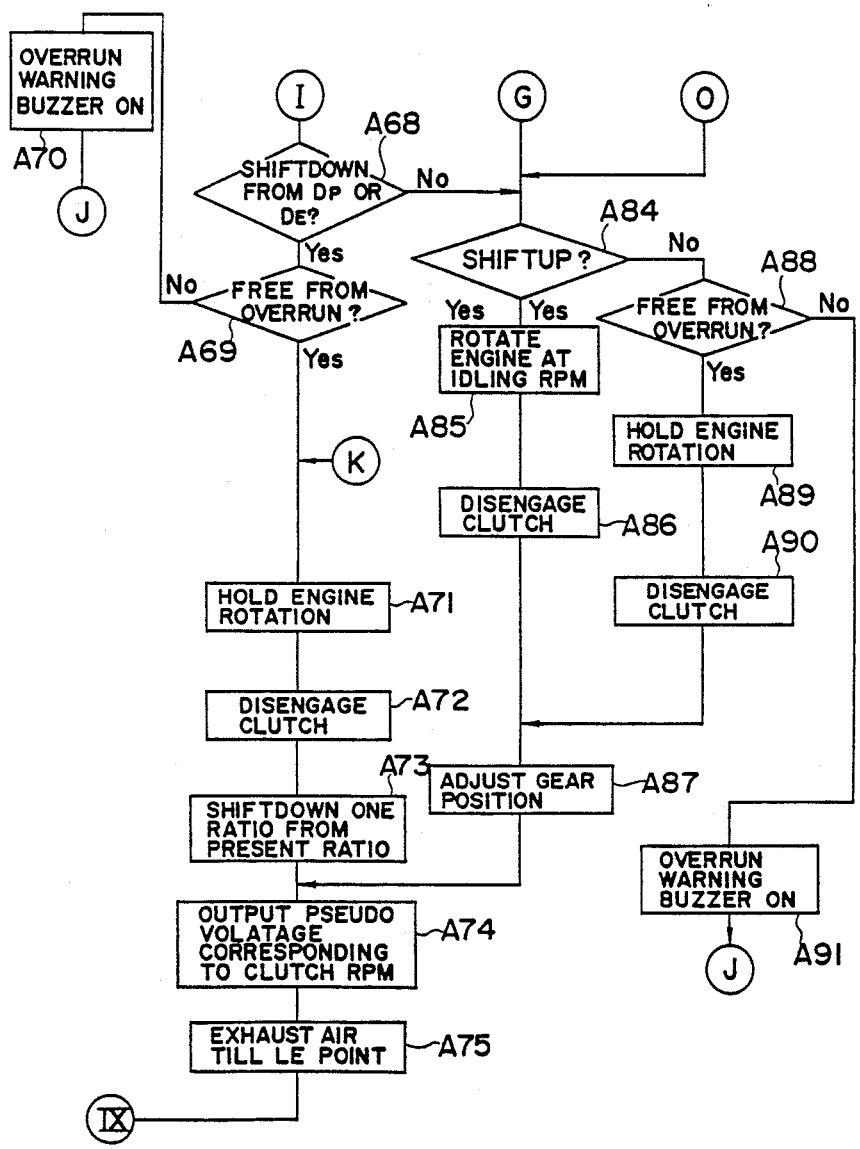
Figure 22C:
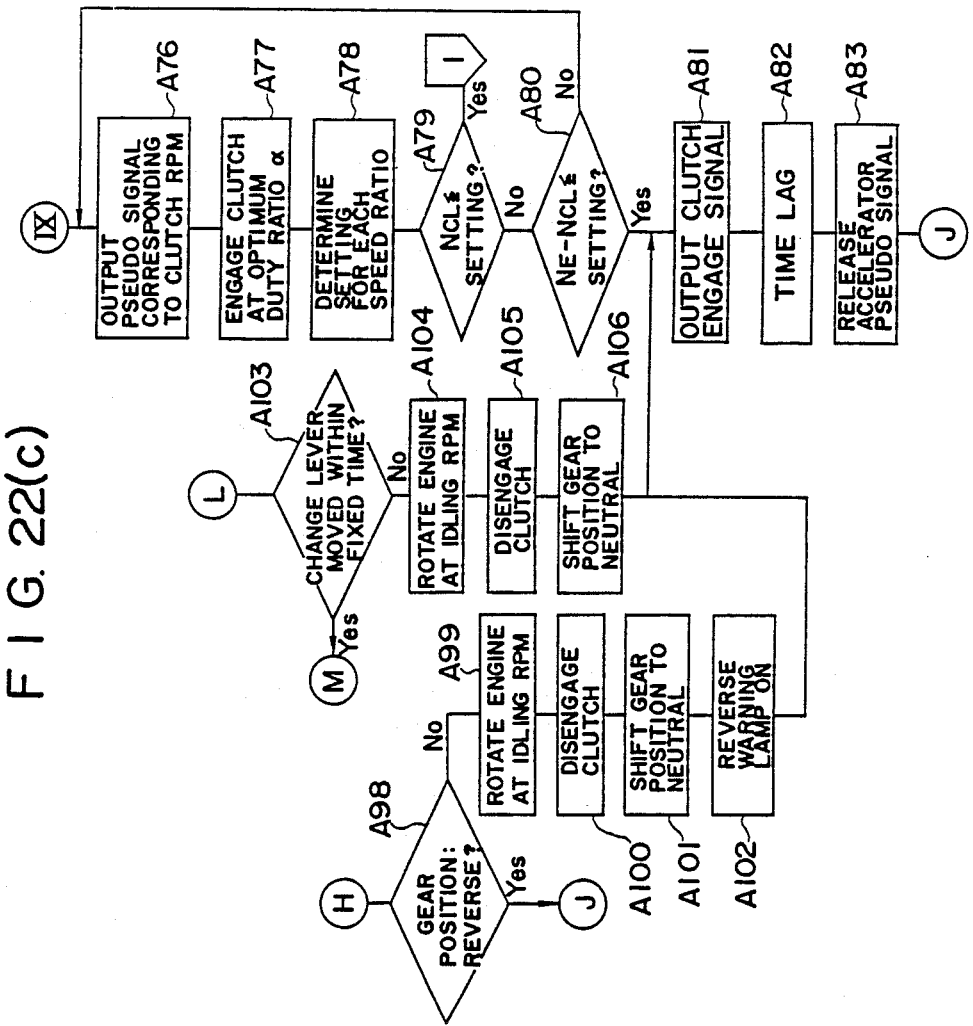

After completion of the vehicle starting routine, the CPU 95 reads the vehicle speed signal and commences the speed shift routine after judging that the vehicle speed exceeds the predetermined setting. As shown in FIGS. 22(a), 22(b) and 22(c), the CPU 95 applies first a select signal to the input port 101 to check the presence of brake failure, if any (step A63). When the result of checking is YES because a brake failure exists, the CPU 95 acts to shift down the speed ratios one after another so as to stop the vehicle in a manner as described later. On the other hand, when the result of checking is NO because of the absence of any brake failure, a check is made whether or not the vehicle is being abruptly braked with a deceleration exceeding a certain constant; this is checked by the use of, for example, an acceleration sensor (step A64). When the result of checking is YES, the program returns to the main flow to temporarily interrupt the speed shift operation described later, because execution of the speed shift operation results in a long braking distance. However, in the case where the clutch 15 is in its disengaged state (step A65) even when the vehicle is being abruptly braked, such a case is judged to be midway of a speed shift, and the clutch 15 is engaged after the speed shift operation is completed.

On the other hand, when the vehicle is not being abruptly braked or when the clutch 15 is in its disengaged state as described above in spite of application of the abrupt braking, the CPU 95 reads the position of the change lever 61 to judge whether the change lever 61 is positioned on one of the specified shift ranges 1, 2 and 3 except the Dp and De ranges, or the automatic shift ranges Dp and De, or the R range or the N range (step A66).

Figure 12:
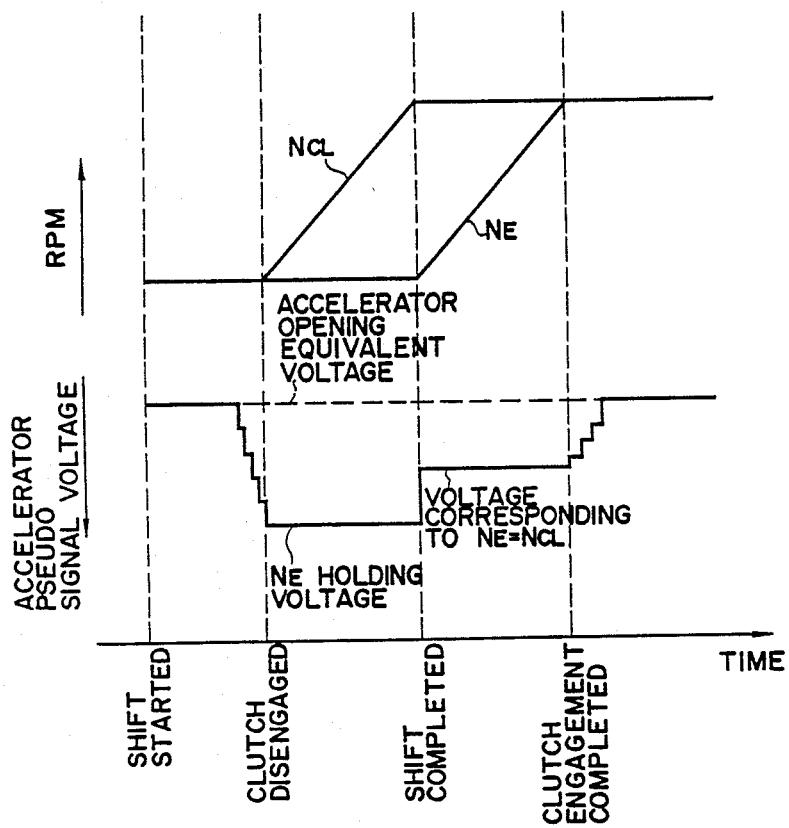
FIG. 12 is a conceptual diagram of shift operation during a shiftdown.

In the case of a shift in one of the specified shift ranges 1, 2 and 3, judgment is made in step A67 as to whether or not the gear position is the same as the position of the change lever 61. When the result of judgment is YES, the program returns to the main flow, while, when the result is NO, the step A67 is followed by the next step. In this step, when the change lever 61 is positioned on a desired one of the ranges 1, 2 and 3, judgment is made as to whether or not the present gear position before being shifted lies in the Dp or De range, and the speed shift corresponds to a shiftdown from that gear position (step A68). When the result of judgment is YES, judgment is made as to whether or not the shiftdown can be achieved without causing an overrun of the engine 11 (step A69). When the result of judgment is NO, the step A69 is followed by step A70 and the driver is warned by an overrun warning buzzer, and the program returns to the main flow without carrying out the speed shift. When the result of judgment on the overrun in step A69 is YES, the gear position is shifted down by one speed ratio from the present gear position. As shown in FIG. 12 which illustrates the concept of operation for this shiftdown, a control signal controlling the control rack 23 is applied to the electromagnetic actuator 25 through the output port 113 and microcomputer 93 to hold the engine rotation speed N at the existing value (step A71). An ON signal is applied for a predetermined period of time to the cut valve 51 through the output port 113 to disengage the clutch 15 (step A72), and a control signal is applied to the individual electromagnetic valves 73 in the gear shift unit 65 to downshift the present gear position to the next lower gear position (step A73). Then, a voltage signal, which increases the engine rotation speed $N_E$ up to the same value as the clutch rotation speed NcL, is applied as an accelerator pseudo signal to the electromagnetic actuator 25 through the output port 113 and microcomputer 93, thereby attaining coincidence between the clutch rotation speed NcL and the engine rotation speed N after the speed shift, and then, air is exhausted from the air cylinder 33 to urge the clutch 15 to its semi-engaged state corresponding to the L point (steps A74 to 76). Then, the clutch 15 is engaged at the optimum duty ratio $\alpha$ corresponding to the accelerator load signal, and the difference between the engine rotation speed $N_E$ and the clutch rotation speed NcL is compared with the predetermined value previously set for each of the speed ratios (steps A77 to A80). The engagement of the clutch 15 at the optimum duty ratio $\alpha$ is continued until $|N_E-NcL|$ becomes equal to or less than the setting. After $|N_E-NcL|$ decreases to less than the setting, a clutch engagement signal is generated to complete the engagement of the clutch 15 with a predetermined time lag, and, then the program returns to the main flow (steps A81 to A83). When the clutch rotation speed NcL decreases to lower than its predetermined setting during the above operation, the CPU 95 regards that the vehicle speed has decreased during the above operation, and, without engaging the friction clutch 15, the program proceeds to the connector 1 in FIG. 19(a) to carry out the vehicle starting routine.

Figure 11:
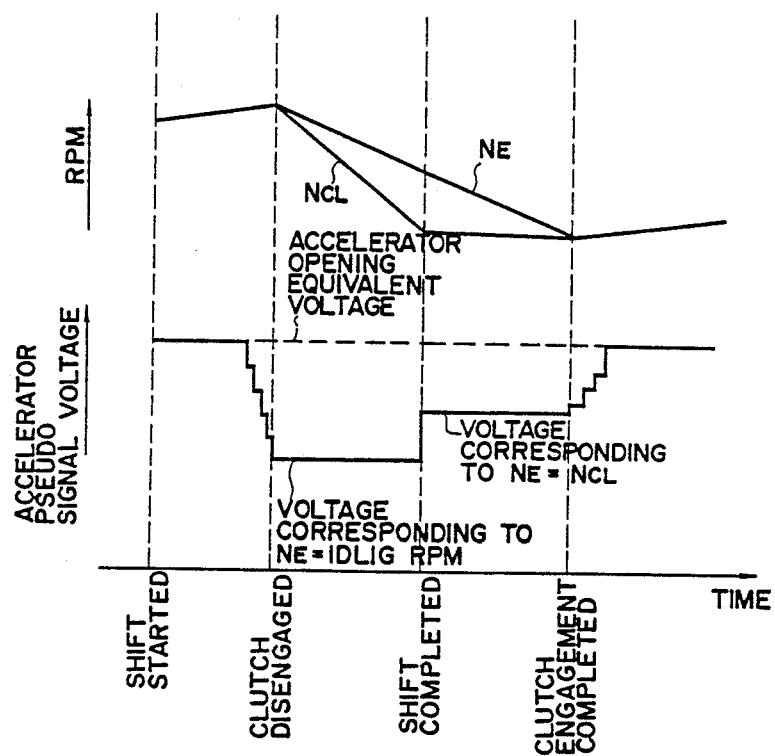
FIG. 11 is a conceptual diagram of shift operation during a shiftup.

On the other hand, when the result of judgment as to whether or not the speed shift is a shiftdown from the Dp or $D_E$ range, is NO, judgment is made as to whether or not the shift is a shiftup (step A84). When the result of judgment is YES, the following operation for the shiftup is carried out, and the program returns to the main flow. As shown in FIG. 11 which illustrates the concept ot this shiftup operation, a control signal controlling the control rack 23 is applied to the electromagnetic actuator 25 through the output port 113 and microcomputer 93 to decrease the engine rotation speed $N_E$ to the idling rotation speed (step A85). After disengaging the clutch 15 (step A86), a control signal is applied through the output port 113 to the individual electromagnetic valves 73 so that the gear position coincides with the desired speed ratio in one of the specified shift ranges 1, 2 and 3 (step A87). Thereafter, the aforementioned steps starting from the application of the accelerator pseudo signal for the shiftdown operation are executed thereby attaining coincidence of the engine rotation speed $N_E$ with the clutch rotation speed NcL after the shift, and engagement of the clutch 15 is completed to return the program to the main flow. When the result of judgment as to whether or not the shift is a shiftup is NO, judgment is made as to whether or not the engine 11 is free from overrun (step A88). When the result of judgment is YES, the engine rotation speed $N_E$ is held at the existing value (step A89), and the clutch 15 is disengaged (step A90) so that the gear position coincides with the desired speed ratio is one of the specified shift ranges 1, 2 and 3. Then, the aforementioned steps starting from the application of the accelerator pseudo signal for the shiftdown operation are executed, and the program returns to the main flow. On the other hand, when the result of judgment as to whether or not the engine is free from overrun is NO, warning is given by the overrun warning buzzer (step A91).

The above operation is carried out when the result of judgment is step A66 as to the position of the change lever 61 proves that the change lever 61 is positioned on one of the specified shift ranges 1, 2 and 3. However, when the result of judgment of the position of the change lever 61 proves that the change lever 61 is positioned on the automatic shift range Dp or De, the following operation is carried out. That is, the vehicle speed and the amount of depression of the accelerator pedal 81 are detected, and judgment is made as to whether the change lever 61 is positioned on the Dp range or the $D_E$ range (steps A92 to A94). An optimum speed ratio considered to be the desired speed ratio in the Dp or $D_E$ range is determined on the basis of a pre-set map I as shown in FIG. 18 (steps A95 and A96). Then, judgment is made in step A97 as to whether or not the gear position matches this optimum speed ratio. When the result of judgment is YES, the program returns to the main flow, while, when the result of judgment is NO, the step A97 is followed by the step A84 of judgment for a shiftup, and the same shift operation as that described above is carried out. When the result of judgment of the position of the change lever 61 proves that the change lever 61 is in the R range, judgment is made by the CPU 95 as to whether or not the gear position coincides with the R range (step A98). When the vehicle is running backwards, and the result of judgment is YES, the program returns to the main flow. On the other hand, when mal-manipulation occurs, and the result of judgment is NO, the engine rotation speed N is decreased to the idling rotation speed, and the clutch 15 is disengaged, as described already (steps A99 and A100). In order to restore the gear position to the neutral, the CPU 95 applies a signal to the individual electromagnetic valves 73 through the output parts 113, and, after energizing a reverse warning lamp informing a shift error, the clutch 15 is engaged to return the program to the main flow (steps A101, A102, A81 to A83).

Further, when the result of judgement of the position of the change lever 61 proves that the change lever 61 is in the N range, judgment is made as to whether or not the change lever 61 has been moved within a predetermined period of time, that is, whether or not the N position has been merely passed during the shifting manipulation by the driver (step A103). When the change lever 61 has merely passed the N position during the shifting manipulation, and the result of judgment is YES, the position of the change lever 61 and the gear position are judged as described already, and the program returns directly to the main flow or returns to the main flow after manipulation for a shiftup or a shiftdown. However, when the N range is selected, and the result of judgment is NO, the engine rotation speed N is decreased to the idling rotation speed, and, after disengaging the clutch 15 and shifting the gear position to the neutral (steps A104 to A106), the clutch 15 is engaged again, and the program returns to the main flow.

According to the second embodiment of the automatic transmission system of the present invention, the conventional drive system including the clutch and gear transmission is used intact, the air from the air tanks of the vehicle is used as a control medium for actuating the clutch actuator and the power cylinders of the gear position change-over means to attain a speed shift. Therefore, an automatic transmission system of low cost can be provided without greatly improving the existing vehicle production equipment. Also, when the vehicle is very slowly moved in the starting stage, the friction clutch is gradually disengaged with the release of depression of the accelerator pedal thereby alleviating the shock, so that the vehicle can be smoothly started at a very low speed.

Figure 24B:
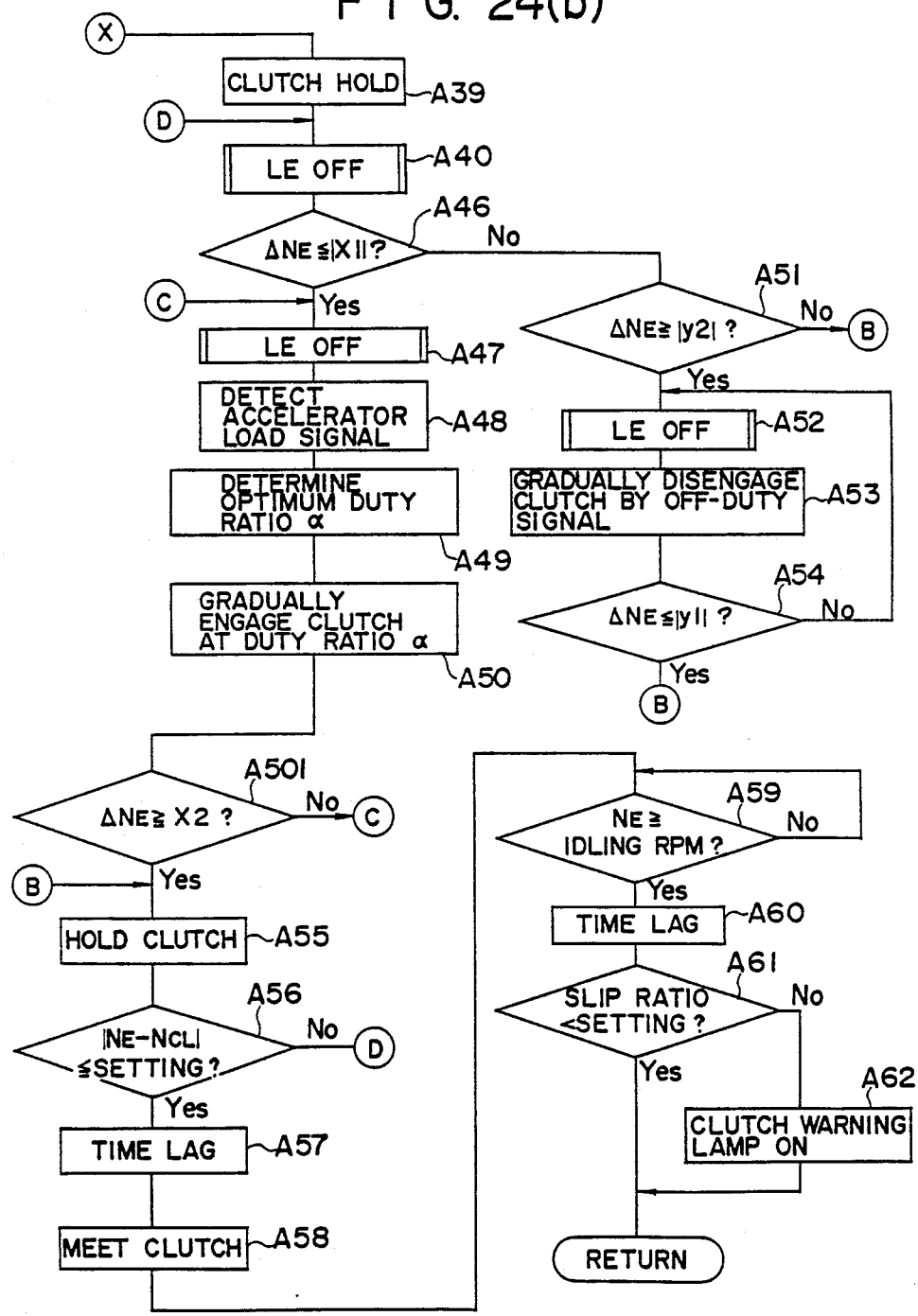
FIG. 24 is a flow chart showing an example of a control program of a third embodiment.
Figure 24C:
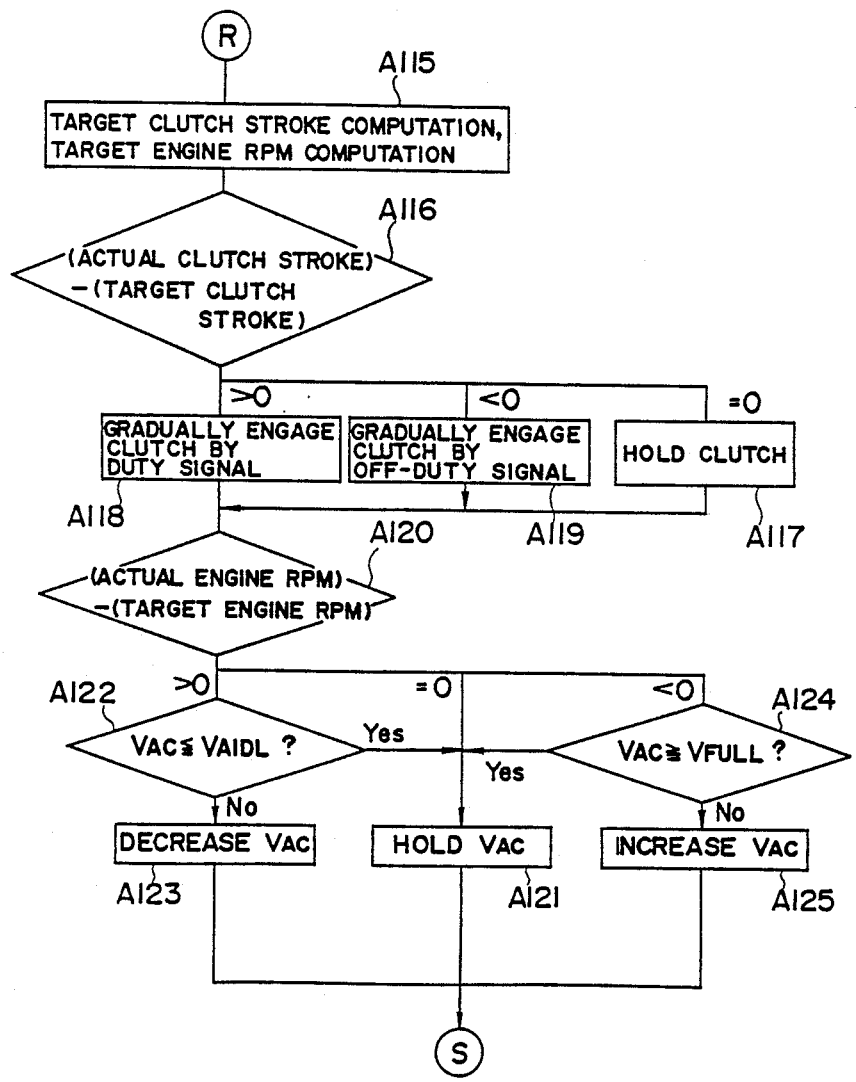

A third embodiment of the present invention will be described with reference to FIGS. 24 and 25. This third embodiment differs from the first embodiment is that the flow between the steps S62 and S104 shown in FIGS. 7(a) and 7(b) is replaced by a flow of steps A28 to A35 as shown in FIGS. 24(a) and 24(b) and that the flow between the steps S143 and S147 shown in FIG. 7(d) is replaced by a flow as shown in FIG. 24(c). However, the basic flow of the control program is the same as that of the first embodiment as in the case of the second embodiment. That is, although FIG. 4, FIGS. 10 to 12 and FIGS. 16 to 23 used for the explanation of the second embodiment are almost common to the third embodiment, FIGS. 21(a) and 21(b) of the second embodiment are replaced by FIGS. 24(a) and 24(b), and FIG. 24(c) is newly added. Further, FIG. 25 is also added. FIGS. 24(a) and 24(b) differ from FIGS. 21(a) and 21(b) in that the steps A31 to A35 in FIG. 21(a) are modified as shown in FIG. 24(a).

Steps of the third embodiment which differ from those of the second embodiment will only be described now. When the gear position coincides with the position of the change lever 61 as a result of judgment made in step A28 in FIG. 24(a), whether the gear position shifted to the desired speed ratio is neutral or not is read on the basis of the shift signal (step A32). When the result of judgment is YES, the vehicle cannot be started. Therefore, the clutch 15 is completely engaged, and the pseudo signal voltage $V_{AC}$ is released so that the accelerator can be operated to control the rotation of the engine (step A110). After the change lever 61 is shifted to a gear position other than the neutral, (step A111), the program returns to the initial step of the vehicle starting flow. On the other hand, when the gear position is other than the neutral, and the result of judgment is NO, judgment is made as to whether or not the vehicle speed is higher than the predetermined setting (step A112). When the result of judgment is YES, the clutch 15 (the stroke of the clutch disc 31) is held at the existing state of engagement, and, after releasing the pseudo signal voltage $V_{AC}$, the program proceeds to steps starting from step of accelerator load signal detection described later (step A113).

On the other hand, when the vehicle speed is equal to or lower than the predetermined setting, and the result of judgment described above is NO, judgment is made on the basis of the accelerator load signal as to whether or not the accelerator opening (the amount of depression of the accelerator pedal) is less than 60% which is a predetermined setting in the third embodiment (step A114). When the accelerator opening is more than 60%, the program proceeds to the steps starting from the step of accelerator load signal detection, after holding the clutch 15 and releasing the pseudo signal voltage $V_{AC}$ as described above.

When the result of judgment of the accelerator opening proves that the accelerator opening proves that the accelerator opening is less than 60%, the program proceeds to a flow (FIG. 24(c)) for achieving a smooth slow starting of the vehicle. In this flow, a pre-set target clutch stroke and a target engine rotation speed corresponding to the accelerator opening are read from a map shown in FIG. 25 in order to achieve the smooth slow starting of the vehicle (step A115). Herein, the clutch stroke indicates a stroke of the clutch disc 31 toward its disengaged state from the complete engaged state. Then, the target clutch stroke read from the map is compared with the actual clutch stroke (step A116), and, when they coincide with each other, the clutch disc 31 is held at that stroke position (step A117). On the other hand, when the actual clutch stroke is larger than the target clutch stroke, the electromagnetic valve 53 is duty-controlled to operate the air cylinder 33 thereby urging the clutch disc 31 toward the engaged side until the actual clutch stroke coincides with the target clutch stroke (step A118). When, on the contrary, the actual clutch stroke is smaller than the target clutch stroke, the electromagnetic valve 53 is duty-controlled to operate the air cylinder 33 thereby urging the clutch disc 31 toward the disengaged side until the actual clutch stroke coincides with the target clutch stroke (step A119). As a result, the clutch disc 31 is coupled to the flywheel 29 in a semi-engaged state suitable for achieving the slow starting of the vehicle.

Together with the clutch stroke control described above, the engine rotation speed is also controlled by comparing the actual engine rotation speed with the target engine rotation speed read from the map (step A120). That is, when the actual engine rotation speed coincides with the target engine rotation speed, the actuating signal voltage $V_{AC}$ which is applied to the electromagnetic actuator (an electronic governor) 25 controlling the engine rotation in a relation preferential to the accelerator actuation by the driver, is held at the existing value (step A121). On the other hand, when the actual engine rotation speed is higher than the target engine rotation speed, the voltage $V_{AC}$ is decreased to decrease the actual engine rotation speed (steps A122 and A123). When, on the contrary, the actual engine rotation speed is lower than the target engine rotation speed, the voltage $V_{AC}$ is increased to increase the actual engine rotation speed (steps A124 and A125). When the voltage $V_{AC}$ is lower than an idling volage $V_{AIDL}$ in the former case, and, when the voltage $V_{AC}$ is higher than a full voltage $V_{FULL}$ causing full rotation of the engine in the latter case, the voltage $V_{AC}$ is neither decreased nor increased respectively.

As a result of the above manner of control, the actual engine rotation speed can be controlled to coincide with the target engine rotation speed suitable for achieving the slow starting of the vehicle. Thus, by the cooperation of the clutch 15 engaged at the target clutch stroke as described above, the desired slow starting of the vehicle at the accelerator opening determined by the driver's accelerator actuation can be automatically smoothly achieved. Such a manner of slow starting control is repeated as far as the aforementioned conditions of the change lever position, gear position, vehicle speed and accelerator opening are satisfied. Also, since such a manner of slow starting control is carried out according to the target clutch stroke and target engine rotation speed, smooth and slow vehicle starting can be realized even under a heavy loaded condition of the vehicle as, for example, in the case of slow starting while steering the vehicle, when a map is previously prepared. Therefore, as compared to the case where slow starting is achieved by merely slowly engaging the clutch, vehicle starting at a relatively high speed corresponding to the accelerator opening can be achieved when so required.

When the result of judgment of the accelerator opening (step A114) proves that the accelerator opening is more than 60%, that is, when the result of judgment proves that the vehicle is started to run in an ordinary running mode, the value of the accelerator load signal is detected (step A35), and an optimum duty ratio corresponding to the detected value of the accelerator load signal is read from the map shown in FIG. 4 (step A36). Steps starting from step A37 are executed in the same manner as the second embodiment, and any description thereof is dispensed with. According to this third embodiment, the engaged state of the clutch and the operating state of the engine are automatically controlled to coincide with the pre-set target clutch stroke and a pre-set target engine rotation speed corresponding to the accelerator opening when the vehicle is to be slowly started, so that the vehicle can be smoothly slowly started at a desired speed corresponding to the accelerator opening determined by the driver.

Figure 26A:
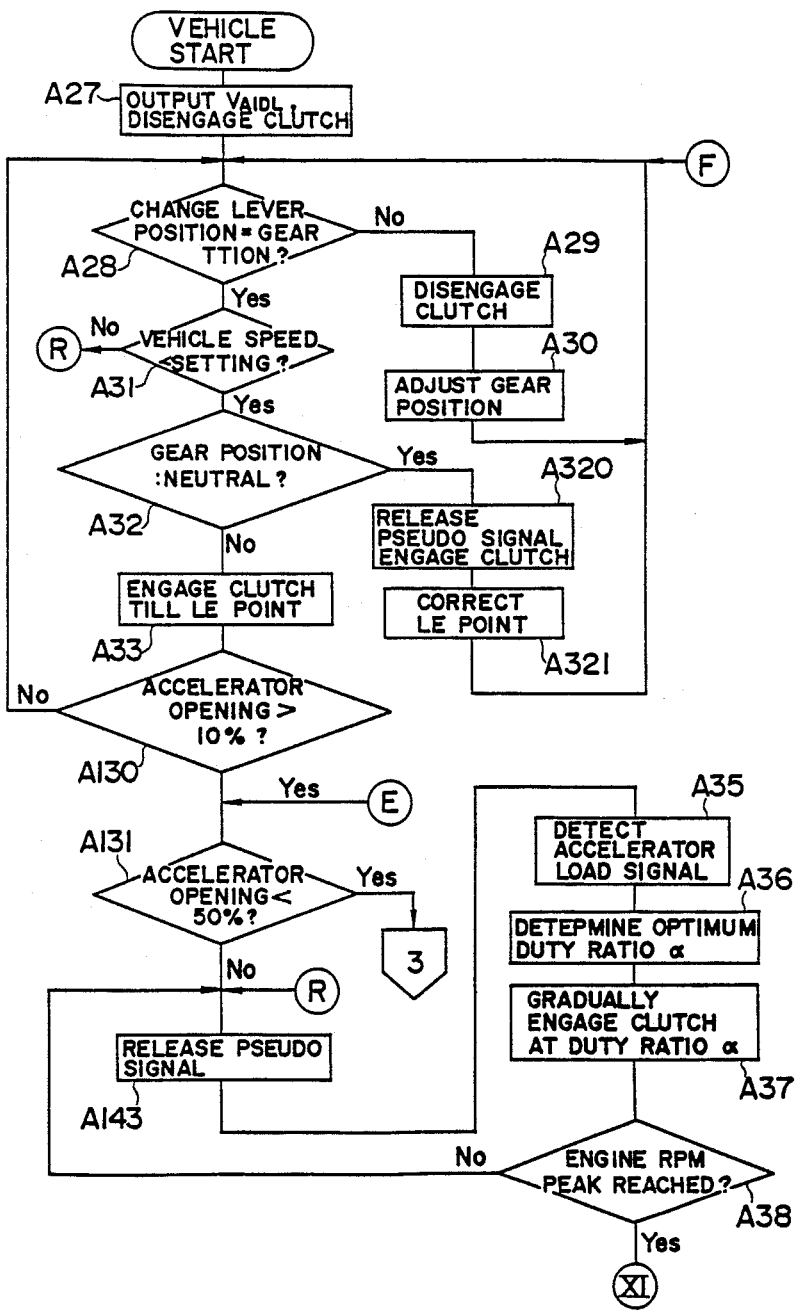
FIGS. 26(a), 26(b) and 26(c) are flow charts showing an example of a control program in a fourth embodiment.
Figure 26B:
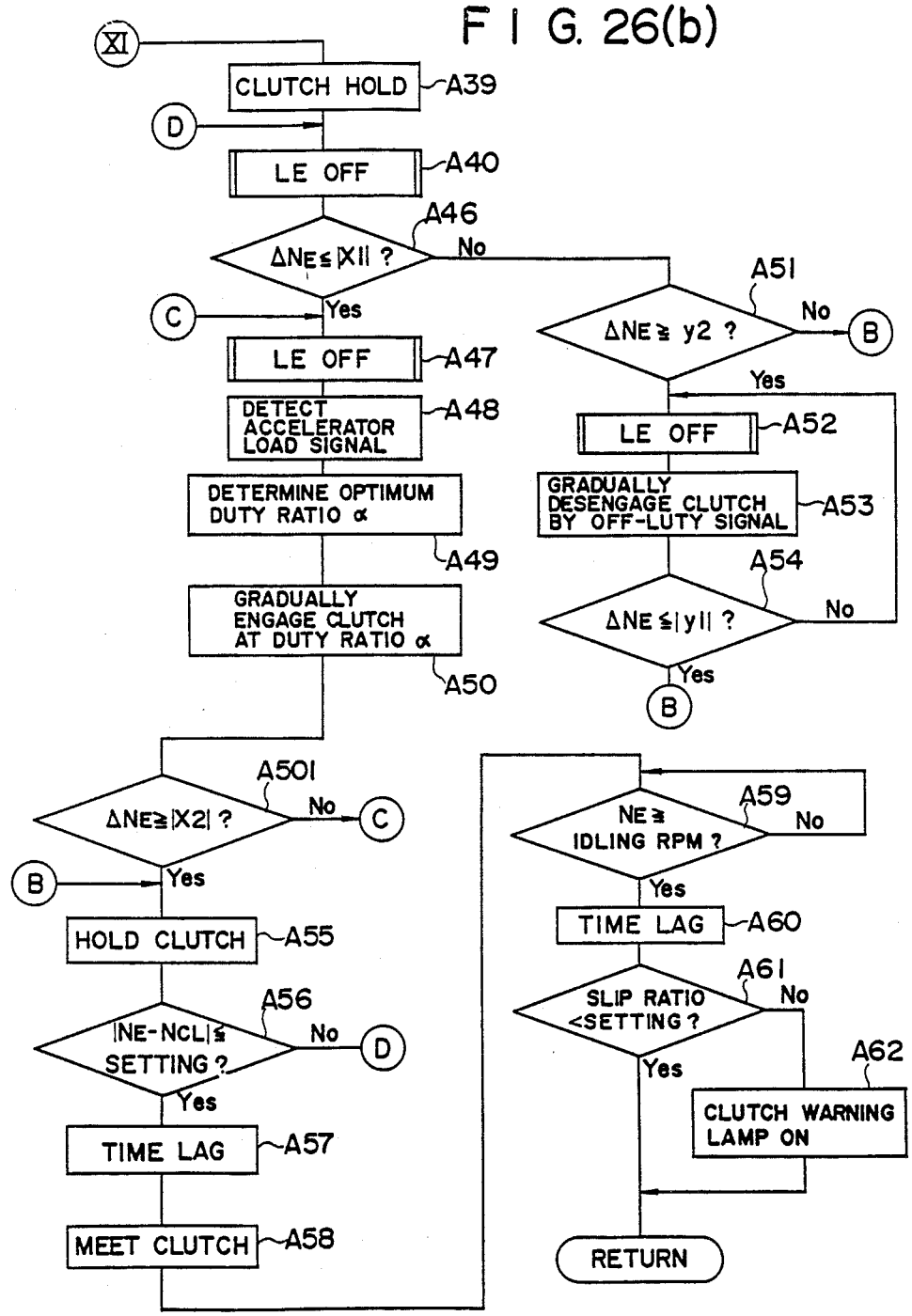
Figure 26C:
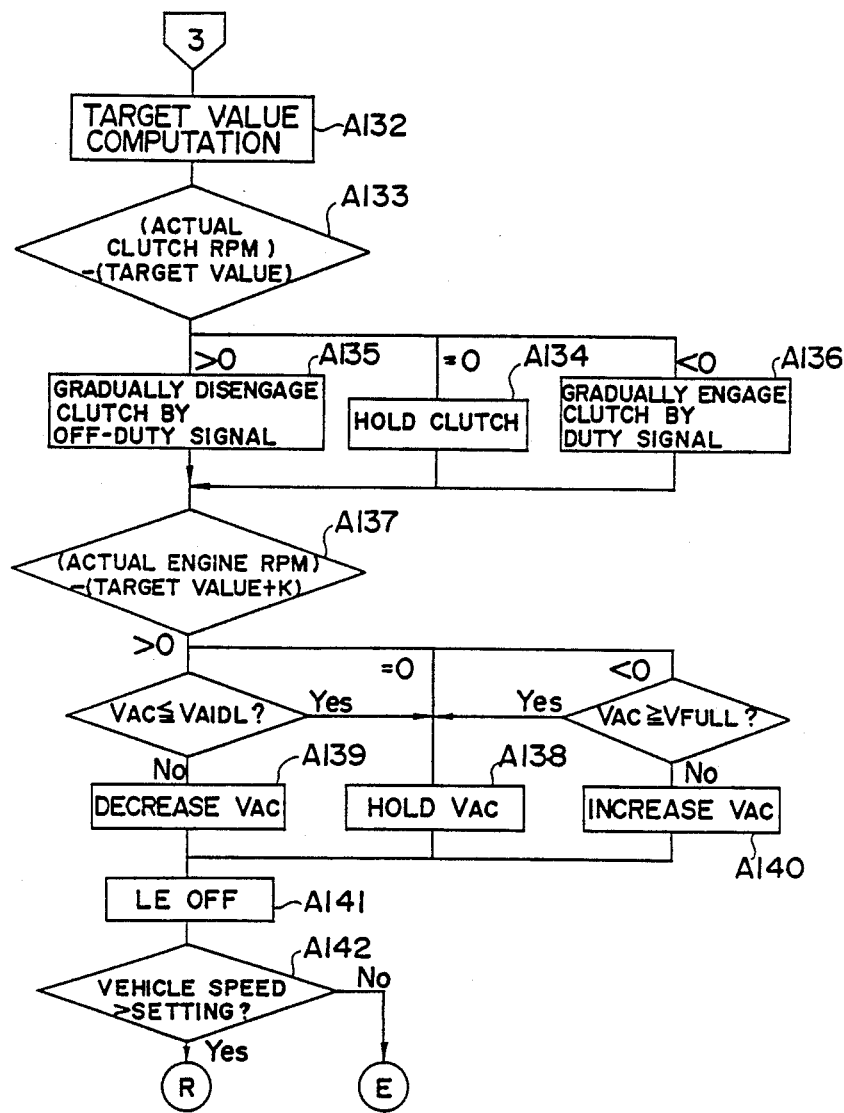
Figure 27:
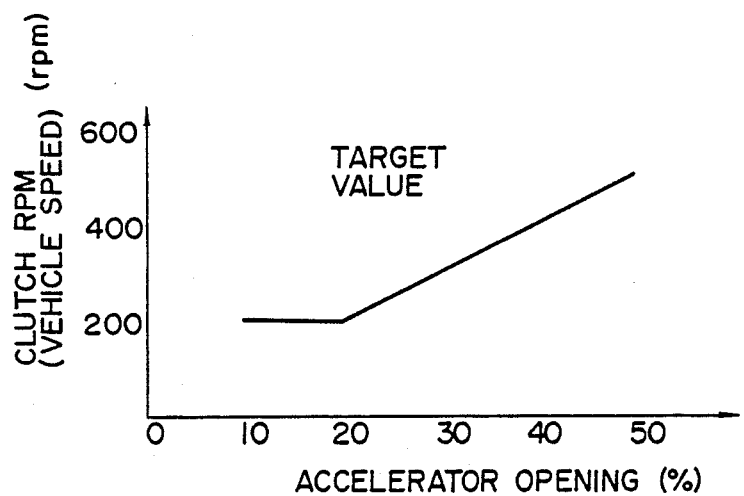
FIG. 27 is a graph showing an example of a map for determining a target value corresponding to an accelerator opening.

A fourth embodiment of the present invention will next be described. This fourth embodiment differs from the first embodiment in that the flow between the steps S62 and S102 shown in FIGS. 7(a) and 7(b) are changed to a flow as shown in FIGS. 26(a) and 26(b), and that, although the steps S144, S146 and S147 in the control program shown in FIG. 7(d) are executed depending on the result of judgment comparing the value of the clutch stroke relative to the target value in the step S143, the clutch control is executed in this fourth embodiment by comparing the value of the actual clutch rotation speed with a target value as shown in step A133 in FIG. 26(c). That is, this fourth embodiment differs in drawing from the second embodiment in that FIGS. 21(a) and 21(b) illustrating the second embodiment are replaced by FIGS. 26(a) and 26(b), and that FIG. 26(c) and FIG. 27 are newly added to the drawings illustrating the second embodiment. The portions of the sequence of shift control in the fourth embodiment which differ from those of the second embodiment will be described now, and the same reference symbols are used to designate steps which are substantially the same as those shown in FIGS. 21(a) and 21(b). As shown in FIGS. 26(a), 26(b), 26(c) and FIG. 21(c), when the vehicle starting routine is started, the CPU 95 applies an ON signal to the cut valve 51 to disengage the clutch 15, and applies to the electromagnetic actuator (the electronic governor) 25, the idling voltage $V_{AIDL}$ as the pseudo signal voltage $V_{AC}$ for rotating the engine at the idling rotation speed (step A27). Then, judgment is made as to whether or not the gear position coincides with the position of the change lever 61 (step A28). When the result of judgment is NO, the gear position is adjusted to coincide with the desired speed ratio (steps A29 and A30). When now the gear position coincides with the position of the change lever 61, judgment is made again as to whether or not the vehicle speed is lower than the predetermined setting (step A31). When the result of judgment is NO because the vehicle speed is higher than the predetermined setting, the program proceeds to step of accelerator load signal detection after releasing the pseudo signal voltage $V_{AC}$ as described later. On the other hand, when the result of judgment is YES, judgment is made as to whether or not the gear position attaining the desired speed ratio is neutral on the basis of the shift signal (step A32). When the result of judgment is YES, the LE point is corrected again after releasing the pseudo signal voltage $V_{AC}$ (steps A320 and A321). On the other hand, when the result of judgment is NO because the gear position is not neutral, the clutch 15 is engaged until the LE point is reached (step A33). Then, judgment is made in step A130 as to whether or not the level of the accelerator load signal is higher than a predetermined level (a voltage as low as that merely indicative of the will of the driver to start the vehicle), that is, as to whether or not the accelerator opening is more than 10%. When the result of judgment is NO because the driver has no will of starting the vehicle, the aforementioned steps are repeated. On the other hand, when the result of judgment is YES because the driver has the will of starting the vehicle, judgment is made as to whether or not the accelerator opening is less than 50% (step A131). When the result of judgment is YES because the accelerator opening is between 10% and 50%, a target value of the clutch rotation speed previously set relative to the accelerator opening at a low vehicle speed is read from a map shown in FIG. 27 in step A132 shown in FIG. 26(c). The target value thus read out is compared in step A133 with the actual clutch rotation speed. When they coincide with each other, the clutch 15 is held in the existing state (step A134). On the other hand, when the actual clutch rotation speed is higher than the target speed, the electromagnetic valve 53 is off-duty-controlled in step A135 to actuate the air cylinder 33, thereby gradually disengaging the clutch 15 and reducing the force pressing the clutch disc 31 against the flywheel 29. On the contrary, when the actual clutch rotation speed is lower than the target speed, the electromagnetic valve 53 is duty-controlled to actuate the air cylinder (step A136), thereby gradually engaging the clutch 15 and intensifying the force pressing the clutch disc 31 against the flywheel 29. As a result, the rotation speed of the clutch disc 31, receiving the rotating force in the semi-engaged state from the engine output shaft 13 rotating at a speed slightly higher than the rotation speed realizing the desired vehicle speed, follows up the target value realizing the desired vehicle speed, and the desired vehicle speed corresponding to the rotation speed of the clutch disc 31 is realized at the accelerator opening according to the map shown in FIG. 27. Therefore, when the map is so set that, for example, the target speed is 200 rpm at the accelerator opening of 20% and 300 rpm at the accelerator opening of 30%, the attained vehicle speed is 2K m/h and 3K m/h respectively. Thus, the vehicle can be smoothly and very slowly started according to the accelerator opening. Although the accelerator opening is set to lie within the range of from 10% to 50% in this embodiment, the accelerator opening can be set to lie in various ranges depending on the factors such as the output of the engine and the characteristics of the vehicle. It is naturally possible to set the accelerator opening to cover the full range of from 0% to 100%. However, the accelerator opening is preferably set to lie in the specified range so that the service life of the clutch may not be shortened due to establishment of the semi-engaged state at a high engine rotation speed.

In addition to the low-speed starting control described above, the actual engine rotation speed is compared with the target speed in step A137 in this embodiment so as to prevent engine stalling. When the actual engine rotation speed is higher than the target speed by a fixed positive value K, that is, when the clutch 15 is in its semi-engaged state due to a slip of the clutch disc 31 to a certain extent, the actuating signal voltage $V_{AC}$ applied to the actuator (the electronic governor) 25 controlling the engine rotation is held at the existing level (step A138). On the other hand, when the actual engine rotation speed is higher than the sum of the target speed and the value K, the voltage $V_{AC}$ is decreased to decrease the engine rotation speed (step A139). On the contrary, when the actual engine rotation speed is lower than the sum of the target speed and the value K, the voltage $V_{AC}$ is increased to increase the engine rotation speed (step A140). When the voltage $V_{AC}$ is lower than the idling voltage $V_{AIDL}$ in the former case, and, when the voltage $V_{AC}$ is higher than the full voltage $V_{FULL}$ causing full rotation of the engine in the latter case, the voltage $V_{AC}$ is neither decreased nor increased respectively.

By virtue of such a manner of engine-stalling preventive control, the vehicle can be smoothly and very slowly started without accompanying engine stalling even when, for example, the vehicle is to be very slowly started under a heavy loaded condition on an ascent.

Subsequent to the sequence of the slow-starting control and engine-stalling preventive control described above, the LEOFF routine is executed (step A141). Then, judgment is made as to whether or not the vehicle speed is higher than the predetermined setting (step A142). When the result of judgment is YES because the vehicle speed is higher than the predetermined setting, the ordinary flow continues. On the other hand, when the result of judgment is NO, the accelerator opening is detected again, and the slow-starting control are repeated when the detected accelerator opening is less than 50%.

When the accelerator opening is detected to be more than 50% in the vehicle starting flow, the vehicle is judged to be ordinarily started, and the pseudo signal voltage $V_{AC}$ is released, so that the engine rotation can be controlled by the accelerator depression (the accelerator load signal) (step A143). In step A35, the accelerator load signal is detected, and, in step A36, an optimum duty ratio corresponding to the detected value of the accelerator load signal is read from the map shown in FIG. 4. Execution of steps starting from step A38 is the same as that of the second embodiment, and description thereof is dispensed with.

According to this fourth embodiment, the following meritorious effect is added to the meritorious effect of the second embodiment. That is, when the vehicle is to be started at a very low speed, the clutch-disc rotation speed is set at a pre-set target value corresponding to the accelerator opening. The engaged state of the clutch for attaining the target vehicle speed is automatically controlled, so that, by determination of a certain accelerator opening by the driver, the vehicle can be smoothly and very slowly started at the desired speed.

An embodiment of a circuit controlling the duty of an automatic transmission system, (referred to hereinafter merely as a duty control circuit), which is another embodiment of the invention, will be described with reference to FIGS. 28 and 29.

The circuit of FIG. 28 showing principal parts of this embodiment is disposed in an automatic transmission controller 124 selectively controlling a first and a second electromagnetic valve 122 and 123 for a clutch actuator 121 in the automatic transmission system.

The clutch actuator 121 is an air cylinder herein, and high-pressure air from an air source 121 is supplied through a pipe 125 to engage a clutch (not shown). When the air is exhausted, the clutch can be restored to its engaging position.

Both the first and second electromagnetic valves 122 and 123 are duty valves. The first electromagnetic valve 122 is a normally-open valve which changes over the clutch actuator 121 from an open state communicating with the atmosphere to a closed state in response to a change from "off" to "on" of its input signal. The second electromagnetic valve 123 is a normally-closed valve which changes over the clutch actuator 121 from a state disconnected from the air source 126 to a state connected to the air source 126 in response to a change from "off" to "on" of its input signal.

The automatic transmission controller 124 includes a central processor unit (referred to hereinafter as a CPU) 127, memories (not shown), input/output ports (some of which are designated by 128 and 129), and input/output circuits (which are parts of the duty control circuit). By the function of the automatic transmission controller 124, an engine (not shown) of a vehicle and a power transmission system connected to the engine are operated so that engine starting, vehicle starting and speed shifts can be controlled according to a predetermined control program. Among various parts, the CPU 127, the output ports 128, 129, an oscillator 130, a counter 131, a comparator 132, a logic circuit 133 and an electromagnetic-valve driver circuit 134 functioning as parts of the duty control circuit will now be described.

At a proper time, as, when, for example, the vehicle is in a starting stage and the clutch is gradually engaged from its completely disengaged stae to its semi-engaged state, the CPU 127 determines the duty ratio on the basis of the accelerator opening and engine rotation speed and applies a duty determination number corresponding to the determined duty ratio from the output part 128 to the comparator 132 as a duty determination number signal B. Further, the CPU 127 selects the electromagnetic valve to be energized in the starting stage (the first electromagnetic valve 122 being duty-operated, while the second electromagnetic valve 123 being maintained in the off state) and, at the proper time, electromagnetic-valve operating signals S1 and S2 appear from the output port 128.

The oscillator 130 may be that generating basic pulses of a single kind. The oscillation frequency F of the oscillator 130 is determined as $F = f \cdot 2^4 = 160$ (Hz), where f is a pre-set frequency (which is, for example, 10 Hz) of pulse signals S31 and S32 described below, and $2^4$ is the number of pulses (of, for example, 4 bits) counted in one counting period of the counter 131. (Refer to FIG. 29.)

The counter 131 counts successively the number of basic pulses. That is, the counter 131 counts sixteen basic pulses in each period T of pulse signals S31 and S32, and its count A is reset to zero when the period T is changed over to the next period T1. The counter 131 repeats the above manner of counting.

The comparator 132 is a digital comparator, and, in response to the application of the duty determination number signal and count signal, generates a pulse width signal S4 during the period of time $\tau$ in which the count A exceeds the duty determination number B (the period of time in which A>B).

The logic circuit 133 is composed of two AND circuits 1331 and 1332.

Both these two AND circuits are so connected as to receive the pulse width signal S4 at one terminal thereof and receive the electromagnetic-valve operating signals S1 and S2 at the other terminal thereof respectively. The AND circuit 1331 is connected at its output terminal to the first electromagnetic valve 122 through a driver circuit 1441, and the other AND circuit 1331 is connected at its output terminal to the second electromagnetic valve 123 through a driver circuit 1442. Both these two driver circuits may be amplifiers which can amplify the pulse signals S31 and S32 having the duty ratio ($\tau$/T) determined by the pulse width signal S4.

Now, the case where the clutch is gradually urged at a very slow rate from the disengaged state toward the engaged state, will be described. Prior to the clutch engagement, the first electromagnetic valve 122 is maintained in its on position, while the second electromagnetic valve 123 is continuously maintained in its off position. In the above state, the electromagnetic-valve operating signals S1 and S2 appearing from the CPU 127 are in an on state and an off state respectively, and the duty determination number B is zero. That is, the pulse signal S31 applied to the first electromagnetic valve 122 maintains the valve 122 in the on position.

Then, on the basis of a new duty determination number B determined on the basis of the factors including the accelerator opening, the comparator 132 applies the pulse width signal S4 having the pulse width signal S4 driver circuit 1441 through the AND circuit 1331. In response to the application of the pulse width signal S4, the driver circuit 1441 applies to the first electromagnetic valve 122 the pulse signal s31 having the duty ratio of $\tau$/T and the frequency of 10 Hz. In response to the application of the pulse signal S31, the first electromagnetic valve 122 acts to gradually exhaust the internal air of the clutch actuator 121 at time rate corresponding to the duty ratio $\tau$/T, thereby gradually urging the clutch disc toward the semi-engaged clutch position.

Further, when the CPU 127 judges that the speed of clutch engagement is high, the CPU 127 generates a control signal to increase the duty determination number B from 128 (to, for example, 130) thereby decreasing the pulse width $\tau$, while when the CPU 127 judges that the speed of clutch engagement is low, the CPU 127 generates a control signal to decrease the duty determination number B from 128 (to, for example, 126) thereby increasing the pulse width $\tau$. Further, when it becomes necessary to cause a slight return movement of the clutch disc in the direction of clutch disengagement, the CPU 127 generates the electromagnetic-valve operating signals S1 and S2 of on-state thereby turning on both the electromagnetic valves 122 and 123. The shape of the air flow path is previously determined so that, even when both the electromagnetic valves operate simultaneously due to the duty ratio based on the pulse width at that time, air in an increased quantity can be supplied to the clutch actuator 121.

The arrangement described above is such that the comparator in the duty control circuit generates a pulse width signal S4 of a single kind at a proper time. Such an arrangement may be replaced by an arrangement in which one set of the oscillator, counter and comparator is added to the former arrangement to continuously generate different pulse width signals of two kinds thereby operating a plurality of electromagnetic valves (the number of which may be three). Further, although the pulse signals S31 and S32 having the frequency of 10 Hz are referred to in the above description, the frequency may be changed or increased or decreased from the specified valve. Further, although the clutch actuator operated on the air pressure is referred to in the above description, it may operate on an oil pressure.

According to the present invention, the duty ratio of the pulse signals applied to the electromagnetic valves can be more easily finely divided into multiple values so that close adjustment of the position of clutch engagement is facilitated. Moreover, an undesirable deviation of the duty ratio due to temperature variations and parts errors can be prevented to ensure the accuracy of the duty ratio.

We claim:

1. A starting control apparatus for an automatic transmission system in a vehicle comprising engine control means for controlling an increase and a decrease of the rotation speed of an engine; a clutch coupled to an output shaft of said engine; a parallel-shaft type gear transmission coupled at an input shaft thereof to said clutch; a clutch actuator for actuating engagement and disengagement of said clutch; clutch position detecting means for detecting engagement and disengagement of said clutch; shift position change-over means for changing the meshing state of said parallel-shaft type gear transmission; operating condition detecting means for detecting operating conditions of the vehicle; operation control means for controlling the operation of said actuator and said shift position change-over means; target engine rotation-speed generating means for generating a target engine rotation speed corresponding to an amount of accelerator pedal depression detected by said operating condition detecting means; vehicle-starting judging means for judging as to whether or not said shift position change-over means is actuated to establish a vehicle-starting speed ratio on the basis of a signal applied from said operating condition detecting means; engine rotation-speed increasing means operating, when said vehicle-starting judging means judges that said shift position change-over means is actuated to establish the vehicle-starting speed ratio, to apply to said engine control means an accelerator pseudo signal voltage computed on the basis of said target engine rotation speed and a present engine rotation speed detected by said operating condition detecting means, thereby increasing the present engine rotation speed to said target engine rotation speed; clutch urging means for applying, in response to a signal applied from said engine rotation-speed increasing means, a signal to said operation control means to urge said clutch from a disengaged state toward an engaged state; synchronous rotation judging means for judging, when the engine rotation speed has been increased to a peak thereof by said engine rotation-speed increasing means, as to whether or not said engine rotation speed is substantially synchronous with a clutch rotation speed; clutch engagement judging means for deciding that said clutch is to be completely engaged when said synchronous rotation judging means judges that said engine and said clutch are under substantially synchronous rotation but deciding that said clutch is to be operated in a semi-engaged state when said synchronous rotation judging means judges that said engine and said clutch are under asynchronous rotation; and accelerator pseudo signal voltage stepwise releasing means for applying to said engine control means a signal for stepwise releasing said accelerator pseudo signal voltage when said clutch position detecting means detects that said clutch is completely engaged.

2. A starting control apparatus for an automatic transmission system as claimed in claim 1, further comprising starting mode change-over means for judging that a low-speed starting control routine is to be executed for starting the vehicle at a very low speed when an accelerator depression detected when the engine rotation speed has been increased to the peak value by said engine rotation-speed increasing means is less than a predetermined setting and that an ordinary starting control routine is to be executed for ordinarily starting the vehicle when said accelerator depression is more than said predetermined setting, said synchronous rotation judging means being provided for the selective execution of said low-speed starting control routine and said ordinary starting control routine.

3. A starting control apparatus for an automatic transmission system as claimed in claim 2, further comprising, to deal with judgment of the asynchronous rotation by said synchronous rotation judging means, ordinary-starting accelerator pseudo signal voltage generating means for applying to said engine control means an accelerator pseudo signal voltage for carrying out ordinary starting control according to said ordinary starting control routine, and low-speed-starting accelerator pseudo signal voltage generating means for applying to said engine control means an accelerator pseudo signal voltage for carrying out low-speed starting control according to said low-speed starting control routine.

4. A starting control apparatus for an automatic transmission system as claimed in claim 3, wherein, to deal with the judgment of the asynchronous rotation by said synchronous rotation judging means, said low-speed starting control routine includes slow-rate clutch disengaging means for gradually disengaging said clutch when the accelerator pedal is not depressed by the driver.

5. A starting control apparatus for an automatic transmission system as claimed in claim 4, wherein said disengaging means disengages said clutch under duty control.

6. A starting control apparatus for an automatic transmission system as claimed in claim 3, wherein said ordinary-starting accelerator pseudo signal voltage generating means computes the voltage difference between the value of a voltage corresponding to the present accelerator opening and the value of an accelerator pseudo signal voltage, subtracts said voltage difference from said voltage value corresponding to said present accelerator opening, and generates the resultant value as said accelerator pseudo signal voltage.

7. A starting control apparatus for an automatic transmission system as claimed in claim 2, wherein said low-speed starting control routine includes target clutch stroke setting means for setting a target clutch stroke on the basis of the accelerator opening and the clutch stroke detected when said engine rotation speed attains the peak, and the value of the target clutch stroke set by said target clutch stroke setting means is compared with that of the present clutch stroke for engaging said clutch in a semi-engaged state.

8. A starting control apparatus for an automatic transmission system as claimed in claim 7, wherein said clutch is engaged in the semi-engaged state under duty control.

9. A starting control apparatus for an automatic transmission system as claimed in claim 8, wherein, to deal with the judgment of the asynchronous rotation by said synchronous rotation judging means in said low-speed starting control routine, the value of the clutch stroke set by said target clutch stroke setting means is compared with that of the present target clutch stroke, and, when the target clutch stroke is larger than the present clutch stroke, and the accelerator pedal is not depressed by the driver, said clutch is gradually disengaged.

10. A starting control apparatus for an automatic transmission system as claimed in claim 2, further comprising, to deal judgment of the synchronous rotation by said synchronous rotation judging means, clutch engaging means for immediately engaging said clutch by said clutch actuator according to said ordinary starting control routine but gradually engaging said clutch by said clutch actuator according to said low-speed starting control routine.

11. A starting control apparatus for an automatic transmission system as claimed in claim 10, wherein said clutch is gradually engaged under duty control.

12. A starting control apparatus for an automatic transmission system as claimed in claim 2, wherein said low-speed starting control routine includes a map for determining a target rotation speed of said clutch on the basis of the accelerator depression detecting by said operating condition detecting means, and the value of said target clutch rotation speed read from said map is compared with that of the present clutch rotation speed to connect said clutch in a semi-engaged state.

13. A starting control apparatus for an automatic transmission system as claimed in claim 12, wherein said clutch is connected in the semi-engaged state under duty control.

14. A starting control apparatus for an automatic transmission system as claimed in claim 2, wherein said low-speed starting control routine includes a map for determining a target clutch stroke and a target engine rotation speed on the basis of the accelerator depression detected by said operating condition detecting means, the value of said target clutch stroke read from said map being compared with that of the present clutch stroke to connect said clutch in a semi-engaged state, and the value of said target engine rotation speed read from said map being compared with that of the present engine rotation speed to attain coincidence of the present engine rotation speed with said target engine rotation speed.

15. A starting control apparatus for an automatic transmission system as claimed in claim 2, wherein the value of the accelerator pseudo signal voltage generated from said engine rotation speed increasing means is determined as the sum of an increment or a decrement of the accelerator pseudo signal voltage computed on the basis of the target engine rotation speed and the present engine rotation speed and a voltage corresponding to an engine rotation speed higher by a predetermined value than said target engine rotation speed under a no-loaded condition, so that the engine rotation speed at the peak is maintained constant.

16. A starting control apparatus for an automatic transmission system as claimed in claim 1, wherein said vehicle-starting judging means judges said vehicle-starting speed ratio on the basis of a vehicle speed signal and a clutch rotation speed signal applied from said operating condition detecting means.

17. A starting control apparatus for an automatic transmission system as claimed in claim 1, wherein an accelerator output voltage, under a no-loaded condition, corresponding to the sum of the target engine rotation speed and a constant taking into account a decrease of the engine rotation speed due to engagement of said clutch is generated as the value of the accelerator pseudo signal voltage generated from said engine rotation speed increasing means, so that the engine rotation speed at the peak is maintained constant.

* * * * *

UNITED STATES PATENT AND TRADEMARK OFFICE
CERTIFICATE OF CORRECTION

PATENT NO. : 4,817,776

DATED : April 4, 1989

INVENTOR(S) : Toshiaki TATENO, Shigeki FUKUSHIMA and Tomoyuki Iwamoto

It is certified that error appears in the above-identified patent and that said Letters Patent is hereby corrected as shown below:

On the title page:

Assignee: MITSUBISHI JIDOSHA KOGYO KABUSHIKI KAISHA, Tokyo, Japan

Signed and Sealed this

Thirty-first Day of July, 1990

Attest:

HARRY F. MANBECK, JR.

Attesting Officer

Commissioner of Patents and Trademarks